United States Patent [19]
Keaveny et al.

[11] Patent Number: 6,065,087
[45] Date of Patent: May 16, 2000

[54] ARCHITECTURE FOR A HIGH-PERFORMANCE NETWORK/BUS MULTIPLEXER INTERCONNECTING A NETWORK AND A BUS THAT TRANSPORT DATA USING MULTIPLE PROTOCOLS

[75] Inventors: Thomas A. Keaveny, Auburn; Eric G. Tausheck, Citrus Heights, both of Calif.

[73] Assignee: Hewlett-Packard Company, Palo Alto, Calif.

[21] Appl. No.: 09/082,738

[22] Filed: May 21, 1998

[51] Int. Cl.[7] ............................. G06F 13/00; G06F 9/00; H04B 10/12; H04L 12/00
[52] U.S. Cl. ......................... 710/129; 710/105; 710/51; 709/238; 709/250; 370/402
[58] Field of Search ........................... 710/126, 128, 710/129, 107, 2, 5, 62, 100, 101, 105, 131, 51, 52; 359/115, 117; 385/100; 709/223, 250, 213, 238; 370/401, 402, 911, 355; 340/825.52; 379/56.2; 711/102, 112, 147

[56] References Cited

U.S. PATENT DOCUMENTS

| | | | |
|---|---|---|---|
| 5,664,124 | 9/1997 | Katz et al. | 710/129 |
| 5,671,355 | 9/1997 | Collins | 709/250 |
| 5,751,975 | 5/1998 | Gillespie et al. | 710/126 |
| 5,771,360 | 6/1998 | Gulick | 710/128 |
| 5,805,816 | 9/1998 | Picazo, Jr. et al. | 709/223 |
| 5,896,513 | 4/1999 | Fisch et al. | 710/107 |

*Primary Examiner*—Gopal C. Ray

[57] ABSTRACT

A high-performance network/bus multiplexer that exchanges data transfer commands and data between different communications mediums, such as the Fibre Channel and one or more SCSI buses. High-performance is achieved by avoiding transmitting read bus operations through bus bridges, and by limiting contention for buses by connecting Fibre Channel host adapters to a first internal bus and SCSI adapters to a second internal bus.

47 Claims, 39 Drawing Sheets

| INITIATOR | | TARGET | |
|---|---|---|---|
| STATE | EVENTS | EVENTS | STATE |
| BUS FREE 314 | | | BUS FREE |
| ARBITRATION 316 | ASSERT BSY AND D7 ASSERT SEL | | ARBITRATION |
| SELECTION 318 | ASSERT DX AND ATN | | SELECTION |
| SELECTION 320 | DROP BSY DROP SEL | ASSERT BSY | SELECTION |
| MESSAGE OUT 322 | IDENTIFY — DISCONNECT PRIVILEDGE 325 / LUN 323 / 324 | | MESSAGE OUT |
| MESSAGE OUT | QUEUE TAG MESSAGE — SIMPLE QUEUE TAG / QUEUE TAG 326 / 327 | | MESSAGE OUT |
| COMMAND 328 | READ OR WRITE — OPCODE (READ OR WRITE) 332 / 330 FLAGS / LOGICAL BLOCK NO. 336 / DATA LENGTH 338 | | COMMAND |
| MESSAGE IN 340 | | DISCONNECT 342 | MESSAGE IN |
| BUS FREE 344 | | DROP BSY | BUS FREE |

| INITIATOR | | TARGET | |
|---|---|---|---|
| STATE | | | STATE |
| BUS FREE 346 | | | BUS FREE |
| ARBITRATION 348 | | ASSERT BSY AND DX<br>ASSERT SEL AND I/O | ARBITRATION |
| RESELECTION 350 | | ASSERT DX AND ATN<br>DROP SEL | RESELECTION |
| MESSAGE IN 352 | colspan="2" | IDENTIFY<br>LUN ~354 ← | MESSAGE IN |
| MESSAGE IN | colspan="2" | QUEUE TAG MESSAGE<br>SIMPLE QUEUE TAG \| QUEUE TAG ~356 ← | MESSAGE IN |
| DATA IN (read)<br>OUT (write) 358 | colspan="2" | ACK   DATA   REQ ooo<br>→ WRITE<br>READ ← | DATA IN (read)<br>OUT (write) |
| OPTIONAL DISCONNECT/ RECONNECT 360 | MESSAGE IN | SAVE POINTERS ← | MESSAGE IN |
| | MESSAGE IN | DISCONNECT ← | MESSAGE IN |
| | BUS FREE | | BUS FREE |
| | ARBITRATION | | ARBITRATION |
| | RESELECTION | | RESELECTION |
| | MESSAGE IN | IDENTIFY ← | MESSAGE IN |
| | MESSAGE IN | QUEUE TAG MESSAGE ← | MESSAGE IN |
| DATA | colspan="2" | ACK   DATA   REQ ooo<br>→ WRITE<br>READ ← | DATA |
| MESSAGE IN 362 | colspan="2" | DISCONNECT ← | MESSAGE IN |
| BUS FREE 364 | | DROP BSY | BUS FREE |

*Fig. 3B*

| INITIATOR | | TARGET | |
|---|---|---|---|
| state | | | state |
| BUS FREE 366 | | | BUS FREE |
| ARBITRATION 368 | | ASSERT BSY AND DX ASSERT SEL AND I/O | ARBITRATION |
| RESELECTION 370 | | ASSERT DX AND ATN DROP SEL | RESELECTION |
| MESSAGE IN 372 | | IDENTIFY <br> LUN ~374 | MESSAGE IN |
| MESSAGE IN | | QUEUE TAG MESSAGE <br> SIMPLE QUEUE TAG \| QUEUE TAG ~376 | MESSAGE IN |
| STATUS 378 | | 00h ~380 | STATUS |
| MESSAGE IN 382 | | COMMAND COMPLETE <br> 00h ~384 | MESSAGE IN |
| BUS FREE 386 | | DROP BSY | BUS FREE |

*Fig. 3C*

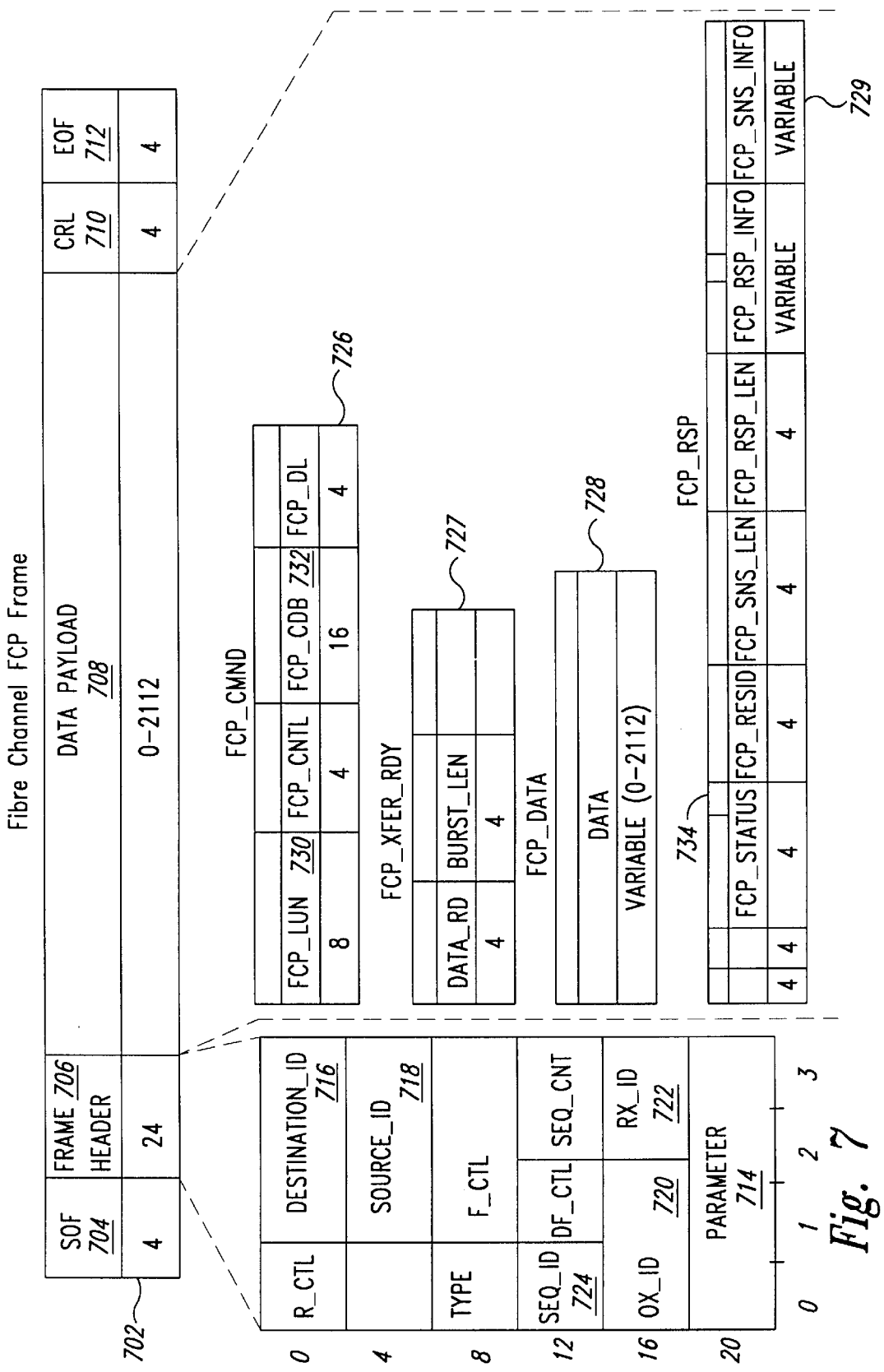

ARCHITECTURE FOR A HIGH-PERFORMANCE NETWORK/BUS MULTIPLEXER INTERCONNECTING A NETWORK AND A BUS THAT TRANSPORT DATA USING MULTIPLE PROTOCOLS

TECHNICAL FIELD

The present invention relates to computer multiplexer hardware systems for interconnecting computer communications media and, in particular, to a method for interconnecting computer networks to computer buses that eliminates inter-bus read operations and contention for resources within computer multiplexer hardware systems in order to maximize throughput between the interconnected networks and buses.

BACKGROUND OF THE INVENTION

The processing power of CPUs, and the computer systems that contain them, has continued to double on the average of every two years over the past twenty years. However, the performance of mass storage devices and computer bus interconnections between mass storage devices and CPUs has not increased at the same rate. As a result, many modern computer systems may be limited in processing speed by the speed at which data can be accessed and transported between memory and peripheral devices, such as hard disk drives. In addition, computer systems may be limited by the amount of data that they can efficiently access.

The small computer system interface ("SCSI") bus is the most widespread and popular computer bus for interconnecting mass storage devices, such as hard disks and CD-ROM drives, with the memory and processing components of computer systems. Depending on the particular SCSI standard to which the SCSI bus is implemented, the SCSI bus may interconnect 7, 15, or 31 different mass storage devices with an internal bus within a computer system, and may transfer data at rates of from 2 megabytes ("Mbytes") per second up to 40 Mbytes per second. Because the internal buses within computer systems can generally accommodate only a small number of SCSI bus interconnections, the SCSI bus architecture imposes significant limitations in the amount of data that can be accessed by a computer system as well as a significant limitation in the rate at which data can be transferred between a mass storage device and a computer system.

The Fibre Channel ("FC") architecture and protocol for data communications has been developed in order to overcome the limitations imposed by the SCSI bus architecture. When optical fibres are employed as a physical medium for interconnecting computer systems and mass storage devices, a FC network can extend for ten kilometers and can transfer data between a computer system and a mass storage device at up to 200 Mbytes per second. Whereas the SCSI bus supports connection of up to 31 target devices, a FC network can support connection of more than 16,000,000 target devices.

Although the FC technology greatly expands the amount of data that can be accessed by a computer system and increases the potential data transfer rate between a computer system and a mass storage device, computer systems continue to include mass storage devices compatible only with the SCSI bus, for both economical and practical reasons. As a result, computer users, system designers, and computer system administrators desire to incorporate the FC technology as a backbone communications mechanism within their computer systems, while continuing to use SCSI compatible mass storage devices. For this reason, a number of computer hardware vendors have produced FC/SCSI-bus multiplexers that contain one or more FC host adapters interconnected to a number of SCSI-bus adapters that each control a different SCSI bus.

While current FC/SCSI-bus multiplexers provide system designers with the ability to interconnect a computer system with many more mass storage devices, current FC/SCSI-bus multiplexers have not achieved greatly improved data transfer rates to and from the mass storage devices. A need has therefore been recognized in the computing industry for a high-performance FC/SCSI-bus multiplexer architecture that will allow FC/SCSI-bus multiplexers to provide a sufficiently efficient flow of data between mass storage devices and remote computers accessing those mass storage devices through FC connections to better realize, in practice, the greatly increased connectivity, data accessibility, and data transfer rate theoretically provided by the FC technology.

SUMMARY OF THE INVENTION

The present invention provides a high-performance Fibre Channel/SCSI-bus multiplexer in which multiple Fibre Channel host adapters are connected to a first internal bus and multiple SCSI-bus adapters are connected to a second internal bus. The first and second internal buses are, in turn, connected to a high-speed local processor bus via bus bridges, and the first and second internal buses are also connected to a dual-ported shared memory that contains a first set of control data structures and buffers. A general purpose processor that controls the operation of the Fibre Channel host adapters and the SCSI-bus adapters, and a local memory that contains a second set of control data structures and buffers, are both connected to a local processor bus.

By partitioning the control data structures and buffers between the local memory and the dual-ported shared memory in order to closely associate the control data structures and buffers with the high-speed Fibre Channel/SCSI-bus multiplexer components that read the control data structures, read operations through the bus bridges for critical read and write input/output ("I/O") transactions are avoided. The use of one internal bus for the Fibre Channel host adapters and a second internal bus for the SCSI-bus adapters eliminates direct contention between Fibre Channel host adapters and SCSI-bus adapters for a single internal bus, as commonly occurs in current FC/SCSI-bus multiplexers. The bottlenecks and inefficiencies characteristic to a number of currently-available FC/SCSI-bus multiplexers are eliminated, providing greater throughput of data between mass storage devices attached to SCSI buses controlled by the SCSI-bus adapters and remote computers connected to Fibre Channel.

BRIEF DESCRIPTION OF THE DRAWINGS

FIGS. 3A–3C illustrate the SCSI protocol involved in the initiation and implementation of read and write I/O commands.

FIG. 7 shows the contents of a standard Fibre Channel frame.

DETAILED DESCRIPTION OF THE INVENTION

The present invention provides an architecture for a high-performance FC/SCSI-bus multiplexer ("HPM"). In one embodiment of this HPM architecture, the FC host adapters are connected to a first internal bus and SCSI-bus adapters are connected to a second internal bus. The first and second internal buses are, in turn, connected to a high-speed local processor bus via bus bridges, and the first and second internal buses are also connected to a dual-ported static random access memory ("SRAM"). A general purpose processor and a local SRAM are both connected to the local processor bus. The use of one internal bus for the FC host adapters, and a different internal bus for the SCSI-bus adapters, eliminates direct contention between FC host adapters and SCSI-bus adapters for a single internal bus, as commonly occurs in current FC/SCSI-bus multiplexers. By partitioning the various control data structures and buffers between the local SRAM and the dual-ported SRAM in order to closely associate the control data structures with the HPM components that read the control data structures, the HPM avoids read operations through the bus bridges for critical read and write I/O transactions. Thus, the bottlenecks and inefficiencies characteristic of a number of currently-available FC/SCSI-bus multiplexers are eliminated, providing greater throughput through the HPM of data exchanged between mass storage devices attached to SCSI buses controlled by the SCSI-bus adapters in the HPM and remote computers connected to the HPM via an FC network.

The SCSI Bus Architecture

A computer bus is a set of electrical signal lines through which computer commands and data are transmitted between processing, storage, and input/output ("I/O") components of a computer system. The small computer system interface ("SCSI") I/O bus is the most widespread and popular computer bus for interconnecting mass storage devices, such as hard disks and CD-ROM drives, with the memory and processing components of computer systems. The SCSI bus architecture is defined in three major standards: SCSI-1, SCSI-2 and SCSI-3. The SCSI-1 and SCSI-2 standards are published in the American National Standards Institute ("ANSI") standards documents "X3.131-1986," and "X3.131-1994," respectively. The SCSI-3 standard is currently being developed by an ANSI committee. An overview of the SCSI bus architecture is provided by "The SCSI Bus and IDE Interface," Freidhelm Schmidt, Addison-Wesley Publishing Company, ISBN 0-201-17514-2, 1997 ("Schmidt").

Figure 1:
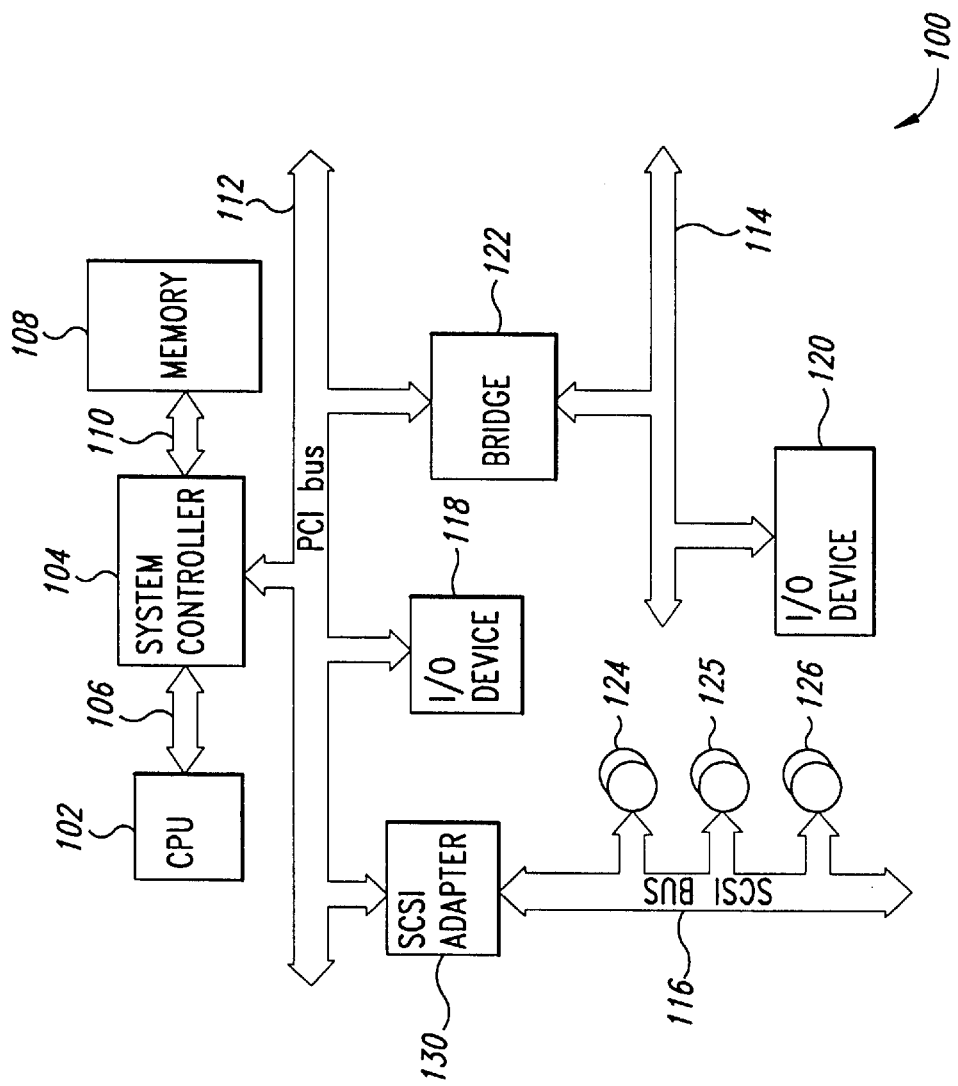
FIG. 1 is a block diagram of a common personal computer architecture including a SCSI bus.

FIG. 1 is a block diagram of a common personal computer ("PC") architecture including a SCSI bus. The PC 100 includes a central processing unit, or processor ("CPU") 102, linked to a system controller 104 by a high-speed CPU bus 106. The system controller is, in turn, linked to a system memory component 108 via a memory bus 110. The system controller 104 is, in addition, linked to various peripheral devices via a peripheral component interconnect ("PCI") bus 112 that is interconnected with a slower industry standard architecture ("ISA") bus 114 and a SCSI bus 116. The architecture of the PCI bus is described in "PCI System Architecture," Shanley & Anderson, Mine Share, Inc., Addison-Wesley Publishing Company, ISBN 0-20140993-3, 1995. The interconnected CPU bus 106, memory bus 110, PCI bus 112, and ISA bus 114 allow the CPU to exchange data and commands with the various processing and memory components and I/O devices included in the computer system. Generally, very high-speed and high bandwidth I/O devices, such as a video display device 118, are directly connected to the PCI bus. Slow I/O devices 120, such as a keyboard 120 and a pointing device (not shown), are connected directly to the ISA bus 114. The ISA bus is interconnected with the PCI bus through a bus bridge component 122. Mass storage devices, such as hard disks, floppy disk drives, CD-ROM drives, and tape drives 124–126 are connected to the SCSI bus 116. The SCSI bus is interconnected with the PCI bus 112 via a SCSI-bus adapter 130. The SCSI-bus adapter 130 includes a processor component, such as processor selected from the Symbios family of 53C8xx SCSI processors, and interfaces to the PCI bus 112 using standard PCI bus protocols. The SCSI-bus adapter 130 interfaces to the SCSI bus 116 using the SCSI bus protocol that will be described, in part, below. The SCSI-bus adapter 130 exchanges commands and data with SCSI controllers (not shown) that are generally embedded in each mass storage device 124–126, or SCSI device, connected to the SCSI bus. The SCSI controller is a hardware/firmware component that interprets and responds to SCSI commands received from a SCSI adapter via the SCSI bus and that implements the SCSI commands by interfacing with, and controlling, logical devices. A logical device may correspond to one or more physical devices or to portions of one or more physical devices. Physical devices include data storage devices such as disk, tape and CD-ROM drives.

Two important types of commands, called I/O commands, direct the SCSI device to read data from a logical device and write data to a logical device. An I/O transaction is the exchange of data between two components of the computer system, generally initiated by a processing component, such as the CPU 102, that is implemented, in part, by a read I/O command or by a write I/O command. Thus, I/O transactions include read I/O transactions and write I/O transactions.

The SCSI bus 116 is a parallel bus that can simultaneously transport a number of data bits. The number of data bits that can be simultaneously transported by the SCSI bus is referred to as the width of the bus. Different types of SCSI buses have widths of 8, 16 and 32 bits. The 16 and 32-bit SCSI buses are referred to as wide SCSI buses.

As with all computer buses and processors, the SCSI bus is controlled by a clock that determines the speed of operations and data transfer on the bus. SCSI buses vary in clock speed up to 20 MHz. The combination of the width of a SCSI bus and the clock rate at which the SCSI bus operates determines the number of bytes that can be transported through the SCSI bus per second, called the bandwidth. Different types of SCSI buses have bandwidths ranging from less than 2 megabytes ("Mbytes") per second up to 40 Mbytes per second, with increases to 80 Mbytes per second and possibly 160 Mbytes per second planned for the future.

Figure 2:
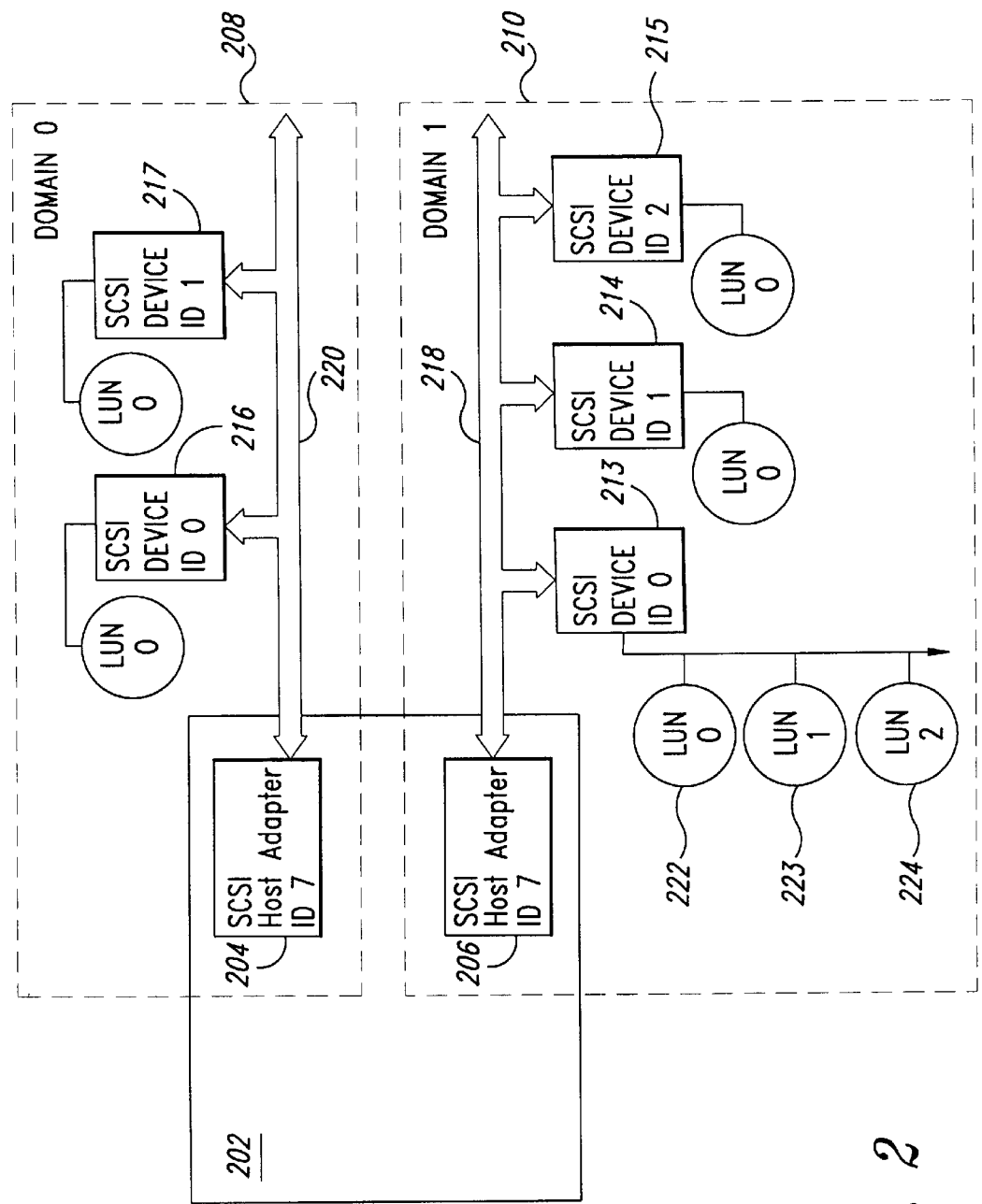
FIG. 2 illustrates the SCSI bus topology.

FIG. 2 illustrates the SCSI bus topology. A computer system 202, or other hardware system, may include one or more SCSI-bus adapters 204 and 206. The SCSI-bus adapter, the SCSI bus which the SCSI-bus adapter controls, and any peripheral devices attached to that SCSI bus together comprise a domain. SCSI-bus adapter 204 in FIG. 2 is associated with a first domain 208 and SCSI-bus adapter 206 is associated with a second domain 210. The most current SCSI-2 bus implementation allows fifteen different SCSI devices 213–215 and 216–217 to be attached to a single SCSI bus. In FIG. 2, SCSI devices 213–215 are attached to SCSI bus 218 controlled by SCSI-bus adapter 206, and SCSI devices 216–217 are attached to SCSI bus 220 controlled by SCSI-bus adapter 204. Each SCSI-bus adapter and SCSI device has a SCSI identification number, or SCSI_ID, that uniquely identifies the device or adapter in a particular SCSI bus. By convention, the SCSI-bus adapter has SCSI_ID 7, and the SCSI devices attached to the SCSI bus have SCSI_IDs ranging from 0 to 6 and from 8 to 15. A SCSI device, such as SCSI device 213, may interface with a number of logical devices, each logical device comprising portions of one or more physical devices. Each logical device is identified by a logical unit number ("LUN") that uniquely identifies the logical device with respect to the SCSI device that controls the logical device. For example, SCSI device 213 controls logical devices 222–224 having LUNs 0, 1, and 2, respectively. According to SCSI terminology, a device that initiates an I/O command on the SCSI bus is called an initiator, and a SCSI device that receives an I/O command over the SCSI bus that directs the SCSI device to execute an I/O operation is called a target.

In general, a SCSI-bus adapter, such as SCSI-bus adapters 204 and 206, initiates I/O operations by sending commands to target devices. The target devices 213–215 and 216–217 receive the I/O commands from the SCSI bus. The target devices 213–215 and 216–217 then implement the commands by interfacing with one or more logical devices that they control to either read data from the logical devices and return the data through the SCSI bus to the initiator or to write data received through the SCSI bus from the initiator to the logical devices. Finally, the target devices 213–215 and 216–217 respond to the initiator through the SCSI bus with status messages that indicate the success or failure of implementation of the commands.

FIGS. 3A–3C illustrate the SCSI protocol involved in the initiation and implementation of read and write I/O operations. Read and write I/O operations compose the bulk of I/O operations performed by SCSI devices. Efforts to maximize the efficiency of operation of a system of mass storage devices interconnected by a SCSI bus are most commonly directed toward maximizing the efficiency at which read and write I/O operations are performed. Thus, in the discussions to follow, the architectural features of various hardware devices will be discussed in terms of read and write operations.

FIG. 3A shows the sending of a read or write I/O command by a SCSI initiator, most commonly a SCSI-bus adapter, to a SCSI target, most commonly a SCSI controller embedded in a SCSI device associated with one or more logical devices. The sending of a read or write I/O command is called the command phase of a SCSI I/O operation. FIG. 3A is divided into initiator 302 and target 304 sections by a central vertical line 306. Both the initiator and the target sections include columns entitled "state" 306 and 308 that describe the state of the SCSI bus and columns entitled "events" 310 and 312 that describe the SCSI bus events associated with the initiator and the target, respectively. The bus states and bus events involved in the sending of the I/O command are ordered in time, descending from the top of FIG. 3A to the bottom of FIG. 3A. FIGS. 3B–3C also adhere to this above-described format.

The sending of an I/O command from an initiator SCSI-bus adapter to a target SCSI device, illustrated in FIG. 3A, initiates a read or write I/O operation by the target SCSI device. Referring to FIG. 1, the SCSI-bus adapter 130 initiates the I/O operation as part of an I/O transaction. Generally, the SCSI-bus adapter 130 receives a read or write command via the PCI bus 112, system controller 104, and CPU bus 106, from the CPU 102 directing the SCSI-bus adapter to perform either a read operation or a write operation. In a read operation, the CPU 102 directs the SCSI-bus adapter 130 to read data from a mass storage device 124–126 and transfer that data via the SCSI bus 116, PCI bus 112, system controller 104, and memory bus 110 to a location within the system memory 108. In a write operation, the CPU 102 directs the system controller 104 to transfer data from the system memory 108 via the memory bus 110, system controller 104, and PCI bus 112 to the SCSI-bus adapter 130, and directs the SCSI-bus adapter 130 to send the data via the SCSI bus 116 to a mass storage device 124–126 on which the data is written.

FIG. 3A starts with the SCSI bus in the BUS FREE state 314, indicating that there are no commands or data currently being transported on the SCSI device. The initiator, or SCSI-bus adapter, asserts the BSY, D7 and SEL signal lines of the SCSI bus in order to cause the bus to enter the ARBITRATION state 316. In this state, the initiator announces to all of the devices an intent to transmit a command on the SCSI bus. Arbitration is necessary because only one device may control operation of the SCSI bus at any instant in time. Assuming that the initiator gains control of the SCSI bus, the initiator then asserts the ATN signal line and the DX signal line corresponding to the target SCSI_ID in order to cause the SCSI bus to enter the SELECTION state 318. The initiator or target asserts and drops various SCSI signal lines in a particular sequence in order to effect a SCSI bus state change, such as the change of state from the ARBITRATION state 316 to the SELECTION state 318, described above. These sequences can be found in Schmidt and in the ANSI standards, and will therefore not be further described below.

When the target senses that the target has been selected by the initiator, the target assumes control 320 of the SCSI bus in order to complete the command phase of the I/O operation. The target then controls the SCSI signal lines in order to enter the MESSAGE OUT state 322. In a first event that occurs in the MESSAGE OUT state, the target receives from the initiator an IDENTIFY message 323. The IDENTIFY message 323 contains a LUN field 324 that identifies the LUN to which the command message that will follow is addressed. The IDENTIFY message 323 also contains a flag 325 that is generally set to indicate to the target that the target is authorized to disconnect from the SCSI bus during the target's implementation of the I/O command that will follow. The target then receives a QUEUE TAG message 326 that indicates to the target how the I/O command that will follow should be queued, as well as providing the target with a queue tag 327. The queue tag is a byte that identifies the I/O command. A SCSI-bus adapter can therefore concurrently manage 256 different I/O commands per LUN. The combination of the SCSI_ID of the initiator SCSI-bus adapter, the SCSI_ID of the target SCSI device, the target LUN, and the queue tag together comprise an I_T_L_Q nexus reference number that uniquely identifies the I/O operation corresponding to the I/O command that will follow within the SCSI bus. Next, the target device controls the SCSI bus signal lines in order to enter the COMMAND state 328. In the COMMAND state, the target solicits and receives from the initiator the I/O command 330. The I/O command 330 includes an opcode 332 that identifies the particular command to be executed, in this case a read command or a write command, a logical block number 336 that identifies the logical block of the logical device that will be the beginning point of the read or write operation specified by the command, and a data length 338 that specifies the number of blocks that will be read or written during execution of the command.

When the target has received and processed the I/O command, the target device controls the SCSI bus signal lines in order to enter the MESSAGE IN state 340 in which the target device generally sends a disconnect message 342 back to the initiator device. The target disconnects from the SCSI bus because, in general, the target will begin to interact with the logical device in order to prepare the logical device for the read or write operation specified by the command. The target may need to prepare buffers for receiving data, and, in the case of disk drives or CD-ROM drives, the target device may direct the logical device to seek to the appropriate block specified as the starting point for the read or write command. By disconnecting, the target device frees up the SCSI bus for transportation of additional messages, commands, or data between the SCSI-bus adapter and the target devices. In this way, a large number of different I/O operations can be concurrently multiplexed over the SCSI bus. Finally, the target device drops the BSY signal line in order to return the SCSI bus to the BUS FREE state 344.

The target device then prepares the logical device for the read or write operation. When the logical device is ready for reading or writing data, the data phase for the I/O operation ensues. FIG. 3B illustrates the data phase of a SCSI I/O operation. The SCSI bus is initially in the BUS FREE state 346. The target device, now ready to either return data in response to a read I/O command or accept data in response to a write I/O command, controls the SCSI bus signal lines in order to enter the ARBITRATION state 348. Assuming that the target device is successful in arbitrating for control of the SCSI bus, the target device controls the SCSI bus signal lines in order to enter the RESELECTION state 350. The RESELECTION state is similar to the SELECTION state, described in the above discussion of FIG. 3A, except that it is the target device that is making the selection of a SCSI-bus adapter with which to communicate in the RESELECTION state, rather than the SCSI-bus adapter selecting a target device in the SELECTION state.

Once the target device has selected the SCSI-bus adapter, the target device manipulates the SCSI bus signal lines in order to cause the SCSI bus to enter the MESSAGE IN state 352. In the MESSAGE IN state, the target device sends both an IDENTIFY message 354 and a QUEUE TAG message 356 to the SCSI-bus adapter. These messages are identical to the IDENTITY and QUEUE TAG messages sent by the initiator to the target device during transmission of the I/O command from the initiator to the target, illustrated in FIG. 3A. The initiator may use the I_T_L_Q nexus reference number, a combination of the SCSI_IDs of the initiator and target device, the target LUN, and the queue tag contained in the QUEUE TAG message, to identify the I/O transaction for which data will be subsequently sent from the target to the initiator, in the case of a read operation, or to which data will be subsequently transmitted by the initiator, in case of a write operation. The I_T_L_Q nexus reference number is thus an I/O operation handle that can be used by the SCSI-bus adapter as an index into a table of outstanding I/O commands in order to locate the appropriate buffer for receiving data from the target device, in case of a read, or for transmitting data to the target device, in case of a write.

After sending the IDENTIFY and QUEUE TAG messages, the target device controls the SCSI signal lines in order to transition to a DATA state 358. In the case of a read I/O operation, the SCSI bus will transition to the DATA IN state. In the case of a write I/O operation, the SCSI bus will transition to a DATA OUT state. During the time that the SCSI bus is in the DATA state, the target device will transmit, during each SCSI bus clock cycle, a data unit having a size, in bits, equal to the width of the particular SCSI bus on which the data is being transmitted. In general, there is a SCSI bus signal line handshake involving the signal lines ACK and REQ as part of the transfer of each unit of data. In the case of a read I/O command, for example, the target device places the next data unit on the SCSI bus and asserts the REQ signal line. The initiator senses assertion of the REQ signal line, retrieves the transmitted data from the SCSI bus, and asserts the ACK signal line to acknowledge receipt of the data. This type of data transfer is called asynchronous transfer. The SCSI bus protocol also allows for the target device to transfer a certain number of data units prior to receiving the first acknowledgment from the initiator. In this transfer mode, called synchronous transfer, the latency between the sending of the first data unit and receipt of acknowledgment for that transmission is avoided. During data transmission, the target device can interrupt the data transmission by sending a SAVE POINTERS message followed by a DISCONNECT message to the initiator and then controlling the SCSI bus signal lines to enter the BUS FREE state. This allows the target device to pause in order to interact with the logical devices which the target device controls before receiving or transmitting further data. After disconnecting from the SCSI bus, the target device may then later again arbitrate for control of the SCSI bus and send additional IDENTIFY and QUEUE TAG messages to the initiator so that the initiator can resume data reception or transfer at the point that the initiator was interrupted. An example of disconnect and reconnect 360 are shown in FIG. 3B interrupting the DATA state 358. Finally, when all the data for the I/O operation has been transmitted, the target device controls the SCSI signal lines in order to enter the MESSAGE IN state 362, in which the target device sends a DISCONNECT message to the initiator, optionally preceded by a SAVE POINTERS message. After sending the DISCONNECT message, the target device drops the BSY signal line so the SCSI bus transitions to the BUS FREE state 364.

Following the transmission of the data for the I/O operation, as illustrated in FIG. 3B, the target device returns a status to the initiator during the status phase of the I/O operation. FIG. 3C illustrates the status phase of the I/O operation. As in FIGS. 3A–3B, the SCSI bus transitions from the BUS FREE state 366 to the ARBITRATION state 368, RESELECTION state 370, and MESSAGE IN state 372, as in FIG. 3B. Following transmission of an IDENTIFY message 374 and QUEUE TAG message 376 by the target to the initiator during the MESSAGE IN state 372, the target device controls the SCSI bus signal lines in order to enter the STATUS state 378. In the STATUS state 378, the target device sends a single status byte 384 to the initiator to indicate whether or not the I/O command was successfully completed. In FIG. 3C, the status byte 380 corresponding to a successful completion, indicated by a status code of 0, is shown being sent from the target device to the initiator. Following transmission of the status byte, the target device then controls the SCSI bus signal lines in order to enter the MESSAGE IN state 382, in which the target device sends a COMMAND COMPLETE message 384 to the initiator. At this point, the I/O operation has been completed. The target device then drops the BSY signal line so that the SCSI bus returns to the BUS FREE state 386. The SCSI-bus adapter can now finish its portion of the I/O command, free up any internal resources that were allocated in order to execute the command, and return a completion message or status back to the CPU via the PCI bus.

SCSI Bus Limitations

The processing power of CPUs, and the computer systems that contain them, has continued to double on the average of every two years over the past twenty years. The performance of mass storage devices and computer bus interconnections between mass storage devices and CPUs has not increased at the same rate. As a result, many modern computer systems are limited in speed of processing by the speed at which data can be accessed and transported between memory and peripheral devices, such as hard disk drives. As computer applications have increased in scope and size, more and more data can be processed and organized by a given computer application. Such applications may be limited by the amount of data that they can efficiently access. The first limitation is a bandwidth limitation, and the second limitation is a data accessibility limitation.

Figure 4:
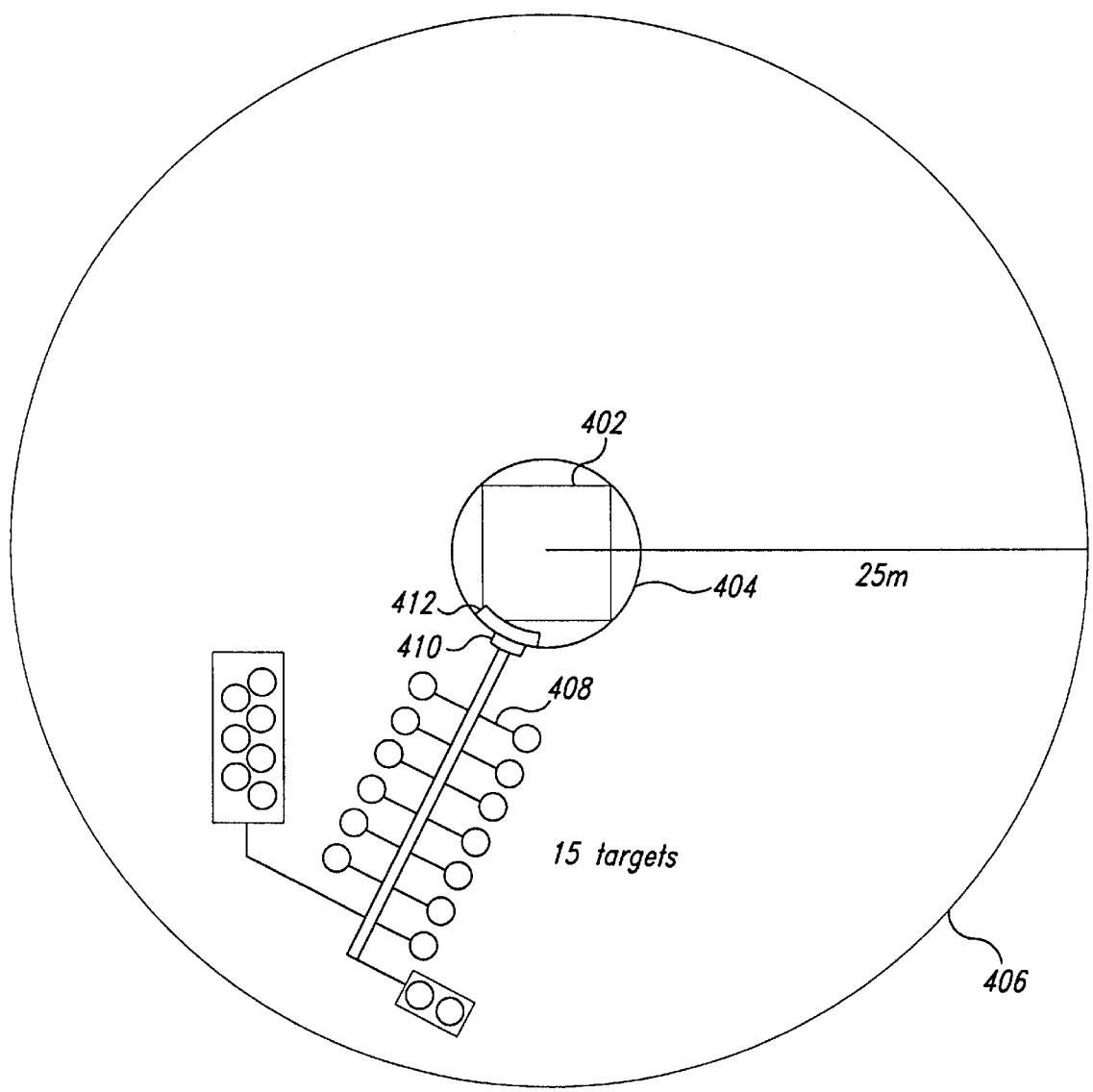
FIG. 4 illustrates a number of limitations imposed by the SCSI bus architecture.

FIG. 4 illustrates limitations imposed by the SCSI bus architecture. In FIG. 4, a square box representing a computer system 402 is shown centered within two concentric circles 404 and 406. The inner circle 404 represents a connection and bandwidth limitation imposed by the SCSI bus architecture. The inner circle 404 schematically represents a limited connection capacity of the computer 402 to SCSI buses. A SCSI bus, such as SCSI bus 408 in FIG. 4, is controlled by a SCSI-bus adapter 410 that interfaces to an internal bus within the computer system 412. A given internal bus can support only a relatively small number of SCSI-bus adapters. The number of adapters that can be supported is limited by the physical size of the SCSI-bus adapters and the internal buses, as well as by bandwidth constraints of the internal buses themselves. Higher-performance computer systems employ complex tiered hierarchies of internal buses in order to provide greater connectivity, but such tiered hierarchies themselves impose additional inefficiencies and bottlenecks. The outer circle 406 represents a spatial limitation imposed by the SCSI bus architecture. The maximum length allowed for different types of SCSI buses varies from less than a meter up to approximately 25 meters. This length constraint imposed by the maximum allowable length of a SCSI bus greatly limits the number of logical devices that can be directly attached to a particular computer system, thereby limiting the data accessibility of the computer system. An additional data accessibility limitation imposed by the SCSI bus architecture is that only fifteen target devices can be interconnected using a single SCSI bus. Recognition of these above-described constraints within the computer industry has led to the development of new interconnection methodologies based on the Fibre Channel data communication system.

Fibre Channel

Figure 5:
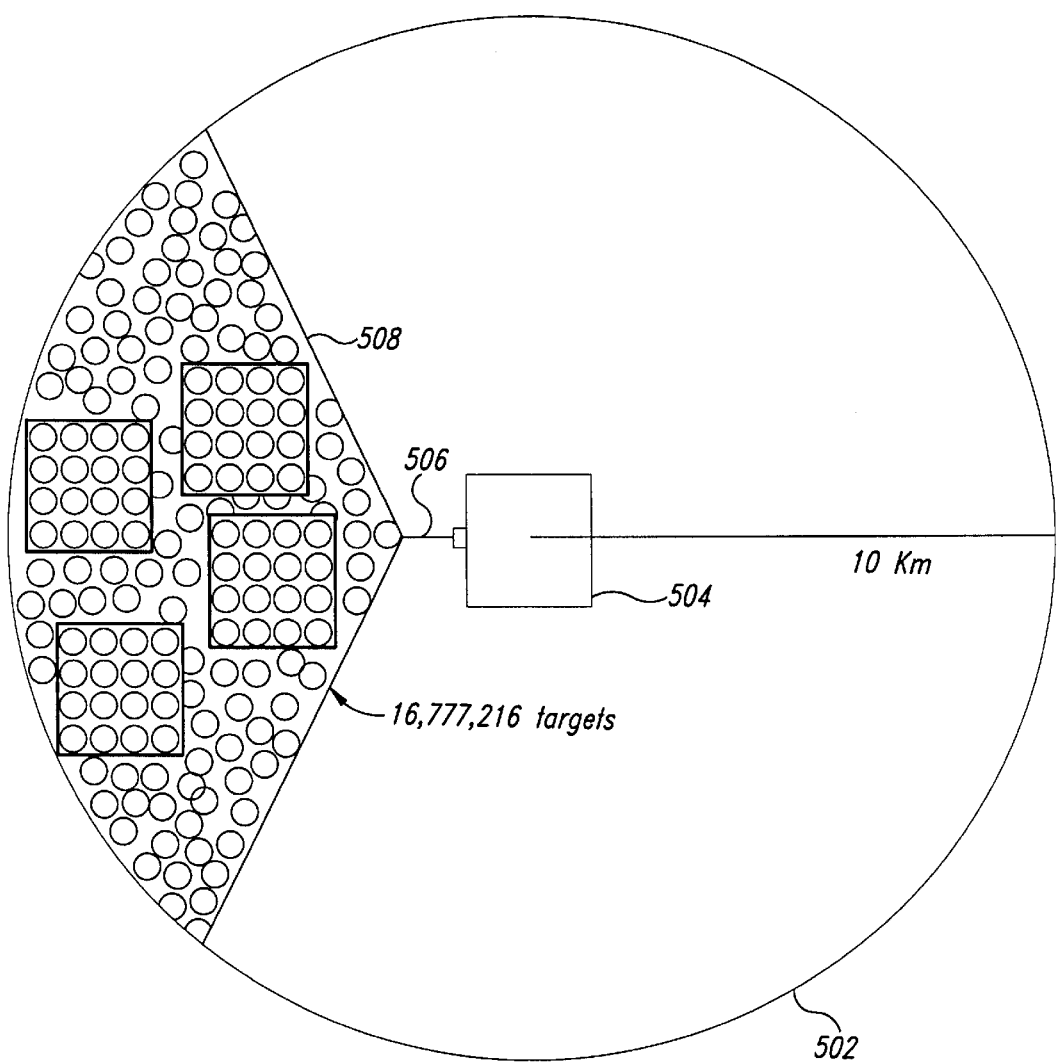
FIG. 5 illustrates the relaxation of the constraints imposed by the SCSI bus architecture made possible by the new Fibre Channel technology.

FIG. 5 illustrates the relaxation of the constraints imposed by the SCSI bus architecture made possible by the new Fibre Channel technology. The Fibre Channel ("FC") is an architecture and protocol for data communications between FC ports interconnected by one or more of shielded twisted pair connections, coaxial cable, and optical fibres. Each FC port is associated with an FC host adapter, analogous in function to the above-discussed SCSI adapters. When optical fibres are employed, an FC network can extend for ten kilometers, as indicated in FIG. 5 by the large circle 502, within which the representation of the computer system 504 is inscribed. The FC technology greatly reduces the connectivity and density constraints imposed by the SCSI bus architecture. A single FC host adapter 506 can transmit data at up to 200 Mbytes per second. Whereas the SCSI bus supports connection of up to fifteen target devices, a FC network can support connection of more than 16,000,000 target devices 508. By vastly increasing target addressability and the physical distances from the computer system at which target devices can be located, FC networks can theoretically eliminate the data accessability constraints currently imposed by the SCSI bus architecture.

Figure 6:
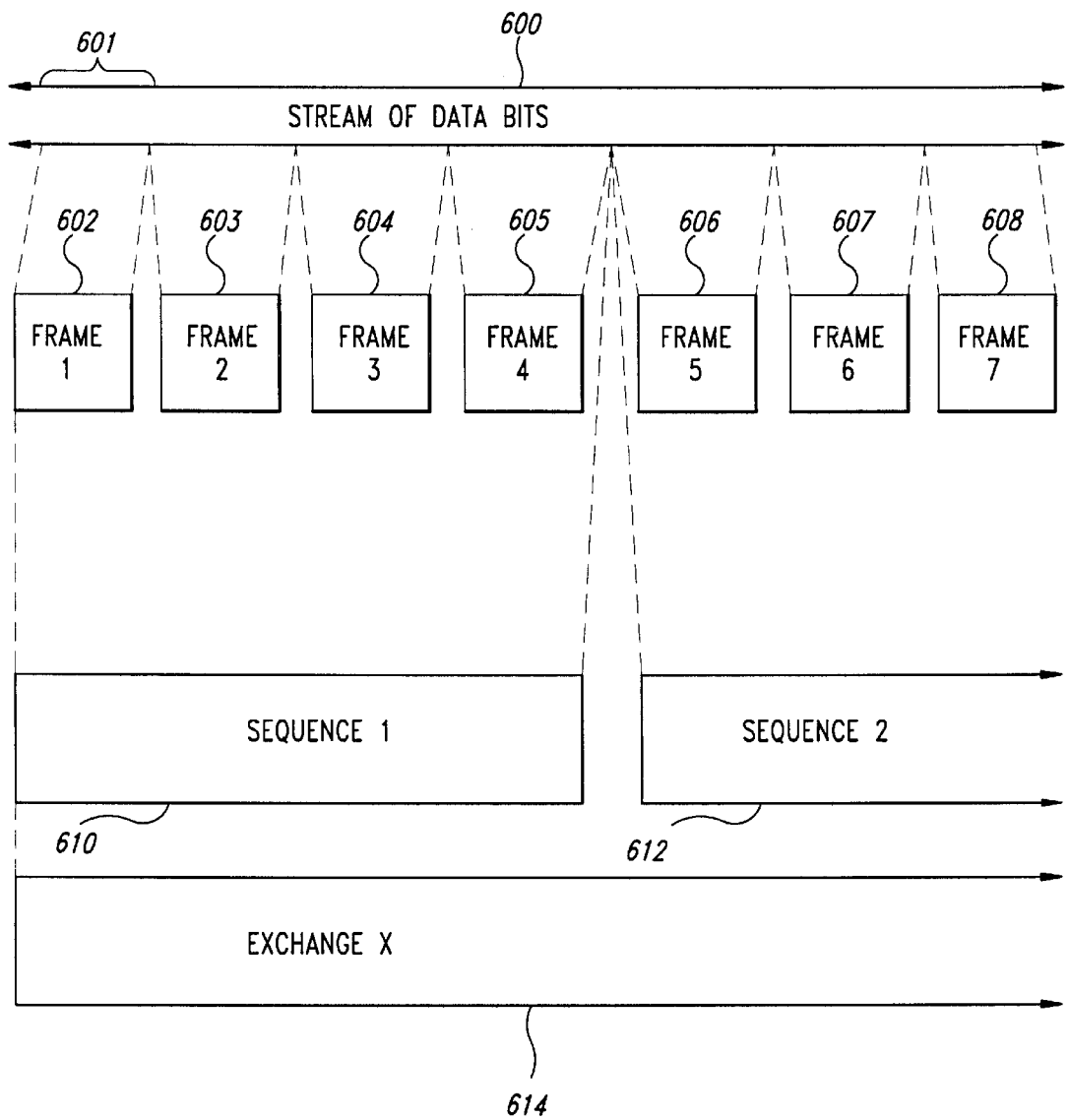
FIG. 6 illustrates an organizational hierarchy of data transferred through a Fibre Channel network.

The FC is a serial communications medium, rather than a parallel medium such as the SCSI bus. Data is transferred one bit at a time at extremely high transfer rates. FIG. 6 illustrates a very simple hierarchy by which data is organized, in time, for transfer through an FC network. At the lowest conceptual level at which the data can be considered is a stream of data bits 600. The smallest unit of data, or grouping of data bits, supported by an FC network is a flame. Seven frames 602–608 are shown in FIG. 6. A frame may be composed of between 36 and 2,148 bytes of data, depending on the nature of the data included in the frame. The first FC frame, for example, corresponds to the data bits of the stream of data bits 600 encompassed by the horizontal bracket 601. The FC protocol ("FCP") specifies a next higher organizational level called the sequence. A first sequence 610 and a portion of a second sequence 612 are displayed in FIG. 6. The first sequence 610 is composed of frames one through four 602–605. The second sequence 612 is composed of frames five through seven 606–608 and additional frames not shown. The FC protocol specifies a third organizational level called the exchange. A portion of an exchange 614 is shown in FIG. 6. This exchange 614 is composed of at least the first sequence 610 and the second sequence 612 shown in FIG. 6. This exchange can alternatively be viewed as being composed of frames one through seven 602–608, and any additional frames contained in the second sequence 612 and in any additional sequences that compose the exchange 614.

The FC is a full duplex data transmission medium. Frames and sequences can be simultaneously passed in both directions between an initiator and a target. An exchange comprises all sequences, and frames within the sequences, exchanged between an initiator and a target during a single I/O transaction, such as a read I/O transaction or a write I/O transaction. The SCSI bus architecture concepts of an initiator and target are carried forward in the FCP that was designed to encapsulate SCSI commands and data exchanges for transport through the FC. Other types of protocols may be used on the FC, including the Internet protocol ("IP"). Thus, the FC can support the master-slave type communications paradigm characteristic of the SCSI bus and other peripheral interconnection buses, as well as the relatively open and unstructured communication protocols such as those used to implement the Internet. The discussion below will relate only to the FCP on the FC and to the SCSI protocol discussed above.

FIG. 7 shows the contents of a standard FC frame. The FC frame 702 comprises five high level sections 704, 706, 708, 710 and 712. The first high level section, called the start-of-frame deliminator 704, comprises 4 bytes that mark the beginning of the frame. The next high level section, called frame header 706, comprises 24 bytes that contain addressing information, sequence information, exchange information, and various control flags. A more detailed view of the frame header 714 is shown expanded from the FC frame 702 in FIG. 7. The destination identifier ("ID"), or DESTINATION_ID 716, is a 24-bit FC address indicating the destination FC port for the frame. The SOURCE_ID 718 is a 24-bit address that indicates the FC port that transmitted the frame. The originator ID, or OX_ID 720, and the responder ID 722, or RX_ID, together compose a 32-bit exchange ID that identifies the exchange to which the frame belongs with respect to the originator, or initiator, and responder, or target, FC ports. The sequence ID, or SEQ_ID, 724 identifies the sequence to which the frame belongs. The next high level section 708, called the data payload, contains the actual data packaged within the FC frame. This data can be formatted according to four basic types of data payload layouts 726–729. The first of these formats 726, called the FCP_CMND; is used to send a SCSI command from an initiator to a target. The FCP_LUN field 730 comprises an 8-byte address that may, in certain implementations, specify a particular SCSI-bus adapter, a target device associated with that SCSI-bus adapter, and a LUN corresponding to a logical device associated with the specified target SCSI device that together represent the target for the FCP_CMND. In other implementations, the FCP_LUN field 730 contains an index or reference number that can be used by the target FC host adapter to determine the SCSI-bus adapter, a target device associated with that SCSI-bus adapter, and a LUN corresponding to a logical device associated with the specified target SCSI device. An actual SCSI command, such as the read and write I/O command 330 illustrated in FIG. 3A, is contained within the 16-byte field FCP_CDB 732.

The second type of data payload format 727 shown in FIG. 7 is called the FCP_XFER_RDY layout. This data payload format is used to transfer a proceed command from the target to the initiator when the target is prepared to begin receiving or sending data. The third type of data payload format 728 shown in FIG. 7 is the FCP_DATA format, used for transferring the actual data that is being read or written as a result of execution of an I/O transaction. The final data payload format 729 shown in FIG. 7 is called the FCP_RSP layout, used to transfer the SCSI status byte 734, as well as other FCP status information, from the target back to the initiator upon completion of the I/O transaction.

Figure 8A:
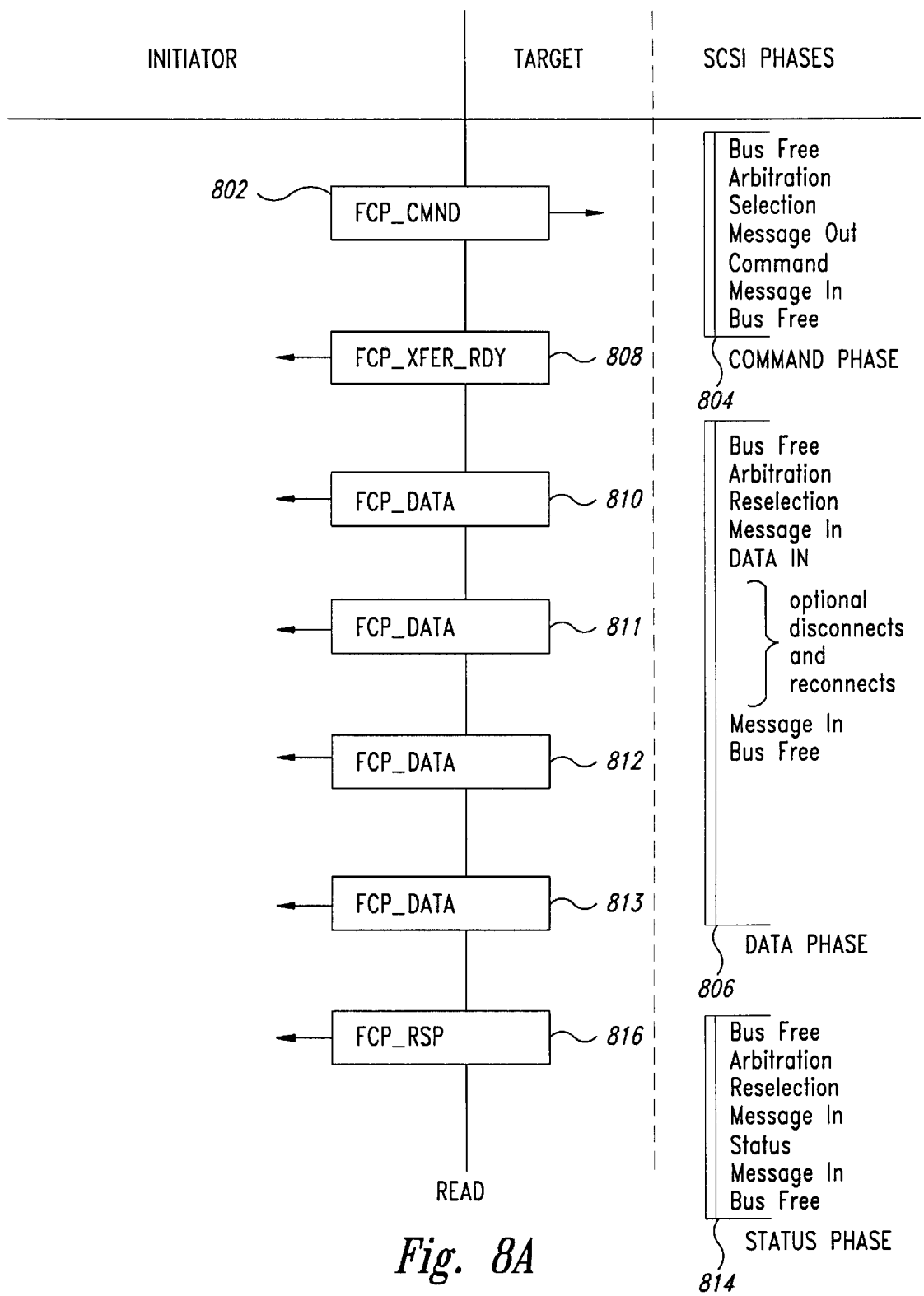
FIGS. 8A and 8B illustrate a mapping of FC sequences exchanged between an initiator and target and the SCSI bus phases and states described in FIGS. 3A–3C.
Figure 8B:
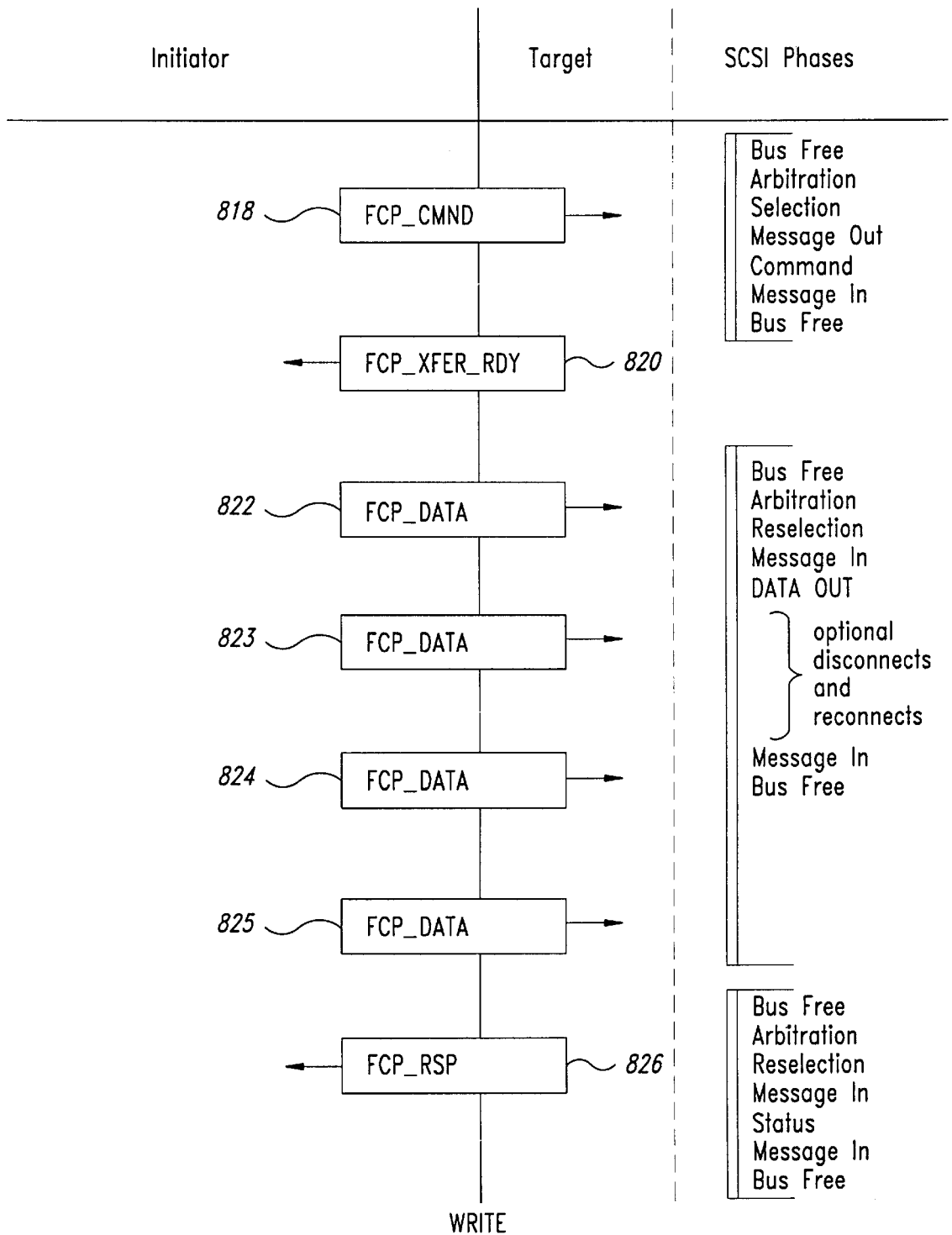

FIGS. 8A and 8B illustrate a mapping of FCP sequences exchanged between an initiator and target and the SCSI bus phases and states described in FIGS. 3A–3C. In FIGS. 8A–8B, the target SCSI adapter is assumed to be packaged together with an FCP host adapter, so that the target SCSI adapter can communicate with the initiator via the FC and with a target SCSI device via the SCSI bus. FIG. 8A shows a mapping between FCP sequences and SCSI phases and states for a read I/O transaction. The transaction is initiated when the initiator sends a single-frame FCP sequence containing a FCP_CMND data payload through the FC to a target SCSI adapter 802. When the target SCSI-bus adapter receives the FCP_CMND frame, the target SCSI-bus adapter proceeds through the SCSI states of the command phase illustrated in FIG. 3A 804, including ARBITRATION, RESELECTION, MESSAGE OUT, COMMAND, and MESSAGE IN. At the conclusion of the command phase, as illustrated in FIG. 3A, the SCSI device that is the target of the I/O transaction disconnects from the SCSI bus in order to free up the SCSI bus while the target SCSI device prepares to execute the transaction. Later, the target SCSI device rearbitrates for SCSI bus control and begins the data phase of the I/O transaction 806. At this point, the SCSI-bus adapter may send a FCP_XFER_RDY single-frame sequence 808 back to the initiator to indicate that data transmission can now proceed. In the case of a read I/O transaction, the FCP_XFER_RDY single-frame sequence is optional. As the data phase continues, the target SCSI device begins to read data from a logical device and transmit that data over the SCSI bus to the target SCSI-bus adapter. The target SCSI-bus adapter then packages the data received from the target SCSI device into a number of FCP_DATA frames that together compose the third sequence of the exchange corresponding to the I/O read transaction, and transmits those FCP_DATA frames back to the initiator through the FC. When all the data has been transmitted, and the target SCSI device has given up control of the SCSI bus, the target SCSI device then again arbitrates for control of the SCSI bus to initiate the status phase of the I/O transaction 814. In this phase, the SCSI bus transitions from the BUS FREE state through the ARBITRATION, RESELECTION, MESSAGE IN, STATUS, MESSAGE IN and BUS FREE states, as illustrated in FIG. 3C, in order to send a SCSI status byte from the target SCSI device to the target SCSI-bus adapter. Upon receiving the status byte, the target SCSI-bus adapter packages the status byte into a FCP_RSP single-frame sequence 816 and transmits the FCP_RSP single-frame sequence back to the initiator through the FC. This completes the read I/O transaction.

In many computer systems, there may be additional internal computer buses, such as a PCI bus, between the target FC host adapter and the target SCSI-bus adapter. In other words, the FC host adapter and SCSI adapter may not be packaged together in a single target component. That additional interconnection is not shown in FIGS. 8A–8B in the interest of simplicity.

FIG. 8B shows, in similar fashion to FIG. 8A, a mapping between FCP sequences and SCSI bus phases and states during a write I/O transaction. FIG. 8B differs from FIG. 8A only in the fact that, during a write transaction, the FCP_DATA frames are transmitted from the initiator to the target over the FCP 822–825 and the FCP_XFER_RDY single-frame sequence sent from the target to the initiator 820 is not optional, as in the case of the read I/O transaction, but is instead mandatory.

FC/SCSI-Bus Multiplexers

Although the FC technology greatly expands data accessibility and connectivity, and somewhat increases the bandwidth capabilities for communications, as illustrated in FIG. 5, computer systems, for a number of reasons, continue to include mass storage devices compatible only with the SCSI bus. First, the FC technology is relatively new, and there are fewer types of mass storage devices that are FC compatible on the market than devices compatible only with the SCSI bus. Moreover, FC compatible devices are generally more expensive then their SCSI-compatible counterparts. The SCSI bus is a well-known and mature technology and the various components used to implement the SCSI bus architecture have been produced for some time. Finally, computer users have expended relatively large amounts of money on SCSI devices, which are not compatible to the FC, but which contain valuable data and which may perform, from the standpoint of data capacity and bandwidth, as well as their FC compatible counterparts. For all of these reasons, computer users, system designers, and computer system administrators desire to continue using the SCSI compatible mass storage devices while, at the same time, incorporating the FC technology as a backbone communications mechanism within their computer systems. For this reason, a number of computer hardware vendors have produced FC/SCSI-bus multiplexers that contain one or more FC port/FC host adapters interconnected to a number of SCSI-bus adapters that each control a different SCSI bus.

Figure 9:
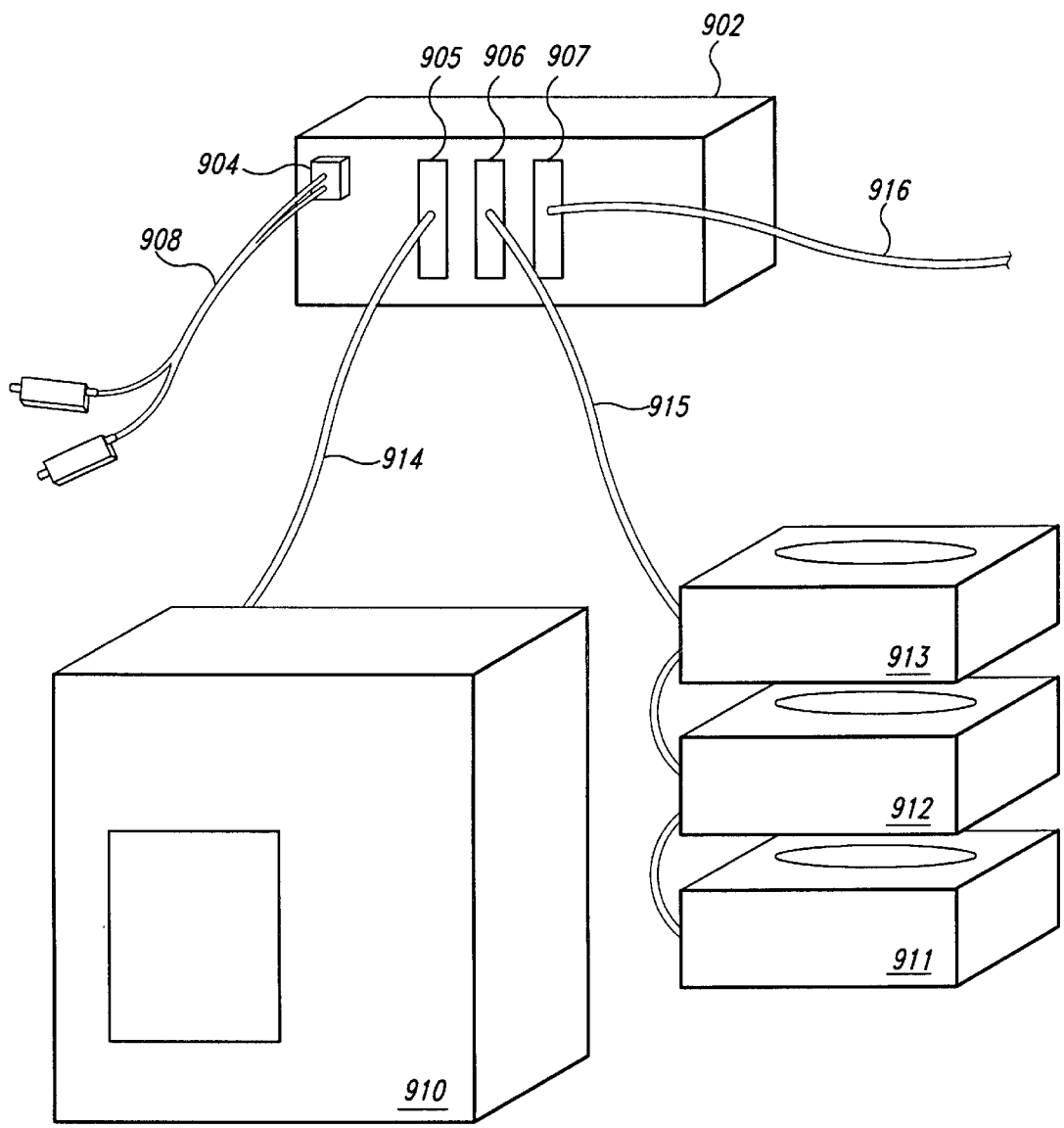
FIG. 9 illustrates a FC/SCSI-bus multiplexer.

FIG. 9 illustrates a FC/SCSI-bus multiplexer. The FC/SCSI-bus multiplexer 902 provides an FC port 904 that is associated internally with an FC host adapter, and a number of SCSI ports 905–907, each associated internally with a SCSI-bus adapter. The FC/SCSI-bus multiplexer can be connected to an FC network via an optical connector 908. Various mass storage devices 910–913 are connected to external SCSI bus cables 914–916 that are, in turn, connected to the SCSI ports 905–907 provided by the FC/SCSI-bus multiplexer 902. The mass storage devices may include large storage arrays such as redundant array of independent disks ("RAID") arrays, as well as multi-platter hard disk drives 911–913 and any number of other types of SCSI devices, including tape drives and CD-ROM drives (not shown). When the FC/SCSI-bus multiplexer is connected to an FC network, the mass storage devices connected through SCSI buses to the FC/SCSI-bus multiplexer can be accessed via the FC by remote computer systems. Thus, the FC/SCSI-bus multiplexer provides a way to combine the economic advantages of SCSI compatible mass storage devices with the high connectivity, high band width, and greatly increased physical distance of accessibility provided by the FC technology.

Figure 10:
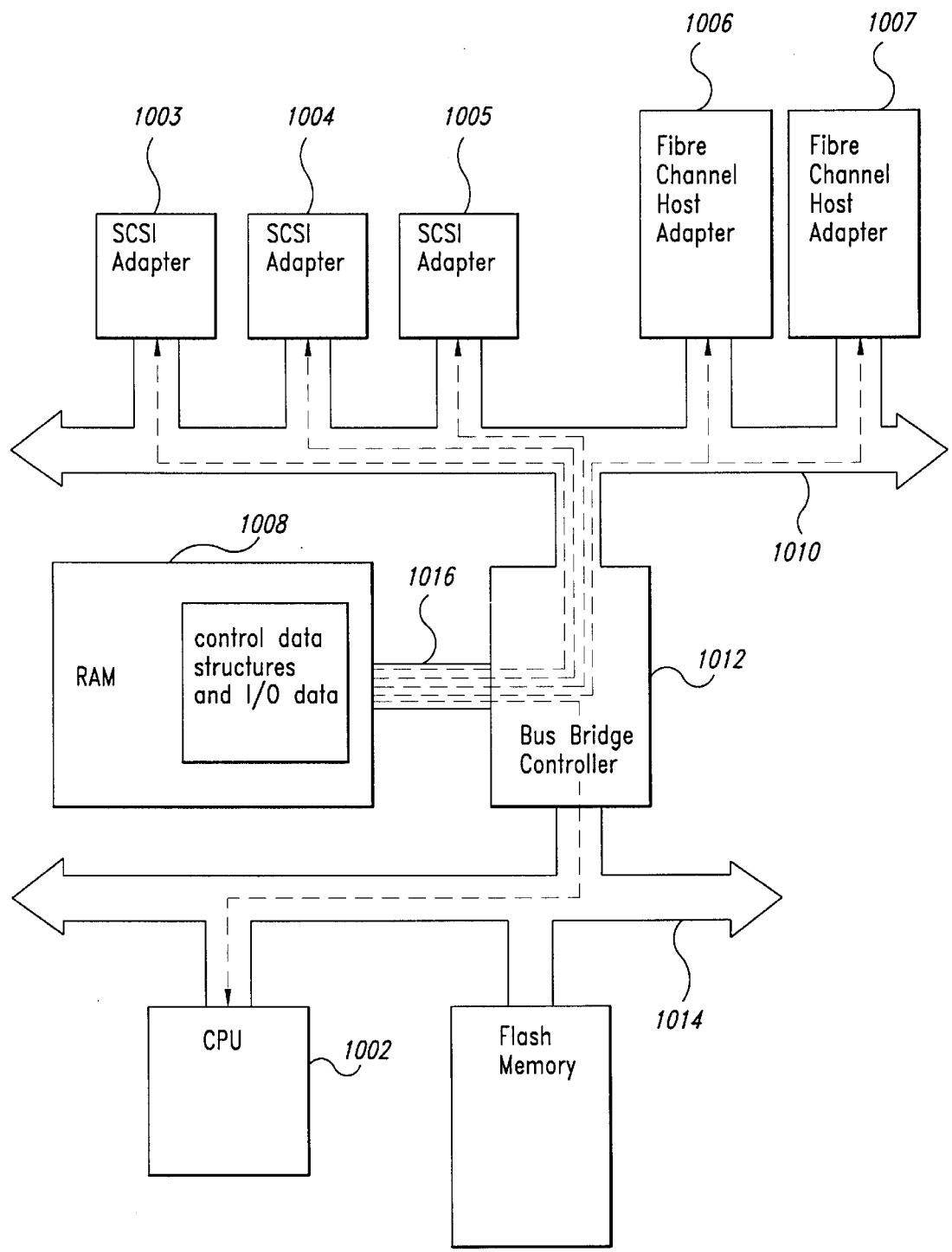
FIG. 10 is a block diagram of the architecture of a number of commonly available FC/SCSI-bus multiplexers.

FIG. 10 is a block diagram of the architecture of a number of commonly available FC/SCSI-bus multiplexers. A CPU 1002 is responsible for protocol translation between SCSI-bus adapters 1003–1005 and FC host adapters 1006–1007, as well as controlling movement of data between the SCSI-bus adapters 1003–1005 and the FC host adapters 1006–1007 via a random access memory ("RAM") 1008. Commands and data are transmitted between the CPU 1002 and the SCSI-bus adapters 1003–1005 and the FC host adapters 1006–1007 via a first internal bus 1010, a bus bridge controller 1012, and a second internal bus 1014. A third internal bus connects the bus bridge controller 1012 with the RAM 1008. The RAM 1008 is used to store various data structures used to control the SCSI-bus adapters 1003–1005 and FC host adapters 1006–1007, and also to buffer data that is exchanged between the SCSI-bus adapters and the FC host adapters.

While this architecture provides the high accessibility and connectivity characteristic of the FC, as well as access to SCSI compatible devices, the FC/SCSI-bus multiplexers implemented according to this architecture may be greatly limited in bandwidth and the efficiency of transmission of data between SCSI devices and computer systems accessing those devices over the FC. These limitations arise for several reasons. First, attaching both the FC host adapters 1006–1007 and the SCSI-bus adapters 1003–1005 to the same internal bus 1010 makes that internal bus 1010 a limiting resource for the system. Since both the SCSI-bus adapters 1003–1005 and the FC host adapters 1006 transmit and receive data through the single internal bus 1010, bus contention is high and one or more devices will often be blocked from receiving or transmitting data while another device controls the internal bus. Second, the data structures that control operation of the SCSI-bus adapters 1003–1005 and the data buffers used to store data are both located in RAM 1008, and are both written to and read from RAM 1008 by the SCSI-bus adapters 1003–1005 and the FC host adapters 1006–1007 via the internal bus 1010, the bus bridge controller 1012, and the memory bus 1016. Although write operations can be performed fairly efficiently by bus bridge controllers, read operations are considerably less efficient. Read operations result in relatively lengthy periods of time during which other devices can neither read from nor write to memory. In addition, the relatively long-duration of read operations through the bus bridge controller 1012 may result in either or both of the two internal buses 1010 and 1014 being inaccessible to other devices. Thus, the architecture displayed in FIG. 10 results in high contention for limiting resources within the FC/SCSI-bus multiplexer and concomitant low concurrency of operations.

There are a number of different aspects of data throughput with regard to an FC/SCSI-bus multiplexer. The bandwidth, or maximum rate of transfer between a mass storage device and a remote computer system, is one aspect. Another aspect is the number of I/O transactions that can be processed by the FC/SCSI-bus multiplexer within a given period of time. When data access is characterized by the reading or writing of large amounts of data during the course of a relatively small number of individual I/O transactions, then bandwidth is critically important. When data access is characterized by the reading or writing of relatively small amounts of data during the course of many I/O transactions, then the number of I/O transactions that can be processed by the FC/SCSI-bus multiplexer within a given period of time becomes critically important. A third aspect of data throughput is latency, or the period of time intervening between the issue of an I/O transaction by an initiator and the start of data transfer. High latency may cause significant loss of concurrency within the FC/SCSI-bus multiplexer, a decrease in the number of I/O transactions that can be processed by the FC/SCSI-bus multiplexer within a given period of time, and may lead to lower effective bandwidths. It is therefore a goal in designing a high-performance FC/SCSI-bus multiplexer to provide high bandwidth, efficient I/O transaction processing, and low latency for I/O transactions.

The Problem of Reading Through Bus Bridges

Figure 11A:
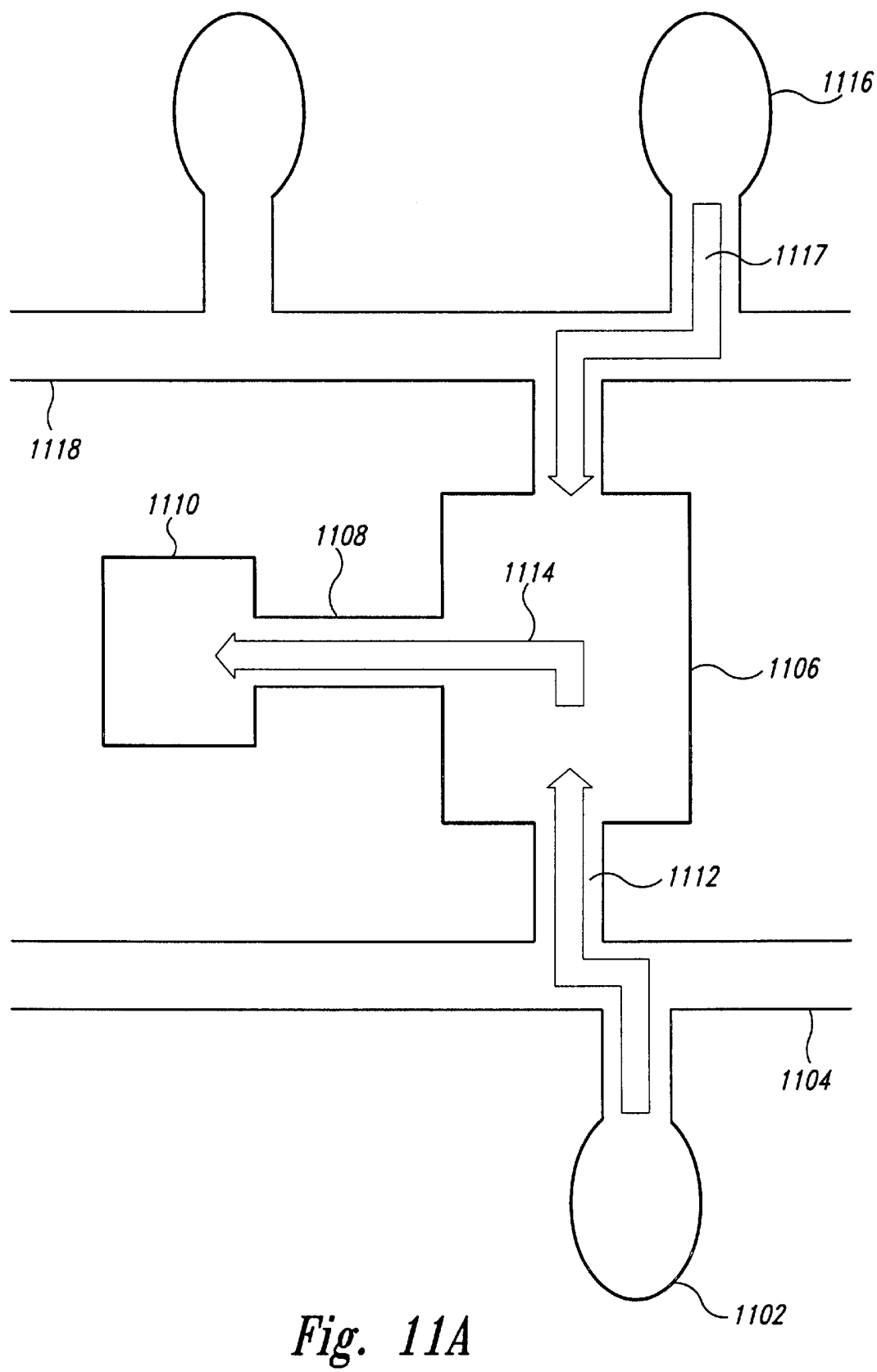
FIGS. 11A–11F schematically illustrate the inefficiencies inherent in reading data through bus bridges.

FIGS. 11A–11F schematically illustrate the inefficiencies inherent in reading data through bus bridges. In FIG. 11A, a processing component 1102 initiates a read operation via internal bus 1104, bus bridge 1106, and memory bus 1108 to read data from RAM 1110. The read operation can be decomposed into four sub-operations. In the first sub-operation 1112, the initiator processing component 1102 arbitrates for, and gains control of, the internal bus 1104. This allows the processing component 1102 to issue the read operation 1112 to the bus bridge 1106. The bus bridge then translates the read operation into a memory access command 1114 that the bus bridge issues via the memory bus 1108 to the RAM 1110. If a second processing component 1116 also issues a read or write operation 1117 over a second internal bus 1118 to the bus bridge 1106, that operation is stalled until the bus bridge 1106 completes the read operation initiated by the processor component 1102.

Figure 11B:
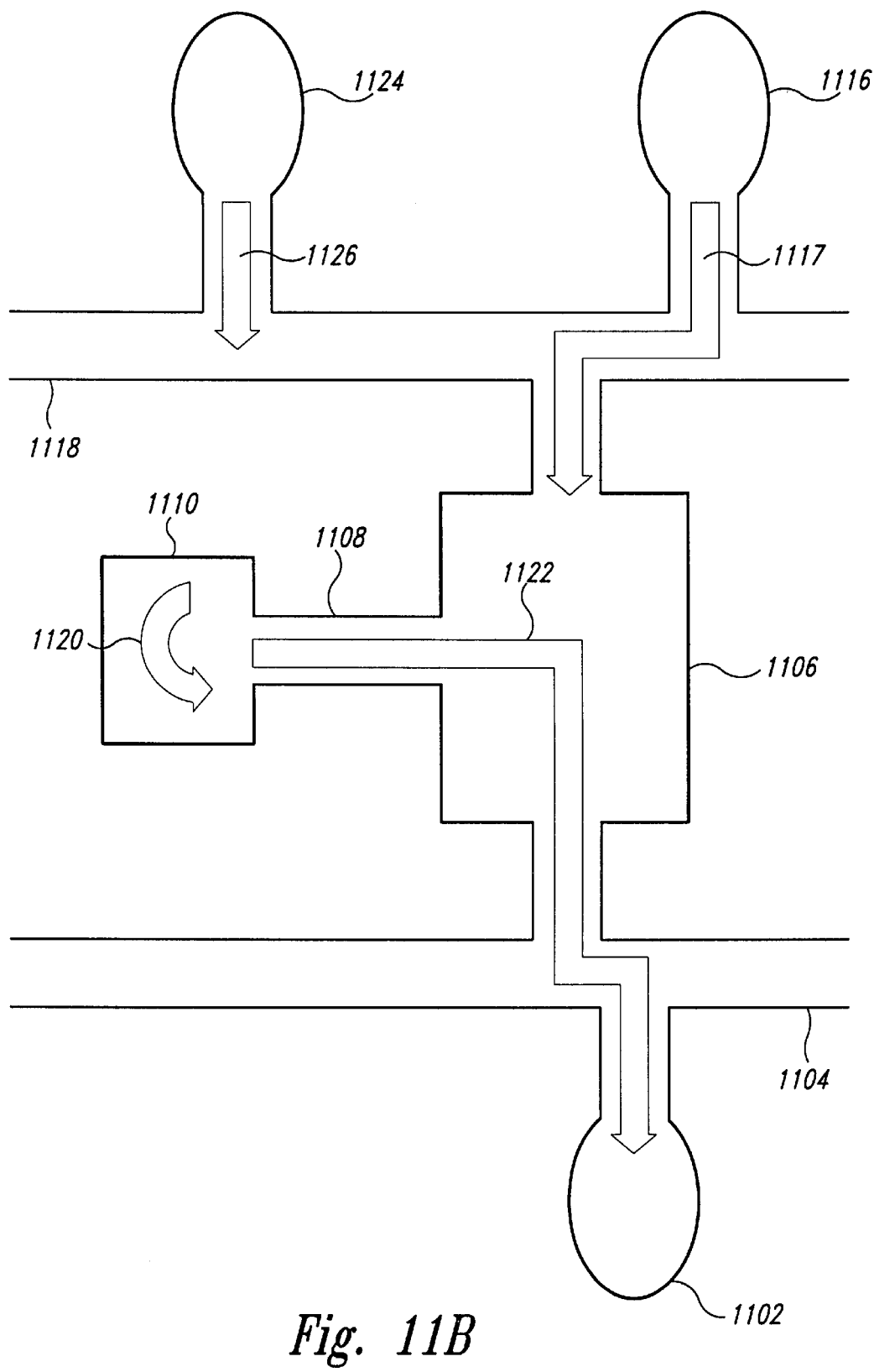

In FIG. 11B, the SRAM 1110 accesses the data 1120 to be read and then returns the data 1122 to the initiator processor component 1102 via the memory bus 1108, bus bridge 1106, and internal bus 1104. Again, while the first read operation is completing, the read or write operation 1119 issued by the second processor component 1116 remains stalled. Furthermore, if a third processor component 1124 attempts to issue a read or write operation 1126, that third processor component's operation is stalled by the inability to access the second internal bus 1118, since the bus is tied up by the second processor component's 1116 stalled read or write operation 1117. By tying up the bus bridge 1106 during the relatively lengthy series of sub-operations involved in a read operation, both internal buses are blocked for a relatively long period of time, creating a data transfer back pressure that may further impact additional processor components.

Figure 11C:
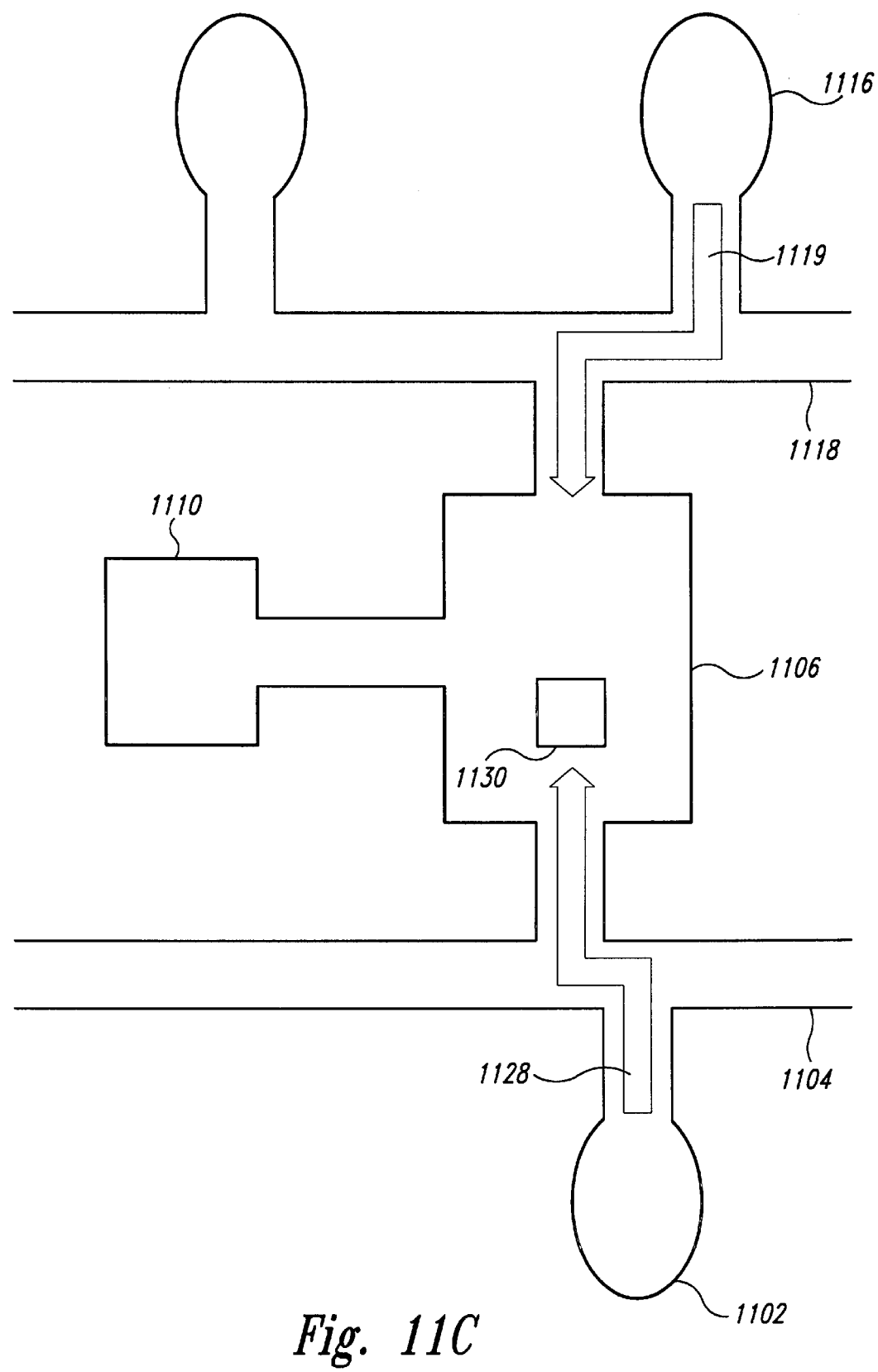
Figure 11D:
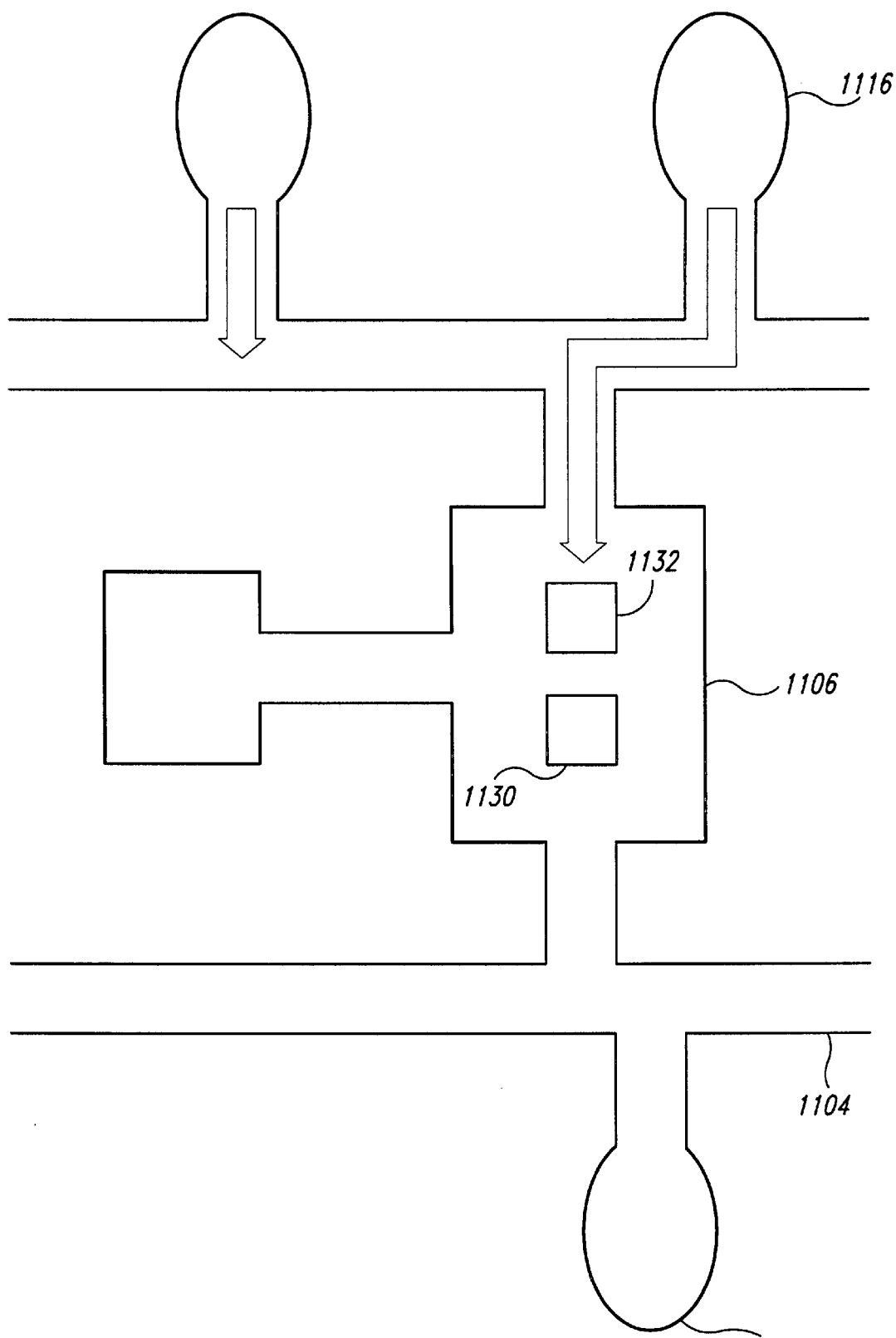
Figure 11E:
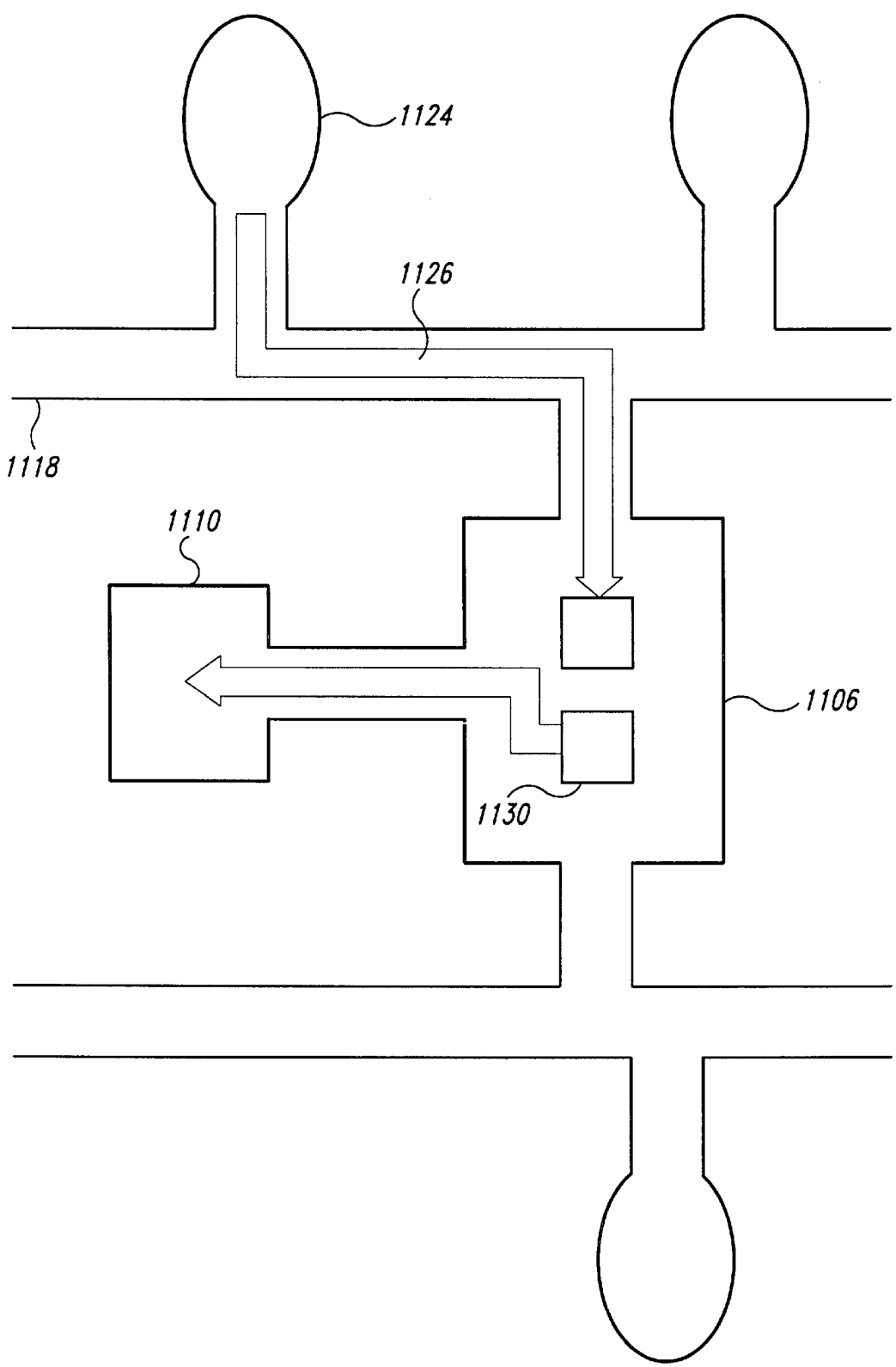
Figure 11F:
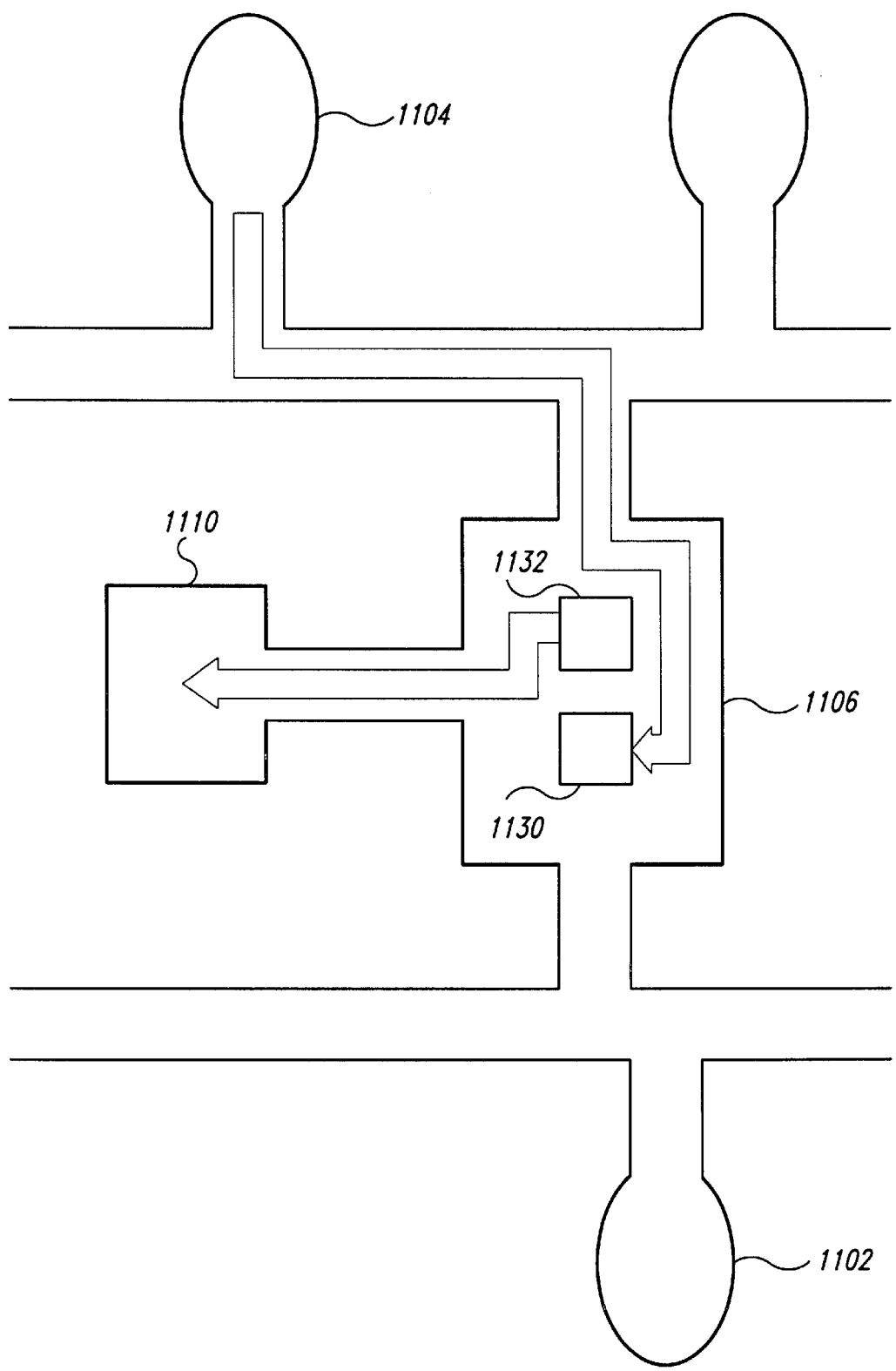

In contrast to the read operation, a write operation is significantly more efficient. In FIG. 11C, the initiator processor component 1102 issues a write operation 1128 via the first internal bus 1104 to the bus bridge 1106. In the case of a write operation, the bus bridge 1106 can place the data to be written to RAM 1110 in an internal buffer 1130. A write operation 1119 issued by the second microprocessor component 1116 through the second internal bus 1118 is, as before, temporarily stalled while the bus bridge 1106 buffers the data written to the bus bridge by the first processor component 1102. In FIG. 11D, the bus bridge 1106 has completed receiving the data written by the first processor component 1102, having placed the data in the internal buffer 1130. The first internal bus 1104 is now free and can be arbitrated for by the first processor component 1102 or another processor component connected to the first internal bus 1104. At this point, the bus bridge 1106 can accept data written to the bus bridge by the second processor component 1116 and place that data in a second internal data buffer 1132. In FIG. 11E, while a third processor component 1124 arbitrates for, and gains control of, the second internal bus 1118 in order to send a write operation 1126 to the bus bridge 1106, the bus bridge can begin writing the buffered data from the first internal buffer 1130 to the RAM 1110. Finally, in FIG. 11F, the bus bridge 1106 can write the contents of the second internal buffer 1132 to SRAM 1110 and accept data from the third processor component 1124 into the now free internal buffer 1130 that previously held data written to the bus bridge 1106 by the first processor component 1102.

Because of the ability of the bus bridge to internally buffer data, write operations tie up the internal buses and bus bridge for fewer cycles than read operations. Depending on the particular bus bridges and internal buses employed in a device, the actual sequence of sub-operations and the timing and interleaving of those sub-operations, as illustrated in FIGS. 11A–11F, may vary. Some bus bridges, for example, can split a read operation into two sets of sub-operations, between which the bus bridge can undertake certain other operations. However, despite the differences and variations, write operations are almost always more efficiently processed than read operations, and a greater number of write operations can be interleaved and processed by the system during a given period of time than read operations. Thus, in designing a system employing multiple internal buses and bus bridges, read operations through bus bridges should be avoided.

High-Performance Network/Bus Multiplexer Architecture

Figure 12:
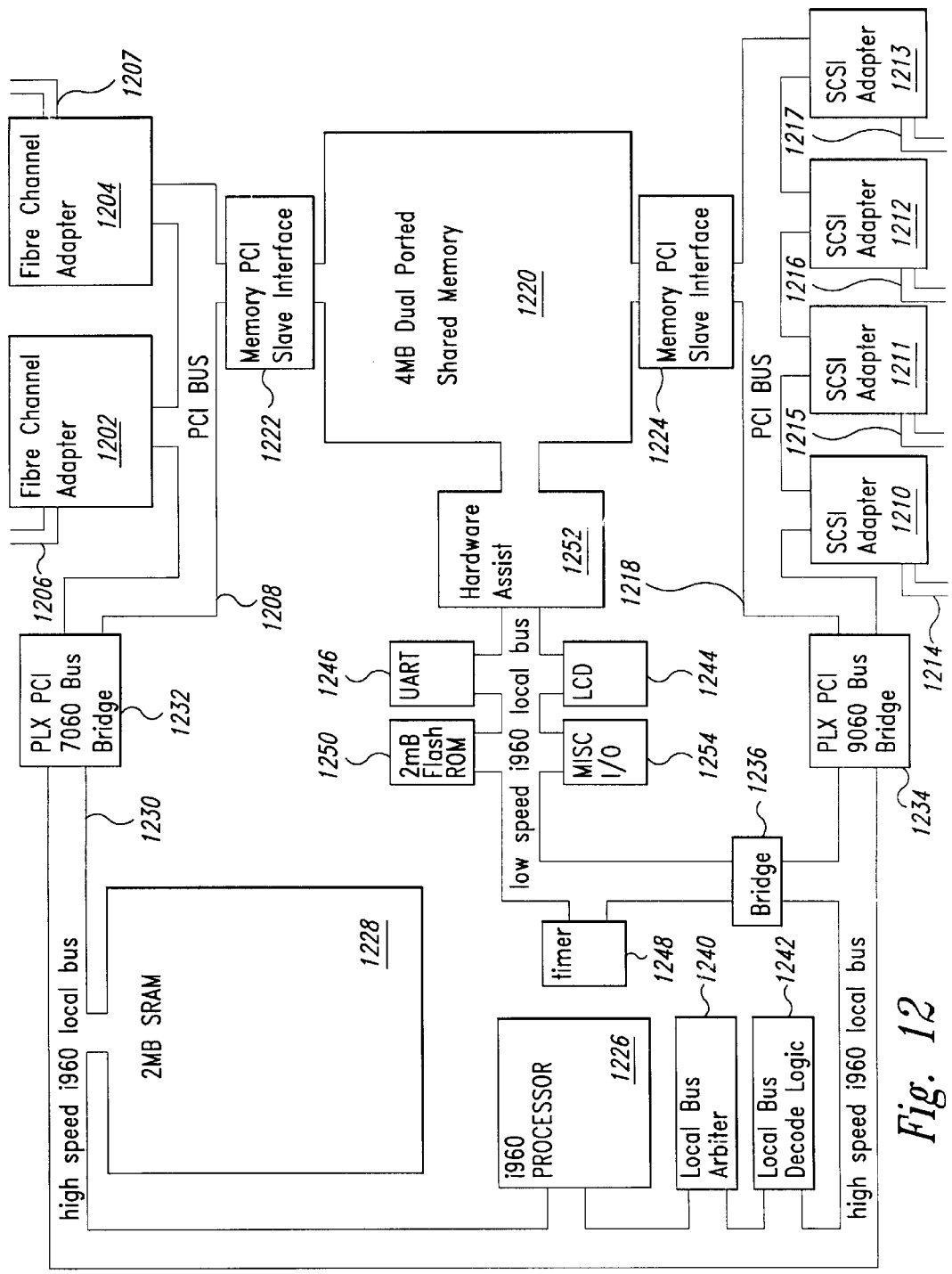
FIG. 12 is a block diagram showing one embodiment of the high-performance network/bus multiplexer architecture of the present invention.

FIG. 12 is a block diagram showing one embodiment of the HPM architecture. Two FC host adapters 1202 and 1204 are connected to an upper PCI bus 1208. The FC host adapters 1202 and 1204 each provides a port to an FC network via a fibre optics connection 1206 and 1207. Four SCSI-bus adapters 1210–1213 that each control a separate SCSI bus 1214–1217, respectively, are each connected to a lower PCI bus 1218. Both the upper PCI bus 1208 and the lower PCI bus 1218 are connected to a 4 MByte dual-ported SRAM 1220 ("dual-ported shared memory") through memory PCI slave interfaces 1222 and 1224 that together provide a portion of a hardware assist mechanism, to be described below.

Operation of the HPM is controlled internally by an Intel i960 general-purpose processor 1226. The i960 processor accesses a 2 MByte local SRAM ("local memory") 1228 via an i960 local bus ("local bus") 1230. The upper PCI bus 1208 is interconnected with the local bus 1230 via a PLX PCI 9060 bus bridge ("upper bus bridge") 1232. Likewise, the lower PCI bus 1218 is interconnected to the local bus 1230 via an identical PLX PCI 9060 bus bridge 1234 ("lower bus bridge"). The local bus is divided by a set of transceivers that together compromise a simple bridge 1236 into a high-speed local bus 1230 and a low-speed local bus 1238. This division minimizes the loading on the processor and creates the short high-speed local bus that directly interconnects only high-speed devices, i.e., the PLX PCI 9060 bus bridges 1232 and 1234, the local memory 1228, and the i960 processor 1226. A preferred i960 processor is the Intel A80960HD 25 MHz processor in a 168-pin pin grid array ("PGA") package.

A local bus arbitration logic circuit 1240 and a local bus address decode logic block 1242 are connected to the high-speed local bus 1230. The decode logic is implemented in an Altera EPM7128EQC100-10 programmable logic device ("PLD"). A front panel LCD for output of status and control information 1244, an NS16C552 universal asynchronous receiver-transmitter ("UART") 1246, and a Zilog Z0853606VSC triple 16-bit timer/counter 1248 are all connected to the low-speed local bus 1238. The timer 1248 and UART 1246 are intended for supporting performance monitoring and external diagnostics. A 2-MByte flash EEPROM 1250 is connected to the low-speed local bus 1238 and contains the firmware routines that are run by the i960 processor 1226 in order to control operation of the HPM.

The low-speed local bus 1238 is interconnected with the dual-ported shared memory 1220 via a hardware assist block 1252, implemented using a field programmable gate array ("FPGA"), that provides hardware support to the SCSI-bus adapters 1210–1213, and the i960 processor 1226 for memory operations related to control data structures related to operation of the FC adapters and to coordinate the activities of the i960 and the SCSI-bus adapters. The hardware assist block incorporates a bus bridge between the low-speed local bus 1238 and the dual-ported shared memory, interfacing, on one hand, with the low-speed local bus running at one clock rate, and the dual-ported shared memory/PCI bus subsystem running at a different clock rate. Certain miscellaneous I/O functions, including arbitration, status, and control, are implemented in a PLD 1254 that is connected to the low-speed local bus 1238.

The hardware assist mechanism is yet another feature that facilitates avoidance of read operations through the lower bus bridge 1234. The i960 processor 1226 manages certain data structures stored in the dual-ported shared memory via the hardware assist mechanism, allowing the i960 processor to manipulate the data structures without issuing read operations through the lower bus bridge 1234. In the following, the lower memory PCI slave interface 1224 and the hardware assist block 1252 will be conceptually considered to be a single hardware assist component, and will be so represented in subsequent figures. However, the lower memory PCI slave interface 1224 the hardware assist block 1252 are distinct components.

Hardware assists can be logically considered to provide a special region of the address space within the address space provided by the dual-ported shared memory 1220. When a SCSI adapter reads a memory location within the special memory address space, the lower memory PCI slave interface 1224 detects the access within the special address space and signals the hardware assist block 1252 so that the hardware assist block 1252 performs a number of operations to return a computed value to the SCSI adapter. In a normal memory address access by the SCSI adapter, by contrast, the lower memory PCI slave interface 1224 simply passes the memory accesses directly to the dual-ported shared memory 1220. Thus, certain complex queue operations may be performed by the hardware assist logic to return a pointer to a queue element within a queue that would otherwise require the SCSI adapter to read values from local memory 1228 across the lower bus bridge 1234. Similarly, the hardware assist block 1252 allows the i960 processor 1226 to maintain the control data structures without reading across either of the upper and lower bus bridges 1232 and 1234.

In general, data flows from the FC adapters to the SCSI-bus adapters during write I/O transactions, and from the SCSI-bus adapters to the FC adapters during read I/O transactions, through the dual-ported shared memory 1220. Data structures that control operation of the FC host adapters are generally located in the dual-ported shared memory 1220, as are some of the scripts and control data structures that control the operation of the Symbios 53C8xx SCSI processors within the SCSI-bus adapters 1210–1213. Certain control data structures related to the operation of the FC host adapters 1202 and 1204 are also contained in the local memory 1228. As will be detailed below, the placement of the various control data structures and the overall topology of the PCI bus and local bus interconnections enable both read and write I/O transactions to be implemented without conducting read operations that span the bus bridges 1232 and 1234. The placement of the FC host adapters on the upper PCI bus 1208 and the SCSI-bus adapters 1210–1213 on the lower PCI bus 1218 eliminates contention for access to a single PCI bus shared between FC adapters and SCSI-bus adapters, as is the case in a number of currently-available FC/SCSI-bus multiplexers. As illustrated in FIGS. 11A–11F, the elimination of read operations through the bus bridges 1232 and 1234 greatly increases the amount of concurrency within the HPM which, in turn, increases the throughput between the FC host adapters 1202 and 1204 and the mass storage devices (not shown) connected to the SCSI buses 1214–1217 controlled by the SCSI-bus adapters 1210–1213.

Tachyon Interface

In a preferred embodiment, the FC host adapters 1202 and 1204 are designed to incorporate Hewlett Packard HPFC-5000 Tachyon FC interface controllers. The Tachyon controllers are described in detail in the "Tachyon User's Manual," Hewlett Packard Part No. 5965-1247E, Hewlett-Packard Company, 1996 ("Tachyon Manual").

Figure 13:
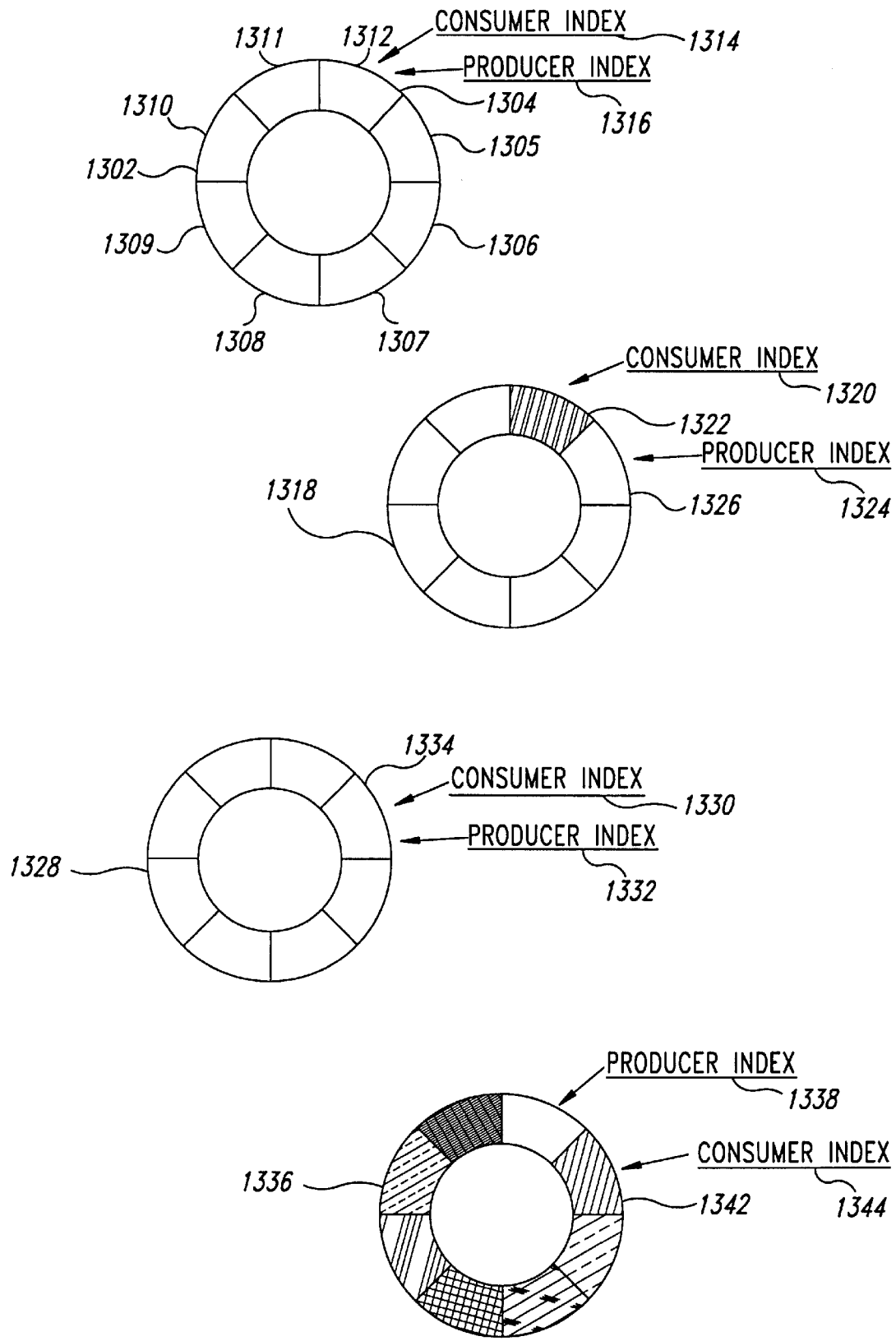
FIG. 13 shows the basic underlying circular queue data structure used in the Tachyon Fibre Channel controller interface.
Figure 14:
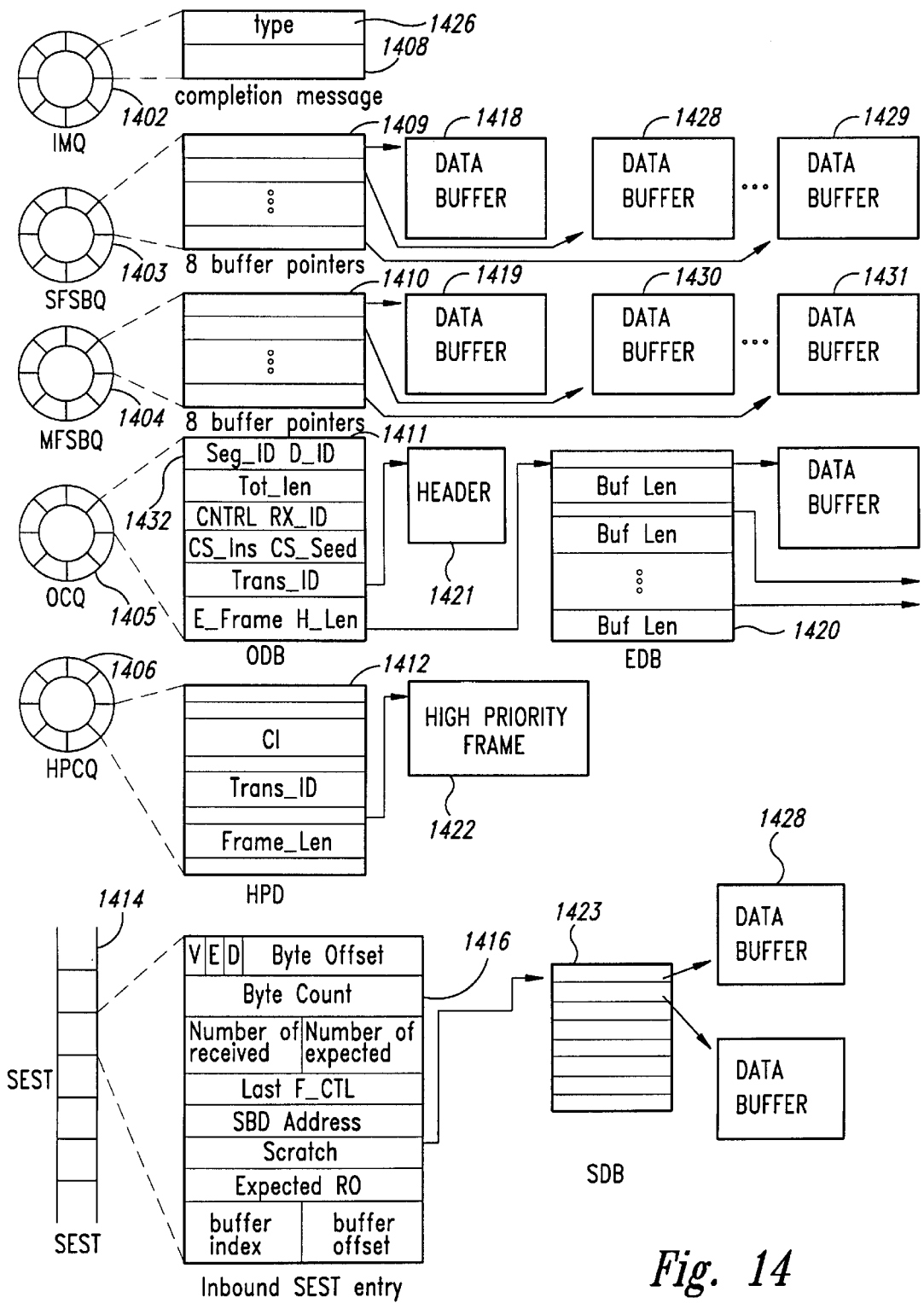
FIG. 14 shows the Tachyon Fibre Channel controller data structure interface.

FIGS. 13 and 14 describe a data structure interface through which an external processor, such as the i960 1226, interfaces with the Tachyon FC controllers. FIG. 13 shows the basic underlying circular queue data structure used in the Tachyon FC controller interface. A circular queue is a first-in-first-out ("FIFO") queue that is logically represented in a circular fashion, such as the depiction of the circular queue 1302 at the top of FIG. 13. Each radial section 1304–1312, or slot, of a circular queue contains space for a queue entry, essentially a record-like data structure containing one or more data fields. The circular queue 1302 in FIG. 13 is shown with 8 queue entry slots 1304–1312 although, in practice, a circular queue may have many tens or hundreds of queue entries. In addition to the queue entry slots, a circular queue is associated with two pointers: (1) a consumer index that points to the next queue entry that can be removed from the circular queue by a consumer of queue entries; and (2) a producer index that points to the next open slot within the circular queue in which a producer can place a queue entry to be added to the queue. In an empty circular queue 1402, in which all the queue entry slots are available for placement of data by a producer and in which none of the queue entry slots contain valid queue entries to be consumed by a consumer, both the consumer index 1314 and the producer index 1316 point to the same empty queue entry slot 1312.

When a producer adds a queue entry to an empty circular queue 1302, a circular queue with one valid queue entry 1318 is produced. The consumer index 1320 is not changed, as a result of which the consumer index points to the single valid queue entry 1322 in the circular queue 1318. After the producer inserts the queue entry 1322, the producer increments the producer index 1324 to point to the next available slot 1326 within the circular queue 1318 into which the producer can add a second queue entry. If the consumer now removes the single queue entry 1322, an empty circular queue 1328 is produced. When the consumer has removed the available queue entry 1322, the consumer increments the consumer index 1330. As in the previous depiction of an empty circular queue 1302, the empty circular queue 1328 produced by removing the single queue entry 1322 has both the consumer index 1330 and the producer index 1332 pointing to the same empty, available queue entry slot 1334. If a producer successively adds queue entries at a faster rate than a consumer can consume them, a full circular queue 1336 will eventually be produced. In a full circular queue 1336, the producer index 1338 points to a single empty queue entry slot within the circular queue that immediately precedes the first available valid queue entry 1342 pointed to by the consumer index 1344.

The Tachyon FC controller data structure interface is shown in FIG. 14. The data structure interface comprises five circular queues 1402–1406, each having a particular type of queue entry 1408–1412, a state table 1414 with two different types of state table entries 1416–1417, and a number of different types of ancillary data structures 1418–1424. Each of the five circular queues 1402–1406 has a consumer index and a producer index (not shown), as illustrated in FIG. 13 and described above. The incoming message queue ("IMQ") contains completion message entries 1408. These entries describe Tachyon events, such as the reception or transmission of FC sequences by the Tachyon FC controller. A completion message 1408 includes a type field 1426 that describes the type of event that has occurred within the FC host adapter. The single-frame sequence buffer queue ("SFSBQ") 1403 contains entries 1409 comprising 8 32-bit buffer pointers. These buffer pointers point to data buffers 1418, 1428, and 1429 in which the Tachyon FC controller places incoming single-frame sequences. The multiple-frame sequence buffer queue ("MFSBQ") 1404 contains entries 1410 that each comprise 8 32-bit buffer pointers that point to data buffers 1419 and 1430–1431 in which the Tachyon FC controller places incoming multiple-frame sequences. The outbound command queue ("OCQ") contains outbound descriptor blocks 1411 that identify and characterize sequences that are to be transmitted through the FC host adapter to remote ports via the FC. The outbound command descriptor ("ODB") contains information that identifies the sequence to be transmitted, such as the sequence ID 1432, as well as pointers to a FC frame header 1421 for the frames of the sequence and an extended descriptor block ("EDB") 1420 that contains pointers to, and the lengths of, data buffers that contain the data to be packaged into the outbound sequence described by the ODB 1411. The high priority command queue ("HPCQ") 1406 contains high priority descriptor ("HPD") entries 1412 that describe certain special single-frame sequences that are to be sent by the FC host adapter to a remote FC port at a higher priority than the outbound commands stored in the OCQ 1405. The HPCQ may be used, for example, to send messages to a remote port indicating a disruption in transmission by the local FC host adapter due to a fill OCQ. The SCSI exchange state table ("SEST") 1414 contains two types of SEST entries 1416 and 1417 that describe buffer space in an external memory, such as the dual-ported shared memory 1220 in FIG. 12, that can be used by the Tachyon FC controller for writing data received over the FC from a remote FC port. An inbound SEST entry 1416, for example, contains a pointer to a SCSI descriptor block ("SDB") 1423 that, in turn, comprises a number of 32-bit pointers to data buffers, such as data buffer 1429, into which the Tachyon FC controller can place incoming data.

Different types of FC host adapters, other than Tachyon-based FC host adapters, different types of internal buses, other than the PCI bus, different types of bus bridges, other than PLX PCI 9060 bus bridges, different types of HPM processors, other than the i960 processor, and different types of SCSI-bus adapters, other than Symbios 53C8xx SCSI processors, may be used to implement an HPM according to the HPM architecture of the present invention. The details of data structure placement and command and data flow within the HPM may differ depending on the different types of components employed. However, the basic principles of lowering contention for internal buses between FC adapters and SCSI-bus adapters and the elimination of read operations through bus bridges are retained in the HPM architecture regardless of the types of components used to implement an HPM according to the HPM architecture.

Data Flow and Control in the HPM

FIGS. 15A–15J and 16A–16E illustrate the flow of control information and data during the course of both a write I/O transaction and a read I/O transaction. FIGS. 15A–15J and 16A–16E represent a mapping of a somewhat simplified representation of the interface data structures illustrated in FIG. 14 onto a simplified version of the HPM architecture block diagram of FIG. 12. The data structures illustrated in FIG. 14 and the hardware components illustrated in FIG. 12 are labeled in FIGS. 15A–15J and 16A–16E with the same numerical labels that they are labeled with in FIGS. 14 and 12, respectively. In the interest of brevity, the descriptions of these data structures and hardware components will not be repeated below, except as necessary to describe the read and write I/O transactions.

Figure 15A:
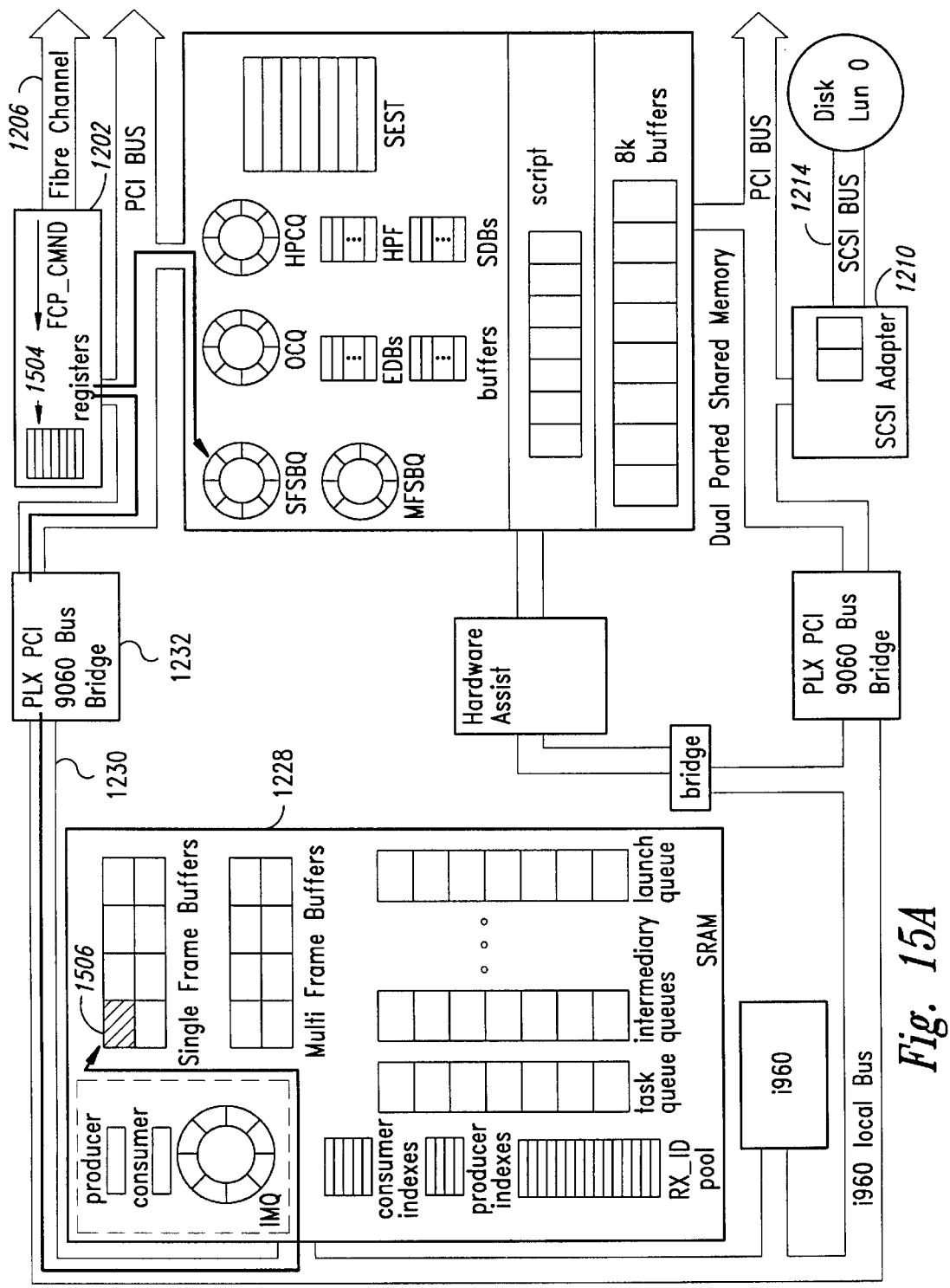
FIGS. 15A–15K illustrate the flow of commands and data during the execution of a write I/O transaction.

FIGS. 15A–15J illustrate the flow of commands and data during the execution of a write I/O transaction. In FIG. 15A, a SCSI write command imbedded within a FC FCP_CMND single-frame sequence is received by the FC host adapter 1202 from a remote computer (not shown) via the FC network 1206. Reception of the FC FCP_CMND single-frame sequence begins processing by the HPM of the write I/O transaction, as illustrated in FIG. 8B. The FC adapter 1202 minimally processes the received FCP_CMND single-frame sequence in order to route the contents of the FCP_CMND to local memory 1228. When the FC host adapter determines that the received FC frame is an FCP_CMND single-frame sequence, the FC host adapter accesses the consumer index, stored within a set of registers within the FC host adapter 1504, for the SFSBQ 1403 stored in the dual-ported shared memory 1220. Using the consumer index 1504, the FC host adapter accesses the SFSBQ 1403 in order to remove an SFSBQ entry containing pointers to empty buffers in which to place the received FCP_CMND single-frame sequence. The FC host adapter then updates the SFSBQ consumer index 1504 to reflect the removal of an SPSBQ entry. In fact, because the SFSBQ entries contain pointers to 8 buffers, the FC host adapter may not need to go to the SFSBQ for buffers if the FC host adapter has already retrieved an SFSBQ entry that still contains spare buffers unused in a previous transaction. Using one or more buffer pointers contained within an SFSBQ entry, the FC host adapter identifies a single-frame buffer 1506 located within the local memory 1228 and places the frame header and data payload fields of the FCP_CMND single-frame sequence into the single-frame buffer 1506 in local memory 1228 via the upper PCI bus 1208, the upper bus bridge 1232, and the high-speed local bus 1230. Note that, in keeping with one of the above-discussed principles of the HPM architecture, the FC host adapter has not issued a read operation through the bus bridge 1232.

Figure 15B:
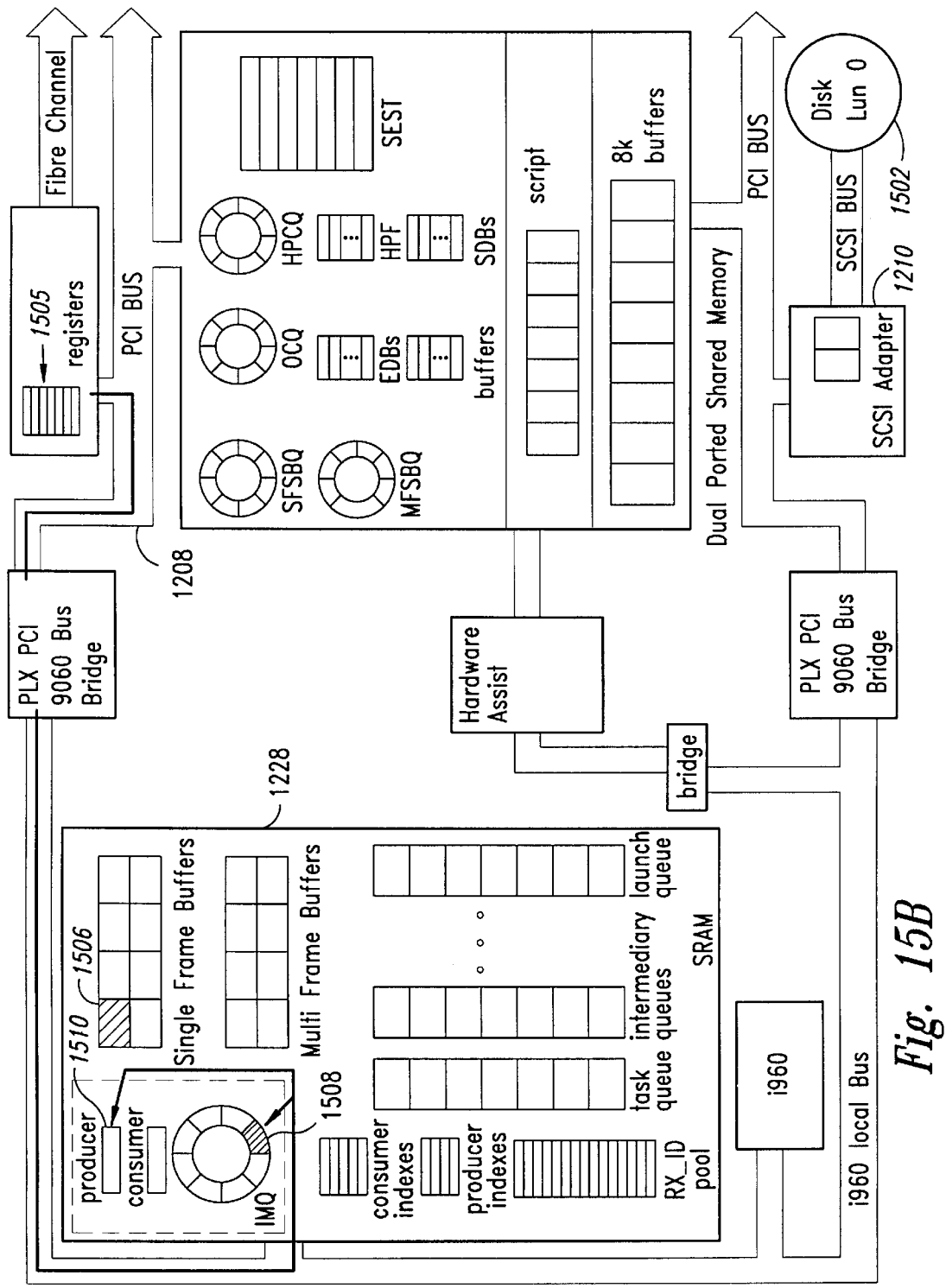

In FIG. 15B, once the FC host adapter has stored the received FCP_CMND single-frame sequence in the single-frame buffer 1506, the FC host adapter 1202 writes a completion message into the next available slot 1508 within the IMQ 1402 stored within the local memory 1228 and updates the producer index 1510 for the IMQ 1402, also stored in local memory 1228. Note that the FC host adapter does not read the contents of the producer index 1510 from local memory 1228 in order to find the open slot 1508 in the IMQ 1402. Instead, the FC host adapter reads a copy of the producer index stored within a Tachyon register. After placing the completion message in the IMQ, the FC host adapter is temporarily finished with the write I/O transaction command. It is now time for the HPM to process the write I/O command extracted from the received FCP_CMND single-frame sequence and arrange for execution of the write I/O command by the target SCSI-bus adapter 1210 and the target mass storage device 1502 to which the FCP_CMND is directed.

Figure 15C:
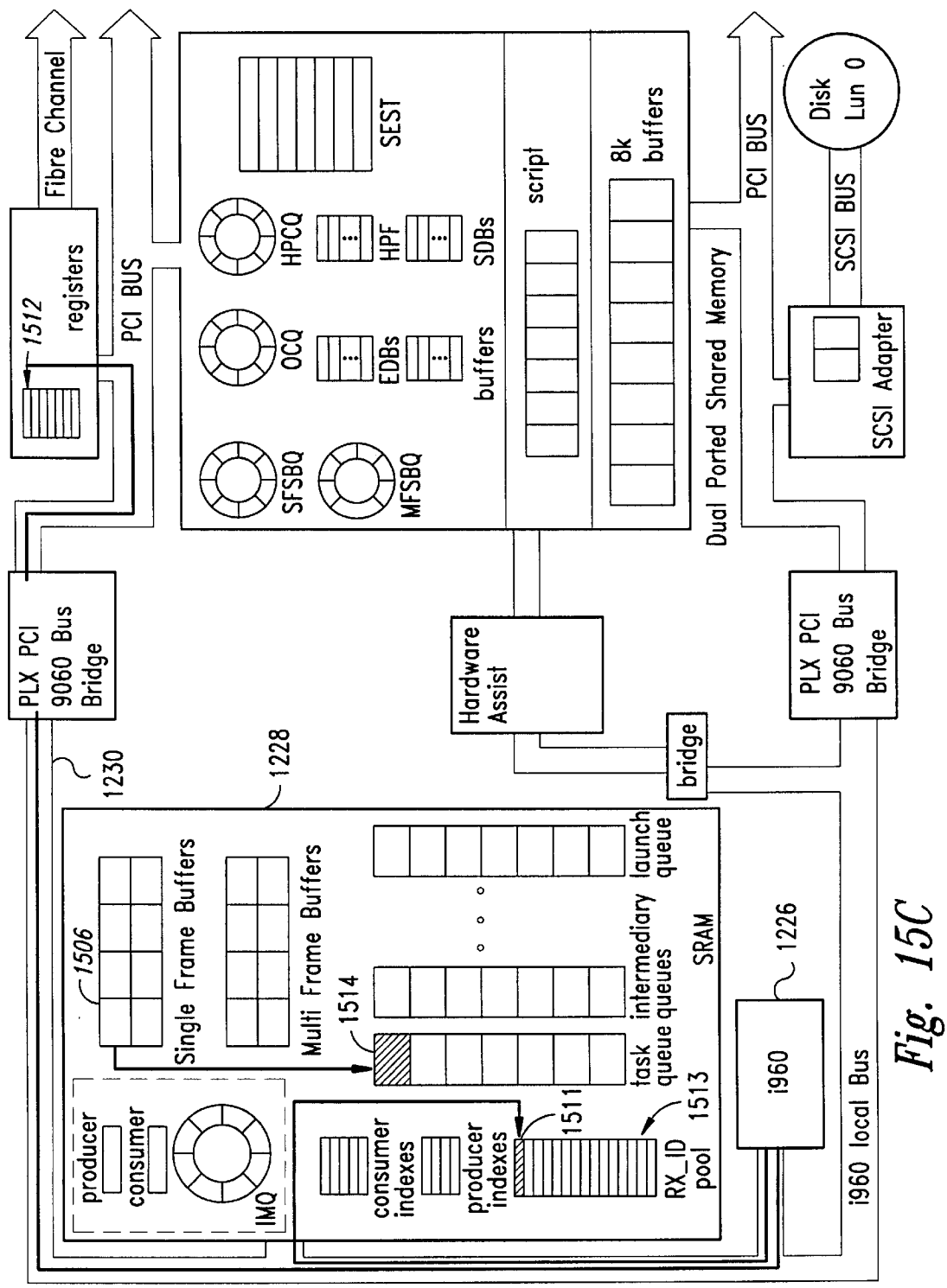

In FIG. 15C, the i960 processor 1226 detects that a new completion message has been added to the IMQ 1402 by comparing the producer index 1510 with a stored value that reflects the contents of the producer index the last time that the i960 called the IMQ. Note that the i960 processor 1226 reads the producer index 1510 without transmitting a read operation through the bus bridge. The i960 processor 1226 updates the consumer index 1512 for the IMQ 1402 via the local bus 1230, the upper bus bridge 1232, and the upper PCI bus 1208. The i960 then directs copying of the contents of the FCP_CMND single-frame sequence stored in the single-frame buffer 1506 to a task queue entry 1514. This frees up the single-frame buffer 1506 for subsequent use by the FC host adapter. Once the FCP_CMND single-frame sequence has been copied to a task queue entry 1514, the i960 1226 can proceed to process any additional IMQ completion messages within the IMQ 1402, and, after processing the additional IMQ completion messages within the IMQ 1402, may undertake other tasks.

Each I/O transaction, including the current write I/O transaction, is identified by an EXCHANGE_ID, as discussed above in the discussion of the FCP. One portion of the EXCHANGE_ID, the OX_ID, resides in the frame header of the FCP_CMND frame. The i960 processor 1226 selects an RX_ID 1511 from an RX_ID pool 1513 within the local memory 1228 in order to internally identify the write I/O transaction. The combination of the OX_ID and the RX_ID together compose an EXCHANGE_ID. The RX_ID is used throughout HPM processing to identify the write I/O transaction and is used as an index into the various control data structures that contain information related to the write I/O transaction. In one embodiment of the HPM architecture, the RX_ID pool contains 1024 RX_IDs, thus allowing the HPM to concurrently process 1000 different transactions.

Figure 15D:
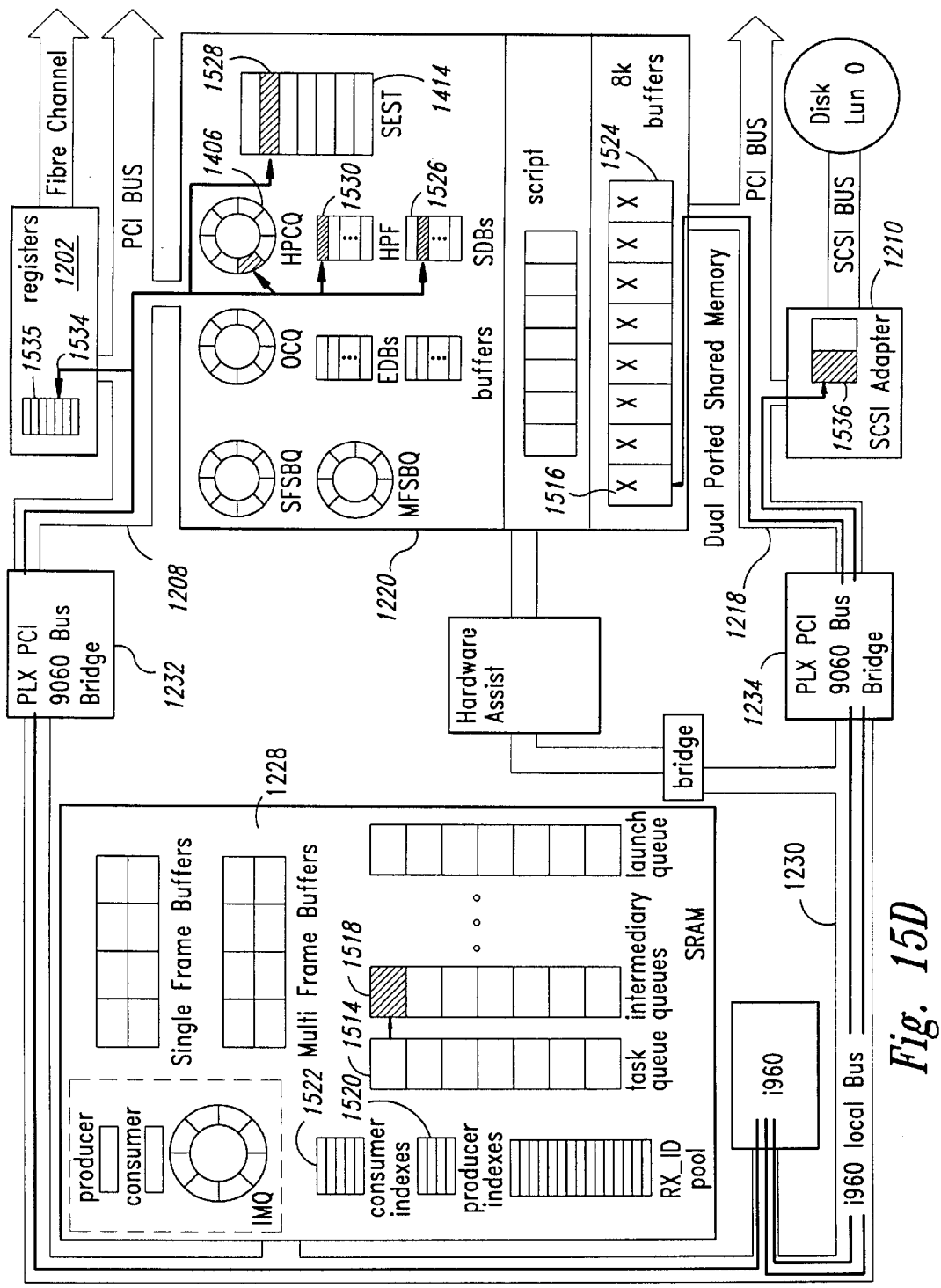

In FIG. 15D, the i960 processor 1226 has proceeded with any other higher priority tasks and is now ready to process the task queue entry 1514, incorporating information from the FCP_CMND single-frame sequence, in the task queue. First, the i960 processor checks to see if there are data buffers available to accept the data that will flow into the HPM from the FC host adapter. If no data buffers are available, the task queue entry is simply re-queued to the task queue, or to another intermediate queue, to allow the HPM to continue processing other I/O transactions to which data buffers are allocated and to thereby eventually free those allocated data buffers. In the case that data buffers are available, or after data buffers later become available, the i960 processor writes a series of special seed values, like seed value 1516, into 8 8-kilobyte ("Kbyte") buffers 1524 within the dual-ported shared memory 1220. The seed values are transmitted to the dual-ported shared memory 1220 via the high-speed local bus 1230, a bus bridge selected from one of the bus bridges 1232 and 1234, and a PCI bus selected from one of the bus bridges 1208 and 1218. Note that, in general, the i960 processor 1226 can access dual-ported shared memory 1220 through either the upper bus bridge 1232 and upper PCI bus 1208, or through the lower bus bridge 1234 and the lower PCI bus 1218. In this and subsequent figures, the i960 will be shown accessing the dual-ported shared memory through one bus bridge and one PCI bus (in this first case in FIG. 15D, the lower bus bridge 1234 and the lower PCI bus 1218), but this is done for conciseness of description, rather than to identify a particular path for the dual-ported shared memory access. Then, the i960 processor updates the SEST 1414 stored within the dual-ported shared memory 1220 and one or more SDBs 1526 in order to describe the data buffers 1524 that will be used to accept the data to the FC host adapter 1202. The i960 processor 1226 writes to the SEST 1414 via the local bus 1230, the upper bus bridge 1232, and the upper PCI bus 1208. The SEST entry 1528 is indexed by the RX_ID that identifies the write I/O transaction. An index to the appropriate SDB 1526 to contain the pointers to the buffers 1524 is maintained in local memory 1228 (not shown) so that, in keeping with one of the above-described HPM architecture principles, the i960 processor 1226 does not need to issue a read operation through the lower 1234 or upper 1232 bus bridges.

At this point, the data structures 1528 and 1526 describing the buffers 1524 have been initialized, and the i960 processor 1226 can now direct the FC host adapter 1202 to send a FCP_XFER_RDY single-frame sequence back through the FC to the remote computer that initiated the write I/O transaction. The FCP_XFER_RDY sequence (806 in FIG. 8B) is the second FCP sequence that occurs during a write I/O transaction. The FCP_XFER_RDY sequence indicates to the remote computer (not shown) that initiated the write I/O transaction that the remote computer may now proceed to send a FCP_DATA sequence (frames 802–805 in FIG. 8B) to the FC host adapter 1202. The i960 processor 1226 directs the FC host adapter to send FCP_XFER_RDY single-frame sequence by placing the FCP_XFER_RDY single-frame sequence into an available high priority frame 1530 within the dual-ported shared memory 1220, placing a high-priority queue descriptor block ("HPDB") entry into the HPCQ 1406, also located in the dual-ported shared memory 1220, and updating the HPCQ producer index 1534 within the FC host adapter 1202. Note that, again, these operations do not require a read through either the upper bus bridge 1232 or the lower bus bridge 1234. Also note that the consumer index (not shown) for the HPCQ 1406 is stored in a Tachyon register 1535. In general, the Tachyon register has values for all of the producer and consumer indexes stored within Tacyon registers. The i960 processor 1226 also maintains copies of the producer and consumer registers 1520 and 1522 in local memory 1228. In this way, neither the i960 processor 1226 nor the Tachyon within the FC host adapter 1202 need to read consumer or producer indexes through a bus bridge.

The i960 processor 1226 then places the task queue entry 1514 into an intermediate data queue 1518. The i960 processor 1226 then sends a Symbios 53C8xx SCSI processor script ("script") via the local bus 1230, lower bus bridge 1234, and lower PCI bus 1218, to the SCSI-bus adapter 1210 where the script is placed into one of two initial connect resource entries 1536. This script, essentially a small program executed by the processor embedded within the SCSI adapter, directs the SCSI-bus adapter to periodically check the buffers 1524 to see if the seed values, like seed value 1516, have been overwritten. Overwriting of the seed values indicates that the FC host adapter 1202 has begun to receive the FCP_DATA sequence from the remote computer and has begun to write the data to the buffers 1524. The FC host adapter accesses, via the upper PCI bus 1208, the SEST 1414 located in the dual-ported shared memory 1220 in order to determine where to write, or buffer, the incoming data.

Figure 15E:
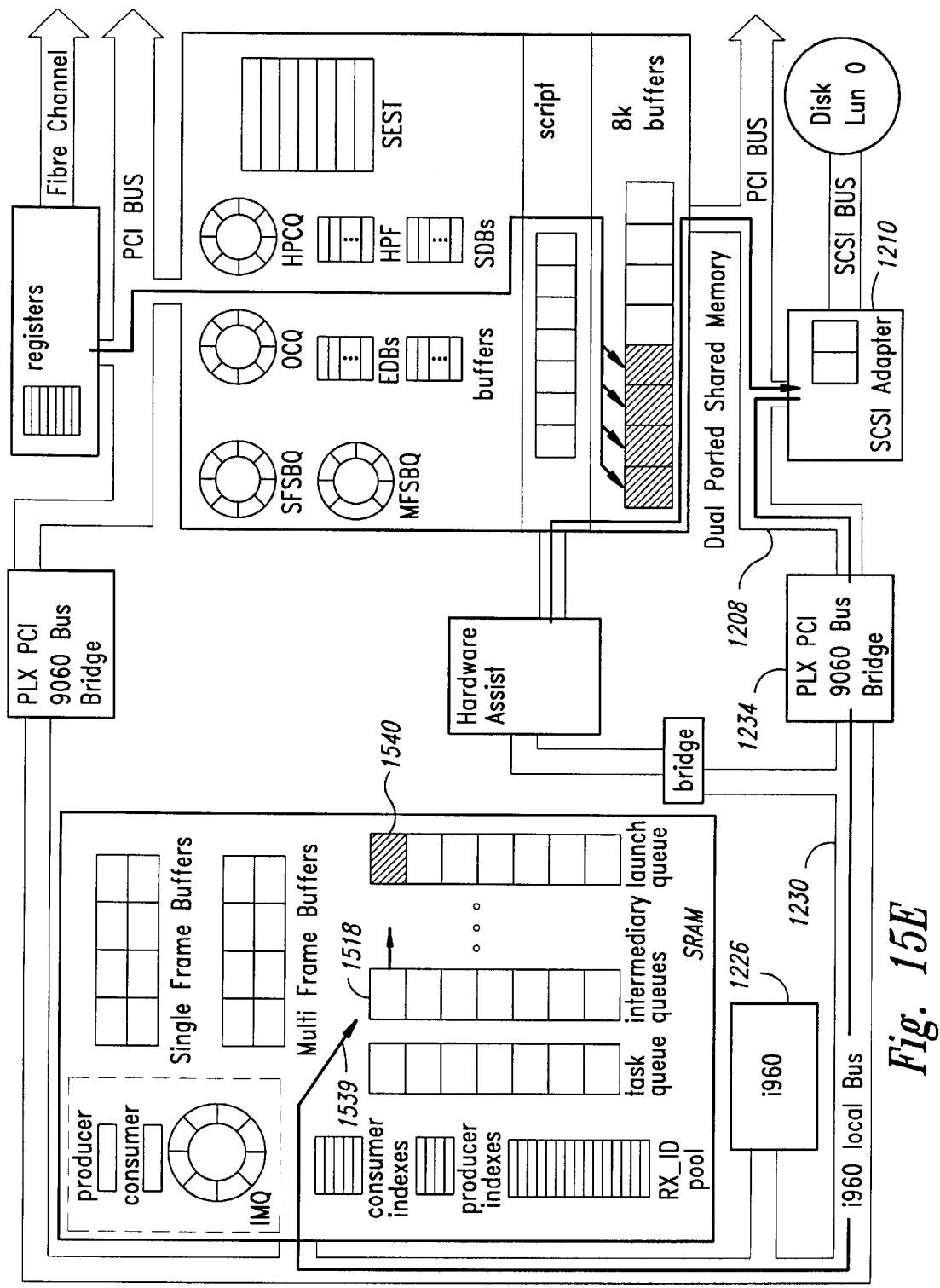

In FIG. 15E, the data has begun to arrive from the FC. The overwriting of the seed values is detected by the SCSI-bus adapter 1210 which then writes an indication 1539 via the lower PCI bus 1218, the lower bus bridge 1234, and the local bus 1230 to the local memory 1228 to indicate to the i960 processor 1226 that data has begun to arrive.

The HPM designed according to one embodiment of the HPM architecture uses a double buffering scheme to receive data from the FC. The FC protocol provides a mechanism for the target FC port, in this case, the HPM, to notify the remote computer that the FC host adapter can receive data in chunks of a maximum length. The first chunk of data that the HPM accepts should be less than or equal to 64 KBytes in length, corresponding to the 8 8-Kbyte buffers 1524 allocated for the write I/O transaction. Thereafter, 32-KByte chunks of data can be received from the FC while, at the same time, 32-KByte chunks of data are being transferred from the 8-Kbyte buffer 1524 to the SCSI-bus adapter 1210 over the PCI bus. Four of the original 8 8-Kbyte buffers are used to receive data while the other 4 of the original 8 8-Kbyte buffers are used to transfer data to the SCSI-bus adapter

1210. In a subsequent operation, the 4 8-Kbyte buffers that were used for transferring data to the SCSI-bus adapter 1210 in the previous operation are used to receive data from the FC, and the 4 8-Kbyte buffers that were used in the previous operation to receive data from the FC are used for transferring data to the SCSI-bus adapter 1210. In this fashion, data reception via the FC and data transfer to the SCSI-bus adapter 1210 can proceed concurrently.

When the i960 processor 1226 detects the indication 1539 that data is being received, the i960 processor 1226 dequeues the task queue entry 1518 from the data queue and queues the task queue entry to a launch queue 1540. The i960 processor 1226, by doing so, acknowledges that it is now time to send a SCSI write I/O command to the SCSI-bus adapter 1210. By not sending the SCSI write I/O command to the SCSI-bus adapter 1210 prior to the arrival of the data from the FC, the i960 processor 1226 avoids situations where the SCSI bus is tied up waiting for the arrival of data. This improves the concurrency of I/O transaction processing within the HPM.

Figure 15F:
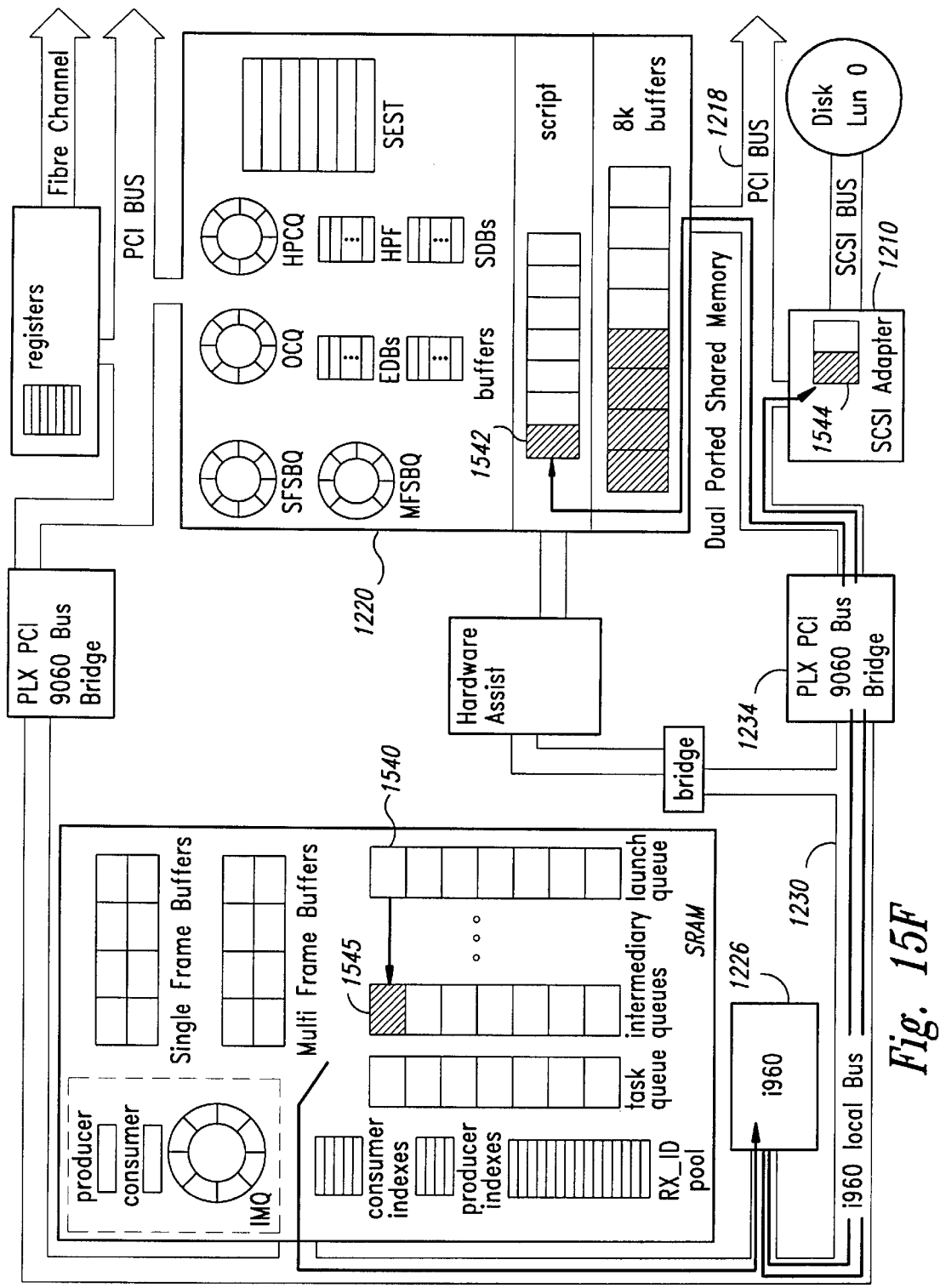

In FIG. 15F, the i960 processor 1226, after handling other higher-priority tasks, detects the task queue entry in the launch queue and prepares to send a SCSI write I/O command to the SCSI-bus adapter 1210. The i960 processor 1226 uses information stored within the task queue entry 1518, including information from the FCP_CMND single-frame sequence originally received from the FC host adapter 1202, to control the SCSI-bus adapter to execute the write command. The i960 processor 1226 writes values particular to the SCSI data phase of the write I/O transaction being executed into a script template 1542 stored within the dual-ported shared memory 1220 via the local bus 1230, the lower bus bridge 1234, and the PCI bus 1218. The i960 processor 1226 selects a currently unused queue tag from the 256 queue tags that the HPM may use for the SCSI-bus adapter 1210, as discussed with reference to FIGS. 3A–3B, as one of the values included in the script template. The queue tag then becomes a secondary transaction handle, or identifier, that can be used by the HPM, similar to the HPM's use of the RX_ID, to relate information returned by the SCSI adapter to the task queue entry. Then, the i960 processor formats certain of the information stored within the task queue entry and sends the information to the SCSI-bus adapter 1210 via the local bus 1230, the lower bus bridge 1234, and the lower PCI bus 1218 that results in the SCSI-bus adapter 1210 allocating one of two initial connection resources 1544 to place the information and to prepare to execute one or more internal scripts that implement a write I/O command. The task queue entry 1540 is then moved from the launch queue to an intermediate queue 1545 for tasks waiting for completion of SCSI operations.

Figure 15G:
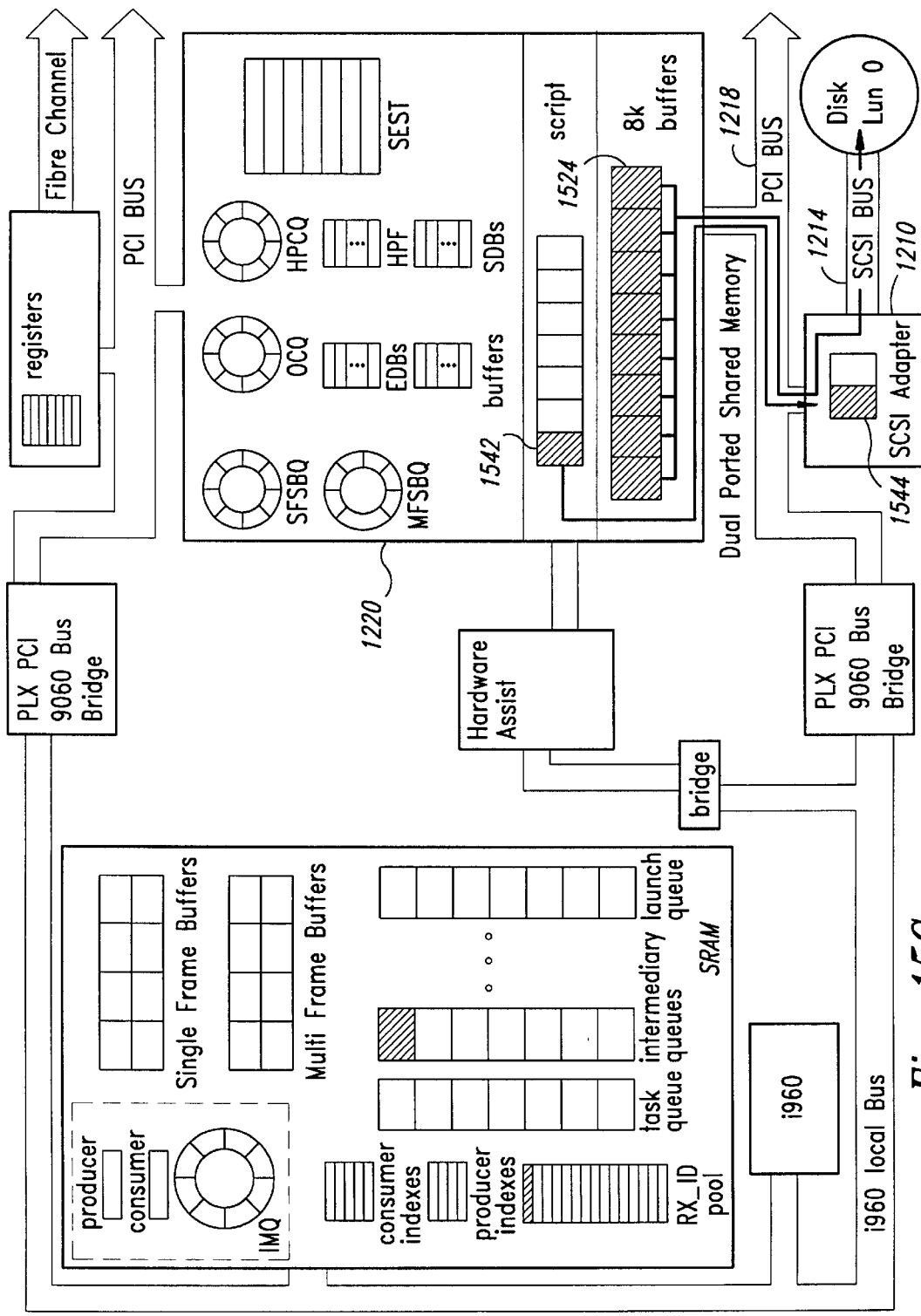

In FIG. 15G, the SCSI-bus adapter 1210 executes the command phase of a SCSI write I/O command, as shown in FIG. 3A above. The SCSI-bus adapter then waits for the target SCSI logical device 1502 to initiate the RESELECTION state transition, and transfer the IDENTIFY and QUEUE TAG messages, as shown in FIG. 3B. At this point, the target SCSI logical device is ready to begin receiving data. The SCSI adapter then accesses the previously prepared script 1542, reading the prepared script 1542 from dual-ported shared memory 1220 via the lower PCI bus 1218. The script directs the SCSI-bus adapter to transfer data from the 8-Kbyte buffers 1524 via the lower PCI bus 1218 and the SCSI bus 1214 to the target mass storage device 1502. Note that the FCP_LUN field within the original FCP_CMND single-frame sequence header contains sufficient information for the HPM to direct the write operation to the appropriate SCSI-bus adapter 1214, mass storage target 1502, and logical device (LUN) within the mass storage SCSI target. In FIGS. 15A–15J, it is assumed that the physical disk within the mass storage target 1502 has LUN 0.

Figure 15H:
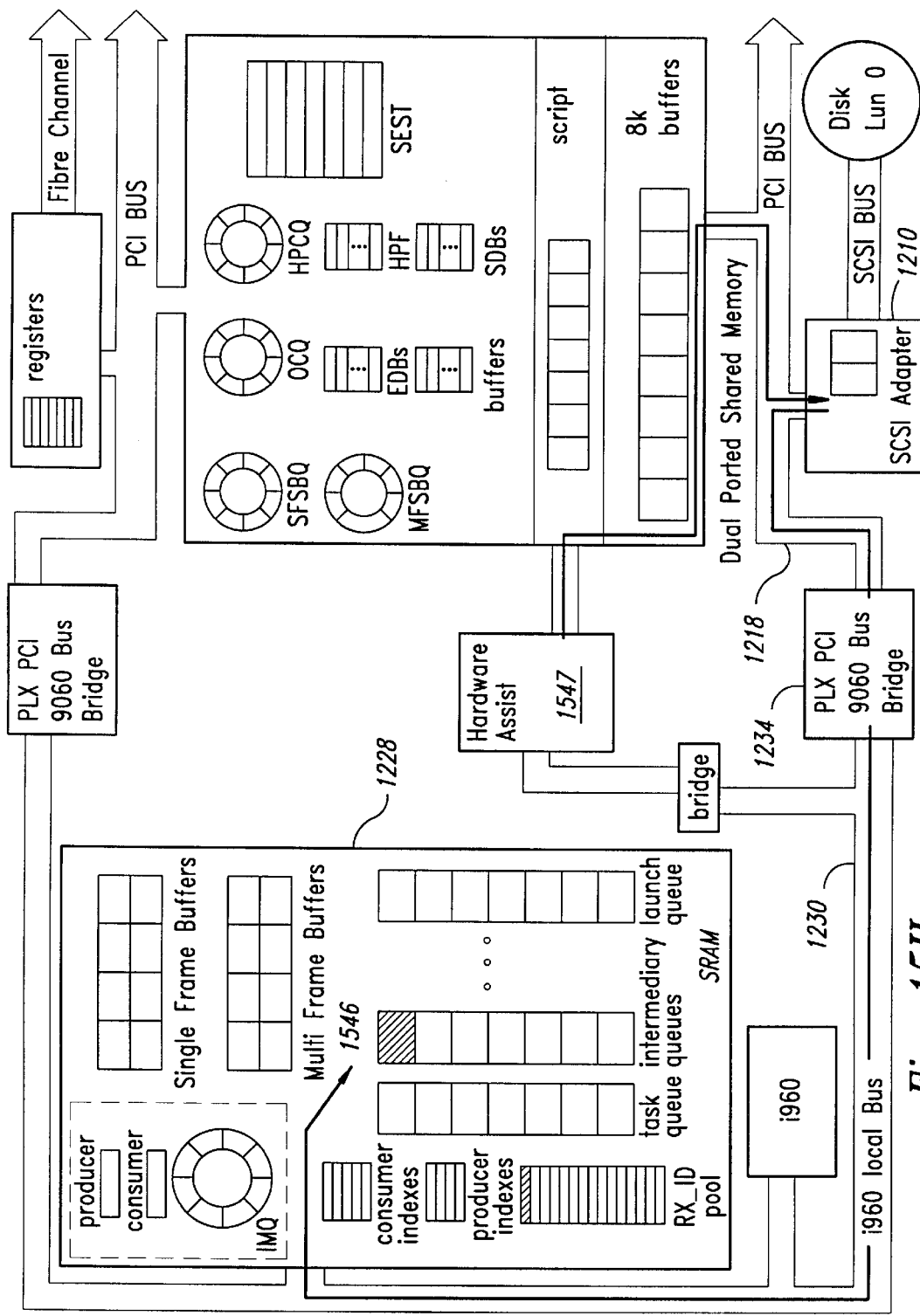

In FIG. 15H, when the SCSI-bus adapter finishes transferring the data from the 8-Kbyte buffers 1524 in dual-ported shared memory 1220, the SCSI-bus adapter sends a transfer completion indication 1546 via the lower PCI bus 1218, the lower bus bridge 1234, and the local bus 1230 to the local memory 1228. In all such operations, the SCSI-bus adapter uses hardware assists 1547 (memory PCI slave interface 1224 and hardware assist block 1252 in FIG. 12) associated with the dual-ported shared memory 1220. The SCSI-bus adapter reads from a special address in the same fashion as if the SCSI-bus adapter were reading from the dual-ported shared memory 1220. The special addresses are trapped by the hardware assist 1247 which can then execute a small number of logical operations to return a value to the SCSI-bus adapter that reflects an index or address that the SCSI-bus adapter can then use for writing to the local memory 1228. In the current situation, the SCSI-bus adapter 1210 uses a hardware assist 1547 in order to determine the address within the local memory 1228 in which to place the SCSI command completion indication 1546.

Figure 15I:
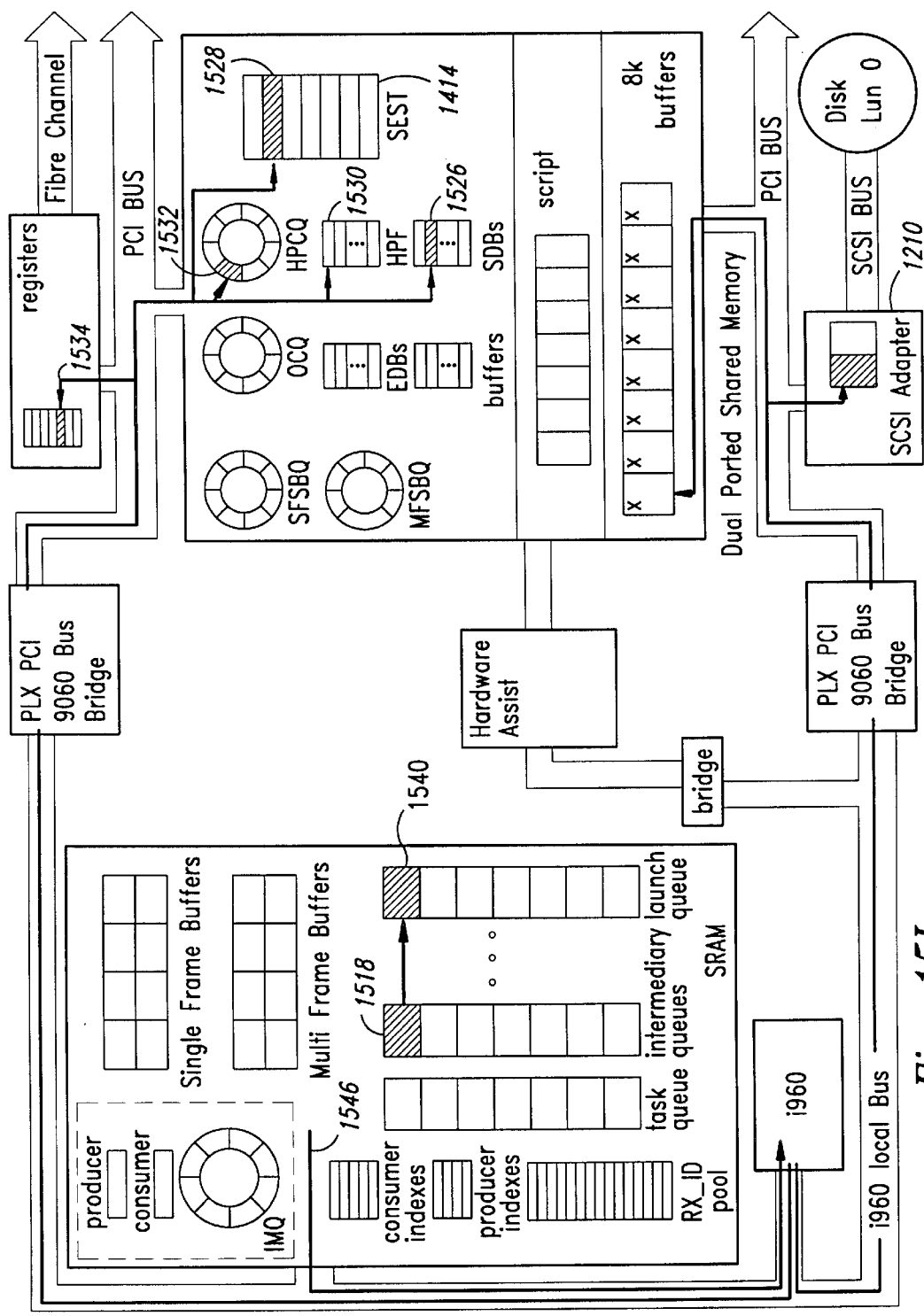

In FIG. 15I, the i960 processor, after executing any other pending higher-priority tasks, detects the indication of the transfer completion 1546 in local memory 1228 and places an FCP_XFER_RDY single-frame sequence into an available high priority frame 1530 within the dual-ported shared memory 1220, placing an HPDB entry into the HPCQ 1406, also located in the dual-ported shared memory 1220, and updating the HPCQ producer index 1534 within the FC host adapter 1202. By returning an FCP_XFER_RDY single-frame sequence via the FC host adapter 1202 to the remote initiator computer, the i960 processor 1226 indicates to the remote initiator computer that the HPM is ready to accept an additional 32 Kbytes of data. The i960 processor 1226 also writes seed values to the now emptied 8 8-Kbyte buffers via the local bus 1230, the lower bus bridge 1234, and the lower PCI bus 1218, sends a script to the SCSI adapter 1210 to direct the SCSI adapter to watch for overwriting of the seed values, and updates the SEST entry 1528 and SDBs 1526 to indicate the buffers to which the FC host adapter can write data. In the initial transfer, 8 8-Kbyte buffers are filled, but, as explained above, subsequent transfers comprise 4 8-Kbyte buffers using a double buffering scheme. Finally, the i960 processor 1226 moves the task queue entry back to the launch queue. The events illustrated in FIGS. 15E–15I continue to repeat in order to transfer each successive 32 Kbytes of data from the remote initiator computer to the target SCSI logical device. Note that the HPM, by using the double buffering mechanism described above, does not need to wait until all the data has been received from the FC before beginning the SCSI write I/O command. Thus, both latency for the write I/O transaction is decreased and concurrency of I/O transaction processing within the HPM is increased.

Figure 15J:
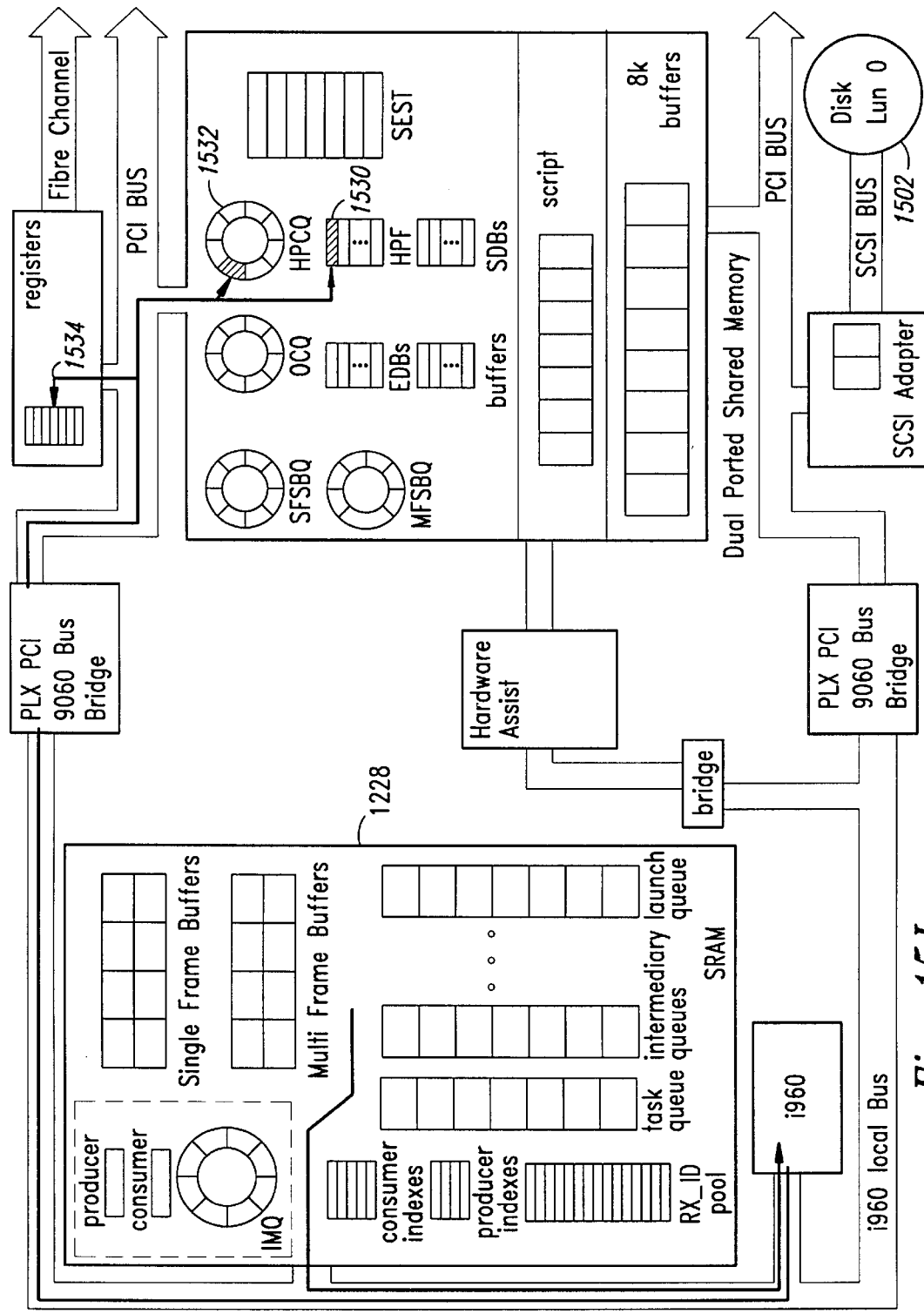

In FIG. 15J, when the entire write I/O transaction data transfer has been completed, and there is no more data to be received from the remote initiator computer, the i960 processor, after executing any other pending higher-priority tasks, detects the indication of the transfer completion 1546 in local SRAM 1228 and places a FCP_RSP sequence, corresponding to the FCP_RSP sequence 806 shown in FIG. 8B, into the HPCQ 1532 and a high priority frame buffer 1530, after which the i960 processor updates the producer index for the HPCQ 1534. The status byte returned by the SCSI logical device is included in the indication of the transfer completion 1546, from which the i960 processor 1226 extracts the status byte and includes it in the FCP__RSP sequence.

Figure 15K:
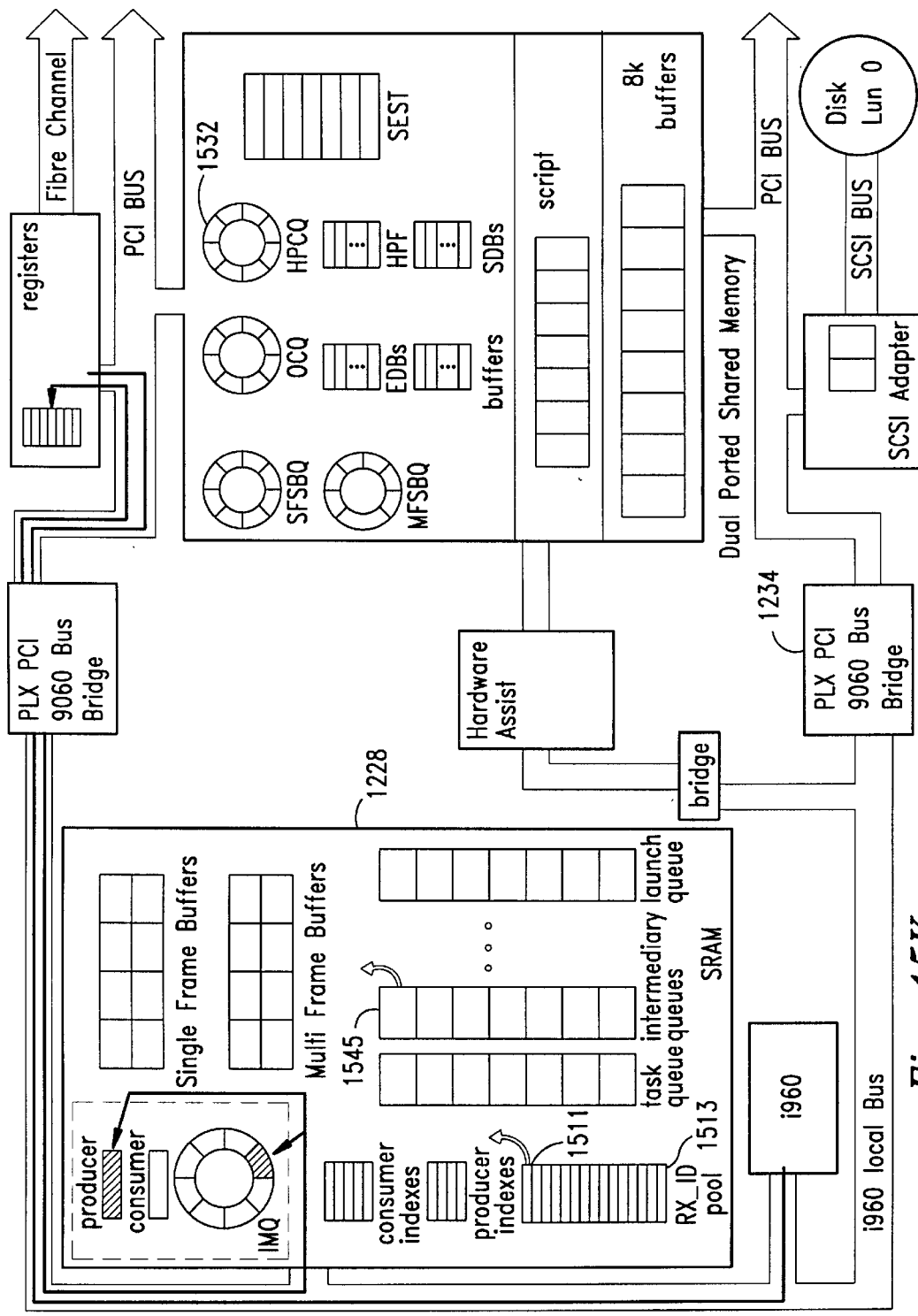

In FIG. 15K, the FC host adapter 1202 detects the FCP__RSP sequence in the HPCQ 1532 and sends that FCP__RSP sequence back to the remote initiator (not shown) via the FC 1206. When the FC host adapter receives a low-level FC acknowledgment from the remote initiator, the FC host adapter writes a completion message for the write I/O transaction via the upper PCI bus 1208, upper bus bridge 1232, and local bus 1230, to the IMQ 1402 in local memory 1228. When the i960 processor 1226 detects the new completion message in the IMQ 1402, the i960 processor 1226 can clean up any resources still allocated to the write I/O transaction, including deallocating the RX__ID 1511 and returning the RX__ID 1511 to the RX__ID pool 1513 and dequeueing the task queue entry 1545 from the intermediate queue, to which the task queue entry was queued following the original launch of the write operation. At this point, the write I/O transaction is complete from the standpoint of the SCSI-bus adapter, the HPM, the FC adapter.

Because of the placement of the control data structures within the HPM and the flow of control information and data through the various hardware components of the HPM, it is not necessary for any component of the HPM to issue a bus read command through either the upper 1232 or lower 1234 bus bridges during a write I/O transaction. Because of the isolation of the FC host adapters on the upper PCI bus 1208 and the SCSI-bus adapters on the lower PCI bus 1218, the FC host adapters and SCSI-bus adapters do not contend, at any time during the write I/O transaction, for the same PCI bus. The HPM architecture, and the particular hardware components selected for one embodiment of an HPM, described above, provide a high degree of concurrency. While certain of those I/O transaction are waiting for a resource or for additional FC or SCSI bus messages, other I/O transactions can be progressing towards completion. None of the buses are tied up for long periods of time while a bus read operation is executed.

FIGS. 16A–16E illustrate the flow of control information and data during a read I/O transaction. The initial steps of the read I/O transaction are identical to the initial steps of the write I/O transaction illustrated in FIGS. 15A–15C. Thus, in FIG. 16A, the i960 processor 1226 has detected a new read I/O transaction 1515 and queued a task queue entry 1550 to the task queue that includes information from the FCP__CMND single-frame sequence sent by a remote computer to initiate the read I/O transaction. If there are buffers available in the dual-ported shared memory 1220, the i960 processor 1226 can immediately dequeue the task queue entry 1550 corresponding to the I/O read transaction from the task queue and place that task queue entry on the launch queue 1552. In the case of a read I/O transaction, there is no need to wait for any FC events prior to issuing the SCSI bus read command to the SCSI-bus adapter 1210, as in the case of a write I/O transaction. After the i960 processor 1226 processes any other higher priority tasks, the i960 processor 1226 detects the task queue entry corresponding to the read I/O transaction 1552 on the launch queue and writes values into a script template 1554 within the dual-ported shared memory 1220 to direct the SCSI-bus adapter 1210 to the appropriate 8-Kbyte buffer in the dual-ported shared memory 1220. Then, the i960 processor 1226 formats certain of the information stored within the task queue entry and sends the information to the SCSI-bus adapter 1210 via the local bus 1230, the lower bus bridge 1234, and the lower PCI bus 1218 that results in the SCSI-bus adapter 1210 allocating one of two initial connection resources 1544 to place the information and to prepare to execute one or more internal scripts that implement a read I/O command. As in the case of a write operation, an I__T__L__Q nexus reference number is chosen by the i960 processor 1226 to initiate the SCSI read operation. After launching the SCSI read operation, the i960 processor 1226 moves the task queue entry 1552 from the launch queue to an intermediate queue 1559 for I/O transactions waiting for SCSI operation completion.

Figure 16A:
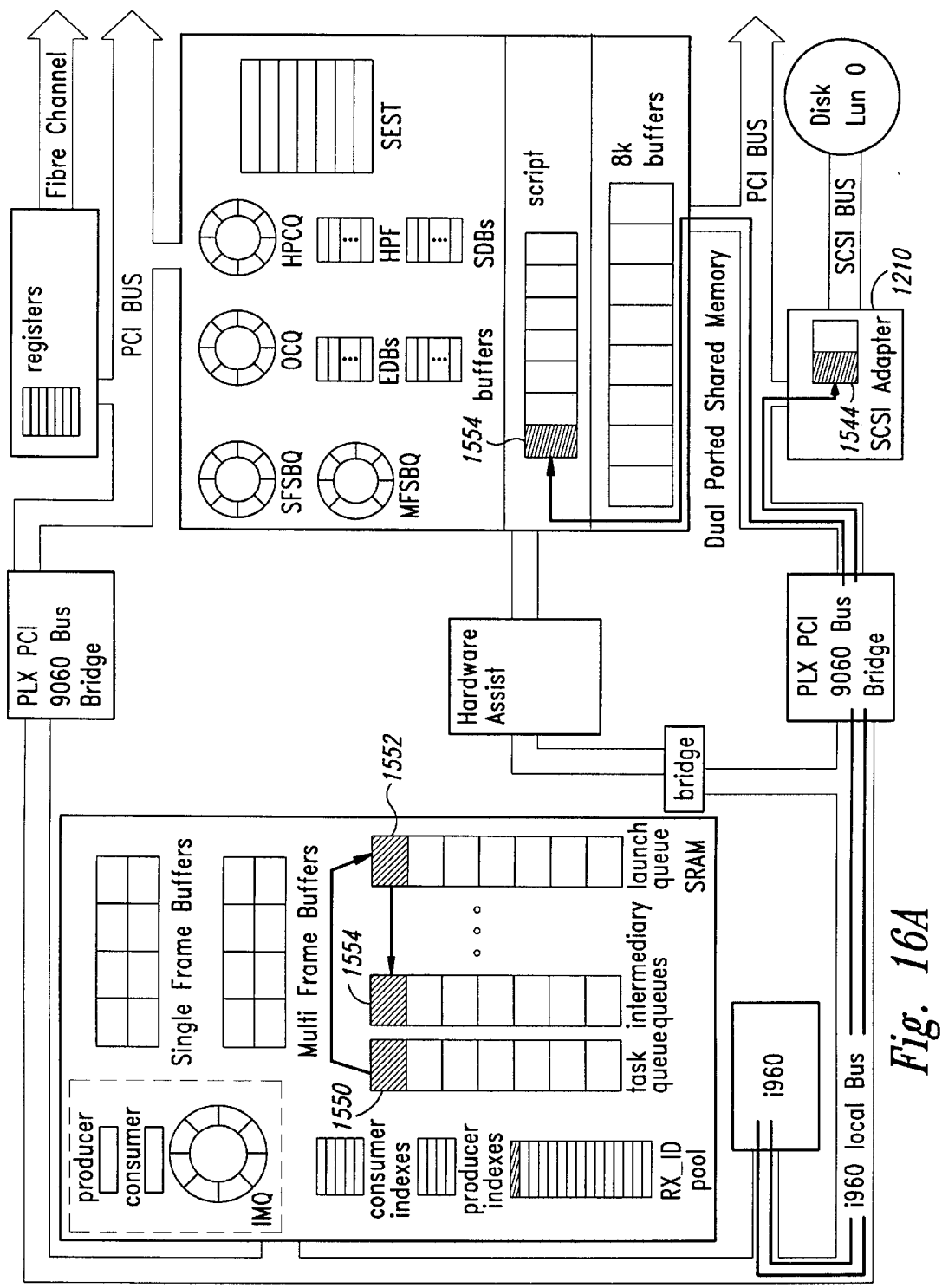
FIGS. 16A–16F illustrate the flow of control information and data during a read I/O transaction.
Figure 16B:
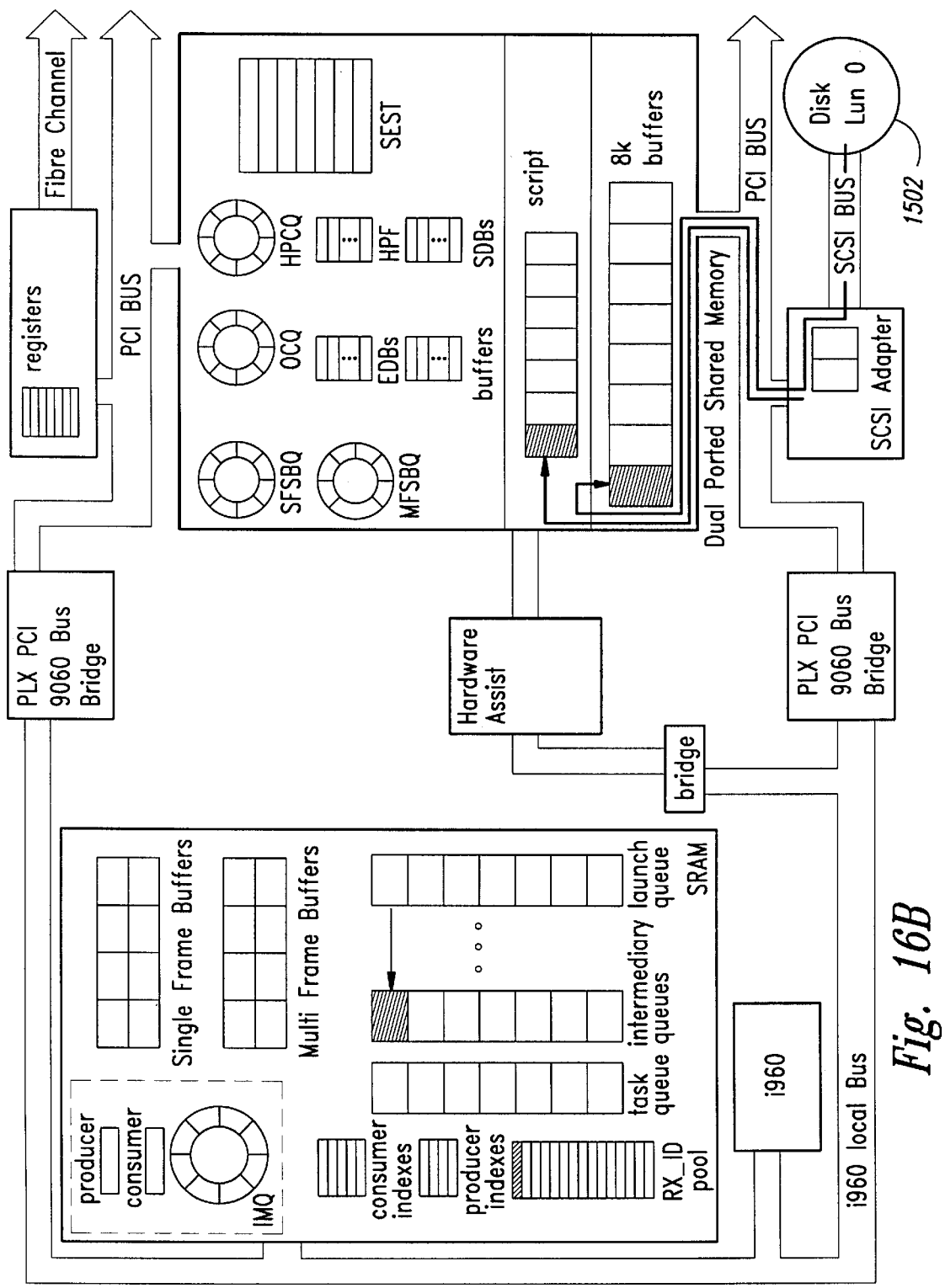

In FIG. 16B, the SCSI bus controls the SCSI bus and the target SCSI mass storage device 1502 to execute the command and data phases of the SCSI read operation (804 and 806 in FIG. 8A). As in the write I/O transaction illustrated in FIGS. 15A–15K, the SCSI-bus adapter 1210 accesses the previously prepared script template 1554 in the dual-ported shared memory 1220 to complete the data phase of the SCSI read operation, using the script 1554 to identify the 8-Kbyte buffer 1558 into which the data is transferred. The SCSI read operation results in data being transferred from the target SCSI mass storage device 1502 through the lower PCI bus 1218 to an 8-Kbyte buffer 1558 in the dual-ported shared memory 1220.

Figure 16C:
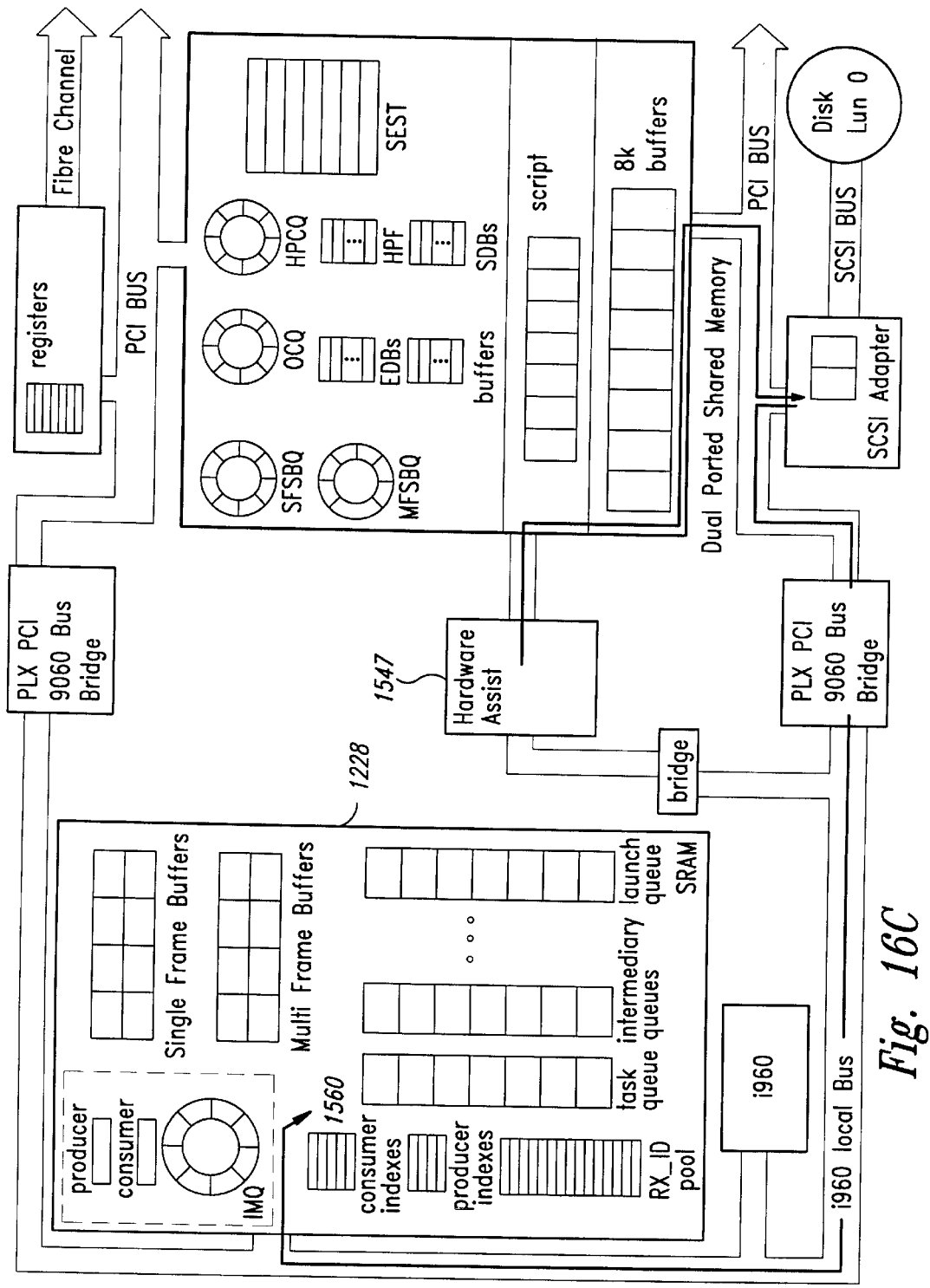

In FIG. 16C, after transfer of the first 8 Kbytes of data has completed, the SCSI-bus adapter 1210 reads, via a hardware assist 1547, an address in local memory 1228 in which to store an indication of the completion of the 8 Kbyte transfer. The SCSI-bus adapter 1210 then writes an indication of the completion of the SCSI 8 Kbyte transfer 1560 to the local memory 1228 via the lower PCI bus 1218, the lower bus bridge 1234, and the local bus 1230.

Figure 16D:
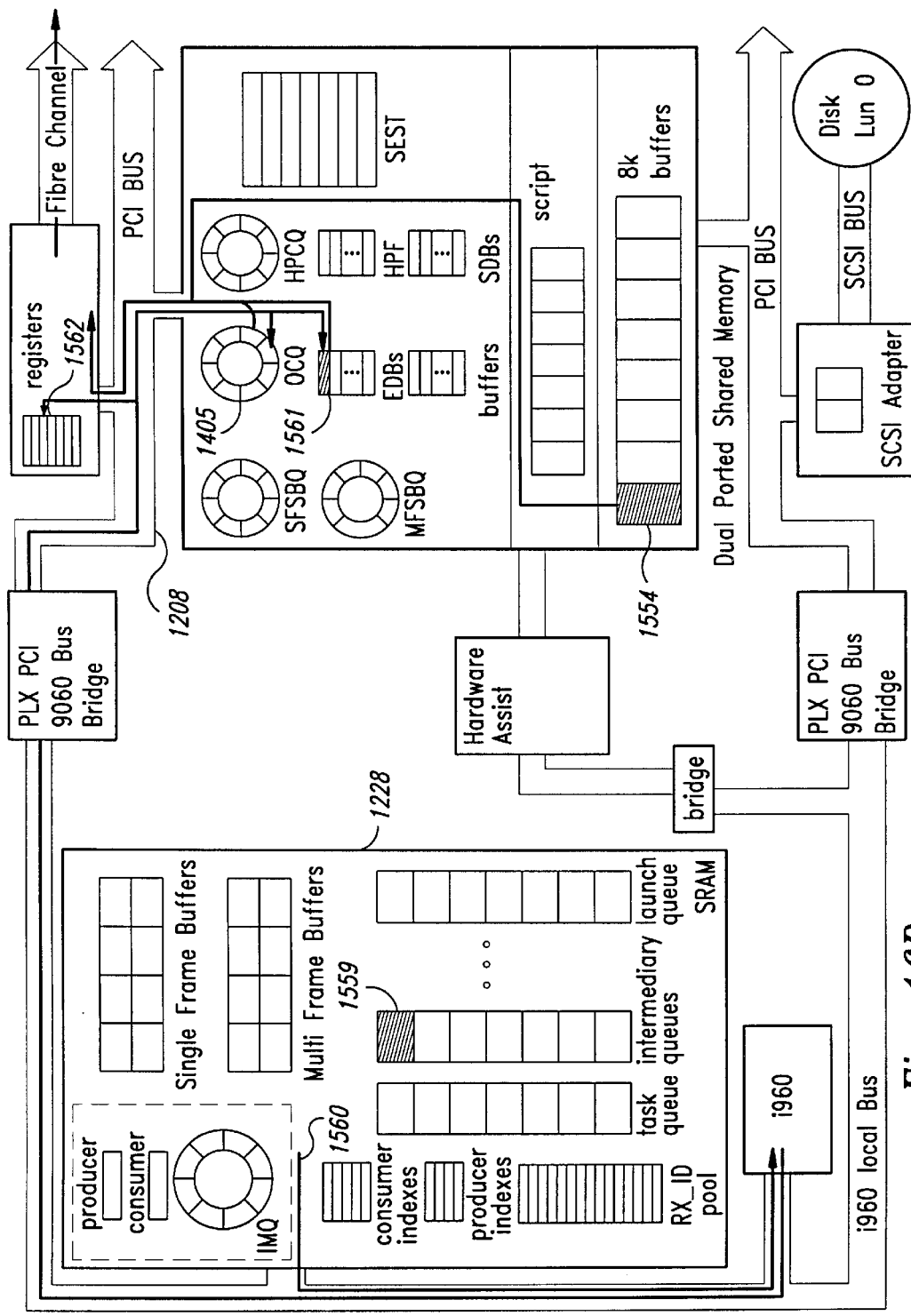

In FIG. 16D, the i960 processor 1226 detects the indication of the SCSI read operation completion 1560 in local memory 1228. The i960 processor 1226 identifies the I/O transaction to which the indication corresponds by the queue tag included in the indication of the SCSI read operation completion 1560. The i960 processor 1226 uses the information in the task queue entry 1559, identified as corresponding to the I/O transaction, to prepare an ODB entry within the OCQ 1405 stored in the dual-ported shared memory 1220, along with buffer pointers to the 8-Kbyte buffers 1558 in one or more EDBs 1561, that together comprise a description of the FCP__DATA sequence (810–813 in FIG. 8A) that is to be returned by the FC host adapter 1202 to the remote computer initiator of the read I/O transaction. When the FC host adapter 1202 detects the OCQ entry corresponding to the completed 8 Kbyte transfer, it reads the data from the 8-Kbyte buffer 1554, and information from the ODB entry, constructs an outgoing FCP__DATA sequence containing the 8 Kbytes of data, and sends the FCP__DATA sequence to the remote initiator computer.

Figure 16E:
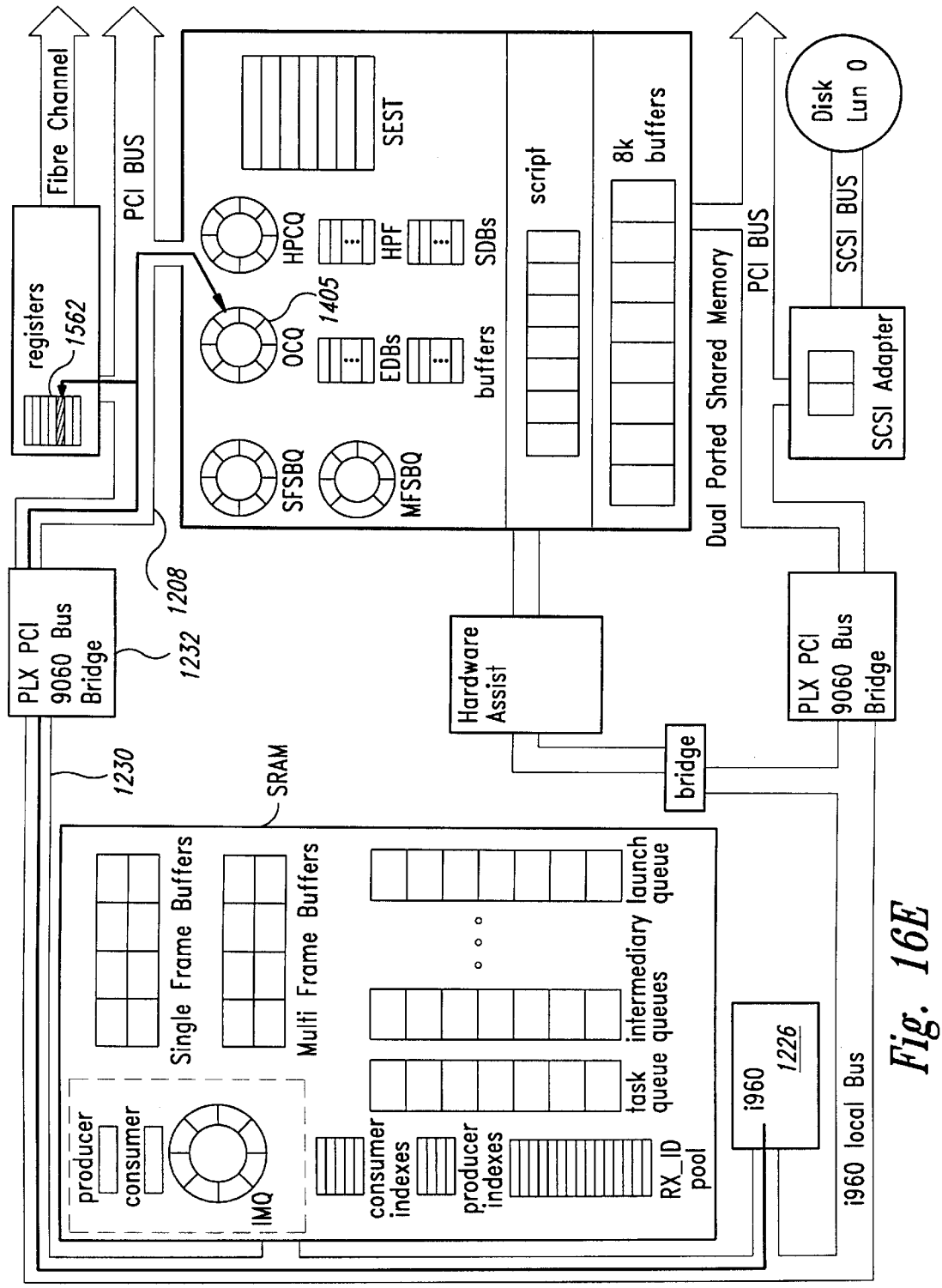

The HPM returns 8 Kbytes of data to the remote initiator computer in each returned FCP data sequence. The events illustrated in FIGS. 16A–16D are repeated for each 8 Kbytes of data transferred by the HPM to the remote initiator computer. In FIG. 16E, after the last 8 Kbyte data transfer, the i960 processor 1226 places a FCP__RSP sequence description in the OCQ 1405 corresponding to the FCP__RSP sequence 815 in FIG. 8A that ends the read I/O transaction. The i960 processor 1226 then updates the OCQ producer index 1562 in the FC host adapter 1202.

Figure 16F:
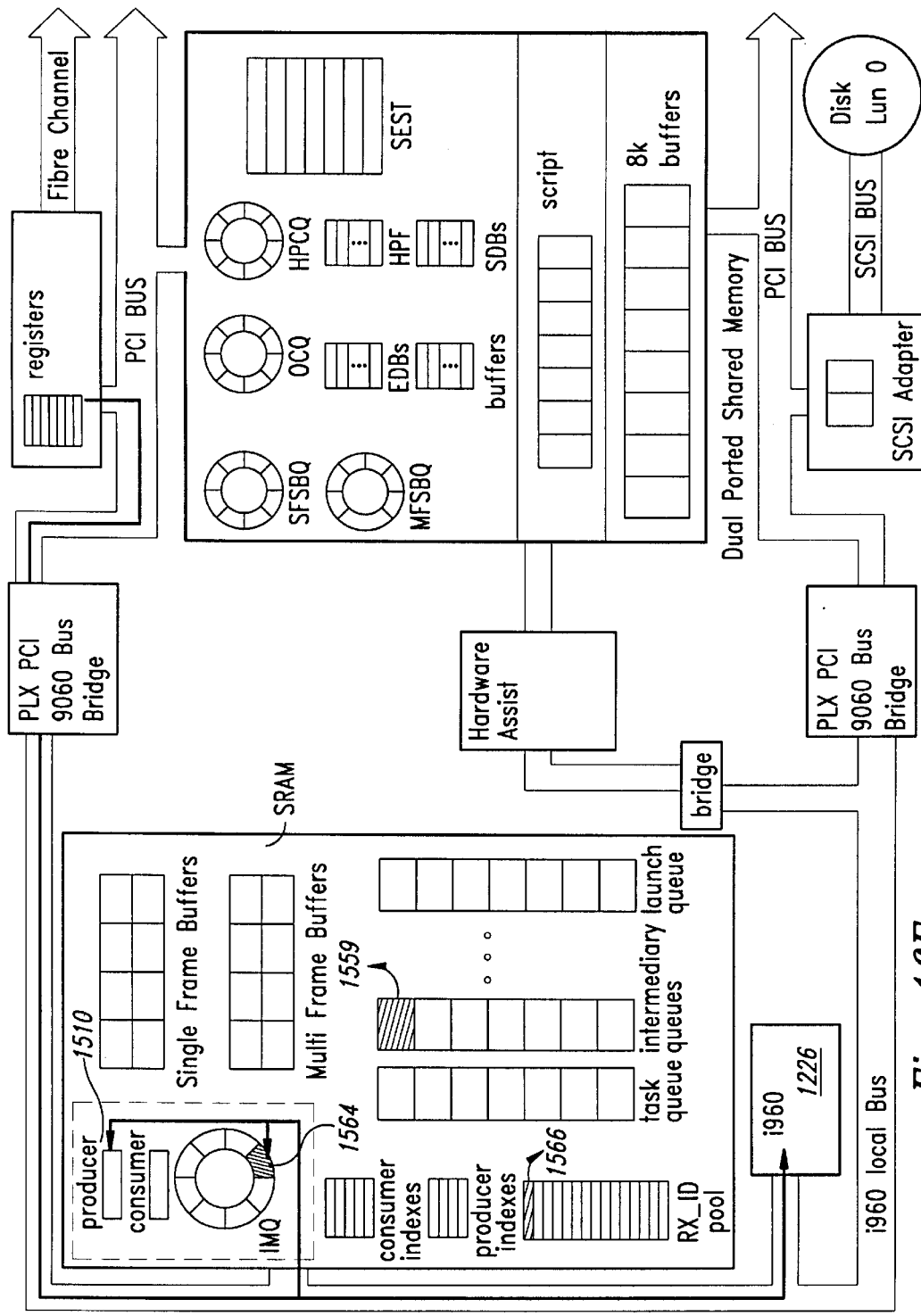

In FIG. 16F, the FC host adapter 1202 accesses the OCQ 1405 to prepare and send the FCP__RSP sequence back to the initiator of the read I/O operation. Upon receiving a low level FC acknowledgement from the remote initiator of a read I/O transaction, the FC host adapter 1202 places a completion message 1564 into the IMQ 1402 and updates the producer index 1510 of the IMQ 1402. When the i960 processor 1226 detects the new completion message 1564 in the IMQ 1402, the i960 processor can deallocate any resources remaining within the HPM that correspond to the completed read I/O transaction, including deallocating the RX_ID 1566 that was associated with the read I/O transaction and the task queue entry 1559 that was queued in a completion queue waiting for completion of the read I/O transaction.

As with the write I/O transaction, the read I/O transaction does not require a bus read operation to pass through either the upper bus bridge 1232 or the lower bus bridge 1234, and the FC host adapter 1202 does not contend with the SCSI-bus adapter 1210 for the same PCI bus. The HPM architecture of the present invention thus insures high concurrency of operations within the HPM and low contention for internal HPM resources.

Although the present invention has been described in terms of a particular HPM architecture embodiment, it is not intended that the invention be limited to this embodiment. Modifications within the spirit of the invention will be apparent to those skilled in the art. For example, the HPM, as noted above, might be implemented using any number of different types of SCSI-bus adapters, FC host adapters, general processors, internal buses, and local memories. It is possible to design a lower-performance HPM without using separate internal buses for the FC host adapters and the SCSI-bus adapters when data and control flow are carefully managed and timed. A variety of different types of internal data structures can be used to store FC and SCSI control information, and to buffer data being transferred between the FC and SCSI bus. The HPM architecture described above is not limited to a FC/SCSI-bus multiplexer, but can be employed in any communications hardware device in which data is exchanged between two different types of communications media. Instead of via a FC network, commands might be received via an asynchronous transmission mode ("ATM") communications connection, a fibre distributed data interface ("FDDI"), a high-performance parallel interface ("HIPPI"), or some other type of communications media, including a high-speed bus. The mass storage devices might be connected to an HPM through a communications means other than the SCSI bus. For example, it is conceivable that mass storage devices might be connected to an HPM through slower RS-232 connections or another type of peripheral communications media. The HPM architecture, in which read operations are not issued through bus bridges, and in which contention for shared resources is minimized, may be applicable to computer hardware devices other than multiplexers, including large multiprocessor computer systems supporting large numbers of mass storage devices and other peripheral devices.

The foregoing description, for purposes of explanation, used specific nomenclature to provide a thorough understanding of the invention. However, it will be apparent to one skilled in the art that the specific details are not required in order to practice the invention. In other instances, well known circuits and devices are shown in block diagram form in order to avoid unnecessary distraction from the underlying invention. Thus, the foregoing descriptions of specific embodiments of the present invention are presented for purposes of illustration and description. They are not intended to be exhaustive or to limit the invention to the precise forms disclosed, obviously many modifications and variations are possible in view of the above teachings. The embodiments were chosen and described in order to best explain the principles of the invention and its practical applications, to thereby enable others skilled in the art to best utilize the invention and various embodiments with various modifications as are suited to the particular use contemplated. It is intended that the scope of the invention be defined by the following claims and their equivalents:

What is claimed is:

1. A method for interconnecting a first communications medium, supporting a first transmission protocol that provides transmission of data transfer commands and data, with a second communications medium supporting a second transmission protocol that provides transmission of input/output commands and data, the method including:

providing a multiplexing hardware device having a local processor connected to a local memory by a local bus, the local bus connected to a first communications adapter that sends data and commands to, and that receives data and commands from, the first communications medium, and to a second communications adapter that sends data and commands to, and that receives data and commands from, the second communications medium, the local bus connected to a shared memory, the first communications adapter, and the second communications adapter by a bus bridge and an internal data bus, the internal bus, the local bus, and a combination of the internal bus, the local bus, and the bus bridge providing reading and writing operations that result in exchanges of data between the local memory, the shared memory, and the communications adapters;

receiving a data transfer command, directed to the second communications adapter, from the first communications medium by the first communications adapter;

writing the received data transfer command via the internal bus, the bus bridge, and the local bus to the local memory;

processing the data transfer command by the local processor and sending an input/output command corresponding to the received data transfer command to the second communications adapter via the local bus, the bus bridge, and the internal bus; and executing an input/output operation corresponding to the received input/output command and exchanging data related to execution of the input/output operation with the first communications adapter, via the internal bus and shared memory, by the second communications adapter.

2. The method of claim 1 wherein sending an input/output command corresponding to the received data transfer command to the second communications adapter via the local bus, the bus bridge, and the internal bus further includes transmitting indications of buffer locations within the shared memory by the local processor to the shared memory via the local bus, the bus bridge, and the internal bus.

3. The method of claim 1 further including:

after executing the input/output command by the second communications adapter, writing a result by the second communications adapter into the local memory via the internal bus, the bus bridge, and the local bus; and reading the result by the local processor via the local bus, and writing a message corresponding to the result by the local processor via the local bus, the bus bridge, and the internal bus to the first communications adapter which then forwards the result to the first communications medium.

4. The method of claim 1 wherein control data structures for controlling operation of the first communication adapter and the second communication adapter are partitioned between the local memory and the shared memory so that the local processor and the communications adapters do not need to employ reading operations via a combination of the internal bus, the local bus, and the bus bridge in order to access the control data structures during the exchange of the data transfer command and the data between the first communications adapter and the second communications adapter.

5. The method of claim 1 wherein the received data transfer command is a read data transfer command, wherein the input/output command corresponding to the read data transfer command is a read input/output command, and wherein the data related to the execution of the read input/output operation is received by the second communications adapter from the second communications medium, written by the second communications adapter to the shared memory via the internal bus, read from the shared memory by the first communications adapter via the internal bus, and forwarded to the first communications medium by the first communications adapter.

6. The method of claim 1 wherein the received data transfer command is a write data transfer command, wherein the input/output command corresponding to the write data transfer command is a write input/output command, and wherein the data related to the execution of the write input/output operation is received from the first communications medium by the first communications adapter, written by the first communications adapter to the shared memory via the internal bus, read from the shared memory by the second communications adapter via the internal bus, and forwarded to the second communications medium by the second communications adapter.

7. The method of claim 1 wherein the multiplexing hardware device includes two internal buses and two bus bridges, wherein the shared memory is a dual-ported shared memory, the first communications adapter connected to the dual-ported shared memory via a first internal bus and to the local bus via the first internal bus and a first bus bridge, the second communications adapter connected to the dual-ported shared memory via a second internal bus and to the local bus via the second internal bus and a second bus bridge, wherein the first communications adapter does not issue reading or writing operations to the second internal bus and the second communications adapter does not issue reading or writing operations to the first internal bus, and wherein control data structures for controlling operation of the first communication adapter and the second communication adapter are partitioned between the local memory and the shared memory so that the local processor and the communications adapters do not need to employ reading operations via a combination of the local bus, the internal bus, and the bus bridge connected to the internal bus in order to access the control data structures during the exchange of the data transfer command and the data between the first communications adapter and the second communications adapter.

8. The method of claim 1 wherein a number of different data transfer commands and data can be concurrently exchanged between the first communication adapter and the second communication adapter within the multiplexing hardware device.

9. The method of claim 1 wherein the first communications adapter receives the data transfer command from, and exchanges the data with, a remote computer via the first communications medium.

10. The method of claim 1 wherein the second communications adapter forwards the input/output command to, and exchanges the data with, a mass storage device via the second communications medium.

11. The method of claim 10 wherein the mass storage device is selected from a disk drive, a CD-ROM drive, and a tape drive.

12. The method of claim 11 wherein the first communications medium is a Fibre Channel and wherein the second communications medium is a SCSI bus.

13. The method of claim 12 wherein the local processor assigns a Fibre Channel RX_ID to each received data transfer command and uses the assigned RX_ID to identify control data structure entries within the control data structures related to each received data transfer command.

14. The method of claim 13 wherein the local processor assigns a SCSI queue tag to each input/output operation corresponding to a received data transfer command and uses the assigned SCSI queue tag to identify control data structure entries within the control data structures related to each input/output operation.

15. A method for interconnecting a first communications medium, supporting a first transmission protocol that provides transmission of data transfer commands and data, with a second communications medium supporting a second transmission protocol that provides transmission of input/output commands and data, the method including:

provided a local processor connected to a local memory by a local bus, the local bus connected, via a first bus bridge and a first internal bus, to a dual-ported shared memory and to a first communications adapter that sends data and commands to, and that receives data and commands from, the first communications medium, the local bus connected, via a second bus bridge and a second internal bus, to the dual-ported shared memory and a second communications adapter that sends data and commands to, and that receives data and commands from, the second communications medium, the local bus, the internal buses, and combinations of an internal bus selected from either of the two internal buses, the local bus, and the bus bridge connected to the selected internal bus providing reading and writing operations for exchanging data between the local memory, the dual-ported shared memory, and the communications adapters;

receiving a data transfer command, directed to the second communications adapter, from the first communications medium by the first communications adapter;

writing the received data transfer command via the first internal bus, the first bus bridge, and the local bus to the local memory;

processing the data transfer command by the local processor and sending an input/output command corresponding to the received data transfer command to the second communications adapter; and executing an input/output operation corresponding to the received input/output command and exchanging data related to execution of the input/output operation with the first communications adapter via the second internal bus, the dual-ported shared memory, and the first internal bus, by the second communications adapter.

16. The method of claim 15 wherein sending an input/output command corresponding to the received data transfer command to the second communications adapter via the local bus, the second bus bridge, and the second internal bus further includes transmitting indications of buffer locations within the dual-ported shared memory by the local processor to the dual-ported shared memory via the local bus, the second bus bridge, and the second internal bus.

17. The method of claim 15 further including:
after executing the input/output command by the second communications adapter,
writing a result by the second communications adapter into the local memory via the second internal bus, the second bus bridge, and the local bus; and
reading the result by the local processor via the local bus, and writing a message corresponding to the result by the local processor via the local bus, the first bus bridge, and the first internal bus to the first communications adapter for forwarding by the first communications adapter to the first communications medium.

18. The method of claim 15 wherein control data structures for controlling operation of the first communication adapter and the second communication adapter are partitioned between the local memory and the dual-ported shared memory so that the local processor and the communications adapters do not need to employ reading operations via combinations of the internal buss, the local bus, and the bus bridges in order to access the control data structures during the exchange of the data transfer command and the data between the first communications adapter and the second communications adapter.

19. The method of claim 15 wherein the received data transfer command is a read data transfer command, wherein the input/output command corresponding to the read data transfer command is a read input/output command, and wherein the data related to the execution of the read input/output operation is received by the second communications adapter from the second communications medium, written by the second communications adapter to the dual-ported shared memory via the second internal bus, read from the dual-ported shared memory by the first communications adapter via the first internal bus, and forwarded to the first communications medium by the first communications adapter.

20. The method of claim 15 wherein the received data transfer command is a Write data transfer command, wherein the input/output command corresponding to the write data transfer command is a write input/output command, and wherein the data related to the execution of the write input/output operation is received from the first communications medium by the first communications adapter, written by the first communications adapter to the dual-ported shared memory via the first internal bus, read from the dual-ported shared memory by the second communications adapter via the second internal bus, and forwarded to the second communications medium by the second communications adapter.

21. The method of claim 15 wherein a number of different data transfer commands and data can be concurrently exchanged between the first communication adapter and the second communication adapter within the multiplexing hardware device.

22. The method of claim 15 wherein the first communications adapter receives the data transfer command and exchanges the data via the first communications medium with a remote computer.

23. The method of claim 15 wherein the second communications adapter forwards the input/output command and exchanges the data with a mass storage device via the second communications medium.

24. The method of claim 23 wherein the mass storage device is selected from a disk drive, a CD-ROM drive, and a tape drive.

25. The method of claim 24 wherein the first communications medium is a Fibre Channel and wherein the second communications medium is a SCSI bus.

26. The method of claim 25 wherein the local processor assigns a Fibre Channel RX_ID to each received data transfer command and uses the assigned RX_ID to identify control data structure entries within the control data structures related to each received data transfer command.

27. The method of claim 25 wherein the local processor assigns a SCSI queue tag to each input/output operation corresponding to a received data transfer command and uses the assigned SCSI queue tag to identify control data structure entries within the control data structures related to each input/output operation.

28. A multiplexing hardware device that interconnects a first communications medium, supporting a first transmission protocol that provides transmission of data transfer commands and data, with a second communications medium supporting a second transmission protocol providing transmission of input/output commands and data, the multiplexing hardware device including:
a local processor that translates data transfer commands and messages from the first transmission protocol to the second transmission protocol;
a local memory that stores control data structures and queues which the local processor uses to control the communications adapters and track data transfer commands as they are processed within the multiplexing hardware device;
a local bus that interconnects the local processor with the local memory and that supports reading and writing operations;
a first communications adapter that sends data and commands to, and that receives data and commands from, the first communications medium;
a second communications adapter that sends data and input/output commands to, and that receives data and commands from, the second communications medium;
a shared memory that stores control data structures and queues which the local processor uses to control the communications adapters and that stores data exchanged between the first communications adapter and the second communications adapter;
an internal bus to which the communications adapters and shared memory are connected and that supports reading and writing operations; and
a bus bridge that interconnects the internal bus and the local bus.

29. The multiplexing hardware device of claim 28 wherein, during the processing of received data transfer commands by the multiplexing hardware device, the local processor and the first and second communications adapters only transmit writing operations through the bus bridge.

30. The multiplexing hardware device of claim 29 wherein, when the first communications adapter receives a data transfer command from the first communications medium, the multiplexing hardware device processes the received data transfer command by:
writing the received data transfer command by the first communications adapter via the internal bus, the bus bridge, and the local bus to the local memory;
processing the data transfer command by the local processor and sending an input/output command corresponding to the received data transfer command to the second communications adapter; and executing, by the second communications adapter, an input/output operation corresponding to the received input/output command and exchanging data, by the second communications adapter, related to execution of the input/output operation with the first communications adapter via the internal bus and shared memory.

31. The multiplexing hardware device of claim 30 further including:
after executing the input/output command by the second communications adapter,
writing a result by the second communications adapter into the local memory via the internal bus, the bus bridge, and the local bus; and
reading the result by the local processor via the local bus, and writing a message corresponding to the result by the local processor via the local bus, the bus bridge, and the internal bus to the first communications adapter for forwarding by the first communications adapter to the first communications medium.

32. The multiplexing hardware device of claim 30 wherein the received data transfer command is a read data transfer command, wherein the input/output command corresponding to the read data transfer command is a read input/output command, and wherein the data related to the execution of the read input/output operation is received by the second communications adapter from the second communications medium, written by the second communications adapter to the shared memory via the internal bus, read from the shared memory by the first communications adapter via the internal bus, and forwarded to the first communications medium by the first communications adapter.

33. The multiplexing hardware device of claim 30 wherein the received data transfer command is a write data transfer command, wherein the input/output command corresponding to the write data transfer command is a write input/output command, and wherein the data related to the execution of the write input/output operation is received from the first communications medium by the first communications adapter, written by the first communications adapter to the shared memory via the internal bus, read from the shared memory by the second communications adapter via the internal bus, and forwarded to the second communications medium by the second communications adapter.

34. The multiplexing hardware device of claim 30 wherein control data structures for controlling operation of the first communication adapter and the second communication adapter are partitioned between the local memory and the shared memory so that the local processor and the communications adapters do not need to employ reading operations via a combination of the internal bus, the local bus, and the bus bridge in order to access the control data structures during the exchange of data transfer commands and data between the first communications adapter and the second communications adapter.

35. The multiplexing hardware device of claim 28 wherein the first communications medium is a Fibre Channel, wherein the second communications medium is a SCSI bus, and wherein the data transfer commands are initiated by one or more remote computers connected to the Fibre Channel and result in the second communications adapter directing mass storage devices, wherein the mass storage devices are selected from disk drives, tape drives, and CD-ROM drives, connected to the SCSI bus, to exchange data with the one or more remote computers via the Fibre Channel, the internal bus., and shared memory within the multiplexing hardware device, and the SCSI bus.

36. The multiplexing hardware device of claim 35, wherein a number of Fibre Channel communications adapters and a number of SCSI communications adapters are connected to the internal bus.

37. The multiplexing hardware devices of claim 36 wherein a large number of data transfer commands are concurrently processed within the multiplexing hardware device.

38. A multiplexing hardware device that interconnects a first communications medium supporting a first transmission protocol that provides transmission of data transfer commands and data with a second communications medium supporting a second transmission protocol that provides transmission of input/output commands and data, the multiplexing hardware device including:
a local processor that translates data transfer commands and messages from the first transmission protocol to the second transmission protocol;
a local memory that stores control data structures and queues which the local processor uses to control the communications adapters and track data transfer commands as they are processed within the multiplexing hardware device;
a local bus that interconnects the local processor with the local memory and that supports reading and writing operations;
a first communications adapter that sends data and commands to, and that receives data and commands from, the first communications medium;
a second communications adapter that sends data and input/output commands to, and that receives data and commands from, the second communications medium;
a dual-ported shared memory for storing control data structures and queues which the local processor uses to control the communications adapters and that stores data exchanged between the first communications adapter and the second communications adapter;
a first internal bus to which the first communications adapter and dual-ported memory are connected and that supports reading and writing operations;
a first bus bridge that interconnects the first internal bus and the local bus;
a second internal bus to which the second communications adapter and dual-ported memory are connected and that supports reading and writing operations; and
a second bus bridge that interconnects the second internal bus and the local bus.

39. The multiplexing hardware device of claim 38 wherein the local processor and the communications adapters only transmit reading operations through the bus bridges during the processing of received data transfer commands by the multiplexing hardware device.

40. The multiplexing hardware device of claim 39 wherein, when the first communications adapter receives a data transfer command from the first communications medium, the multiplexing hardware device processes the received data transfer command by:
writing the received data transfer command by the first communications adapter via the first internal bus, the first bus bridge, and the local bus to the local memory;
processing the data transfer command by the local processor and sending an input/output command corresponding to the received data transfer command to the second communications adapter via the local bus, and one of the bus bridges and the corresponding internal bus that is connected to the bus bridge; and executing, by the second communications adapter, an input/output operation corresponding to the received command by the second communications adapter and exchanging, by the second communications adapter, data related to execution of the input/output operation with the first communications adapter via the internal buses and dual-ported shared memory.

41. The multiplexing hardware device of claim 40 further including:

after executing the input/output command by the second communications adapter, writing a result by the second communications adapter into the local memory via the first internal bus, the first bus bridge, and the local bus; and reading the result by the local processor via the local bus, and writing a message corresponding to the result by the local processor via the local bus, the first bus bridge, and the first internal bus to the first communications adapter for forwarding by the first communications adapter to the first communications medium.

42. The multiplexing hardware device of claim 40 wherein the received data transfer command is a read data transfer command, wherein the input/output command corresponding to the read data transfer command is a read input/output command, and wherein the data related to the execution of the read input/output operation is received by the second communications adapter from the second communications medium, written by the second communications adapter to the dual-ported shared memory via the second internal bus, read from the dual-ported shared memory by the first communications adapter via the first internal bus, and forwarded to the first communications medium by the first communications adapter.

43. The multiplexing hardware device of claim 40 wherein the received data transfer command is a write data transfer command, wherein the input/output command corresponding to the write data transfer command is a write input/output command, and wherein the data related to the execution of the write input/output operation is received from the first communications medium by the first communications adapter, written by the first communications adapter to the dual-ported shared memory via the first internal bus, read from the dual-ported shared memory by the second communications adapter via the second internal bus, and forwarded to the second communications medium by the second communications adapter.

44. The multiplexing hardware device of claim 40 wherein control data structures for controlling operation of the first communication adapter and the second communication adapter are partitioned between the local memory and the shared memory so that the local processor and the communications adapters do not need to employ reading operations via a combination of an internal bus selected from among the two internal buses, the local bus, and a bus bridge connected to the selected internal bus in order to access the control data structures during the exchange of data transfer commands and data between the first communications adapter and the second communications adapter.

45. The multiplexing hardware device of claim 38 wherein the first communications medium is a Fibre Channel, wherein the second communications medium is a SCSI bus, and wherein the data transfer commands are initiated by one or more remote computers connected to the Fibre Channel and result in the second communications adapter directing mass storage devices, wherein the mass storage devices are selected from disk drives, tape drives, and CD-ROM drives, connected to the SCSI bus, to exchange data with the one or more remote computers via the Fibre Channel, the internal bus and dual-ported shared memory within the multiplexing hardware device, and the SCSI bus.

46. The multiplexing hardware device of claim 45 wherein a number of Fibre Channel communications adapters are connected to the first internal bus and wherein a number of SCSI communications adapters are connected to the second internal bus.

47. The multiplexing hardware device of claim 38 wherein a large number of data transfer commands are concurrently processed within the multiplexing hardware device.

* * * * *